(12) United States Patent
Zhang et al.

(10) Patent No.: US 9,301,606 B2
(45) Date of Patent: Apr. 5, 2016

(54) UNATTENDED FULL-AUTOMATIC BOOK MANAGEMENT SYSTEM

(71) Applicant: Beijing Institute of Technology, Beijing (CN)

(72) Inventors: Fan Zhang, Beijing (CN); Yongfa Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 14/387,881

(22) PCT Filed: Apr. 15, 2013

(86) PCT No.: PCT/CN2013/000435
§ 371 (c)(1),
(2) Date: Sep. 25, 2014

(87) PCT Pub. No.: WO2013/155872
PCT Pub. Date: Oct. 24, 2013

(65) Prior Publication Data
US 2015/0057792 A1    Feb. 26, 2015

(30) Foreign Application Priority Data

Apr. 19, 2012   (CN) .......................... 2012 1 0117253

(51) Int. Cl.
*G06F 7/00*     (2006.01)
*A47B 63/00*    (2006.01)
*A47B 63/06*    (2006.01)
*B65G 1/137*    (2006.01)

(52) U.S. Cl.
CPC .................. *A47B 63/00* (2013.01); *A47B 63/06* (2013.01); *B65G 1/1373* (2013.01)

(58) Field of Classification Search
None
See application file for complete search history.

(56) References Cited

U.S. PATENT DOCUMENTS

2015/0057792 A1* 2/2015 Zhang ..................... A47B 63/00 700/214

FOREIGN PATENT DOCUMENTS

| CN | 101064026 | 10/2007 |
|---|---|---|
| CN | 101131784 | 2/2008 |
| CN | 102080485 | 6/2011 |
| CN | 102642689 | 8/2012 |

OTHER PUBLICATIONS

International Search Report for PCT/CN2013/000435 dated Jul. 18, 2013.
Written Opinion for PCT/CN2013/000435 dated Jul. 12, 2013.

* cited by examiner

*Primary Examiner* — Yolanda Cumbess
(74) *Attorney, Agent, or Firm* — Law Offices of David O. Caplan, PLLC

(57) ABSTRACT

Thorough optimization and improvement have been made on the basis of original closed-shelf stack room by the unattended full-automatic book management system of the invention. The concept of a book basket is brought in to process an order of each borrower in a batch. The device is simplified and the efficiency of single functional part is enhanced during the period of storing books, taking books, returning books, conveying a book basket and transmission, thereby the functions of the whole system being optimized. The system includes bookracks, a laneway vehicle, a laneway vehicle interface, a transmission device, a book taking window, and a book returning window, and further includes a book basket and a book box independent of the bookracks. The data information inside the database of the closed-shelf stack room system is administered and operated by the closed-shelf stack room management system to accomplish the interaction between the collection system and the control system of the full-automatic closed-shelf stack room. Ultimately books are administered through the full-automatic closed-shelf stack room.

35 Claims, 38 Drawing Sheets

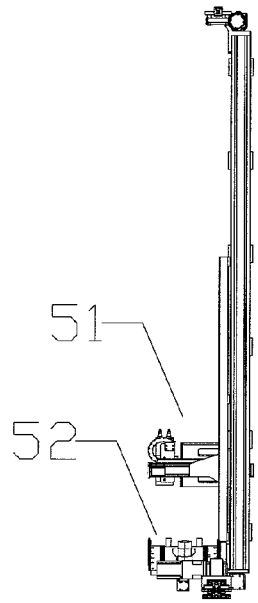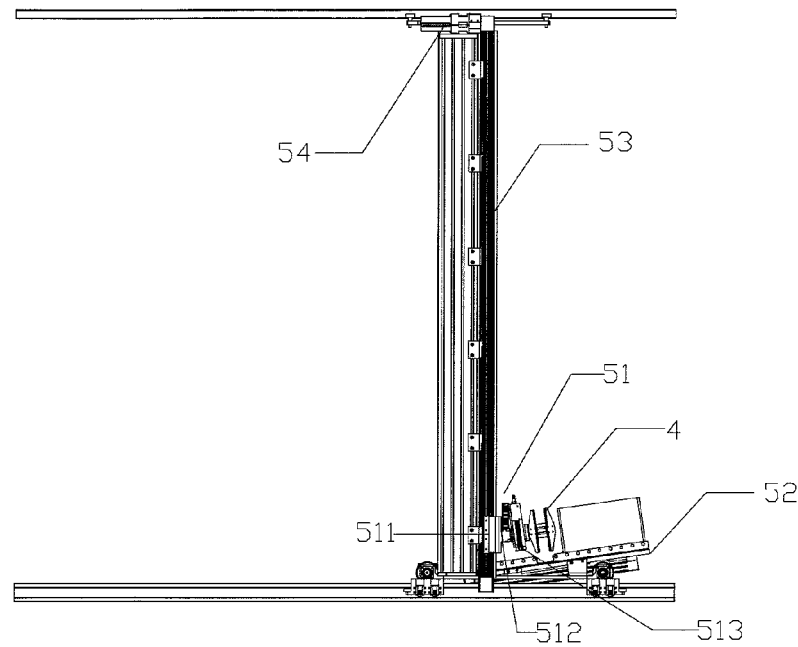
FIG.5C  FIG.5D
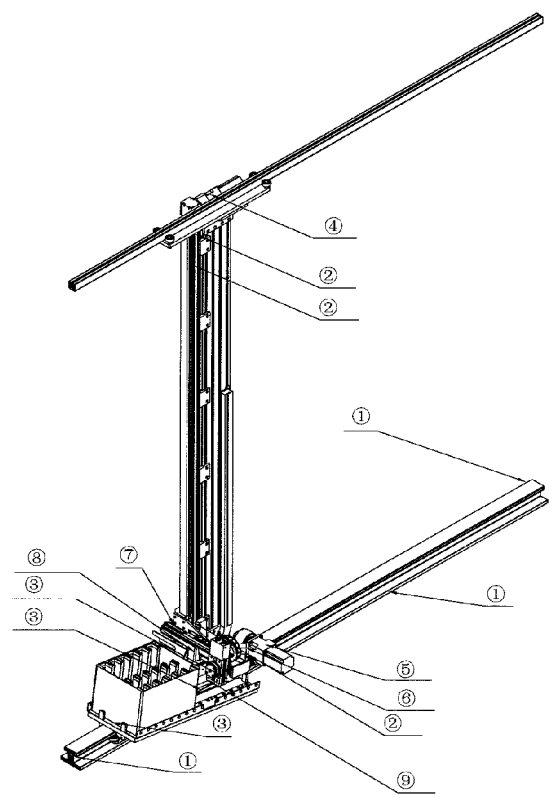
FIG.5E

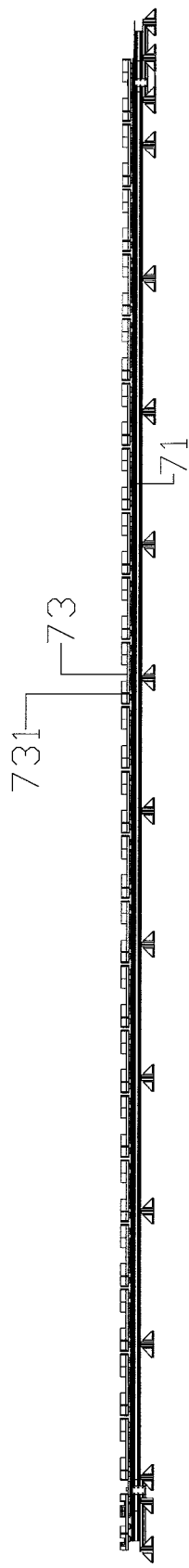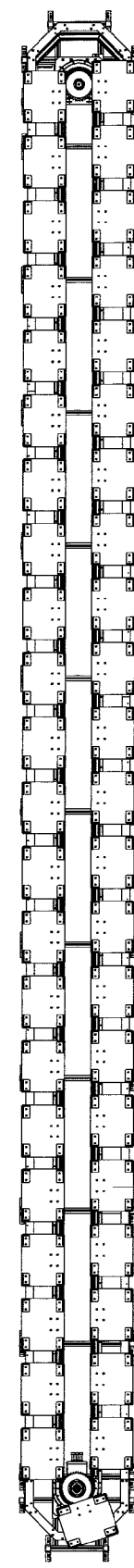
FIG.7A
FIG.7B

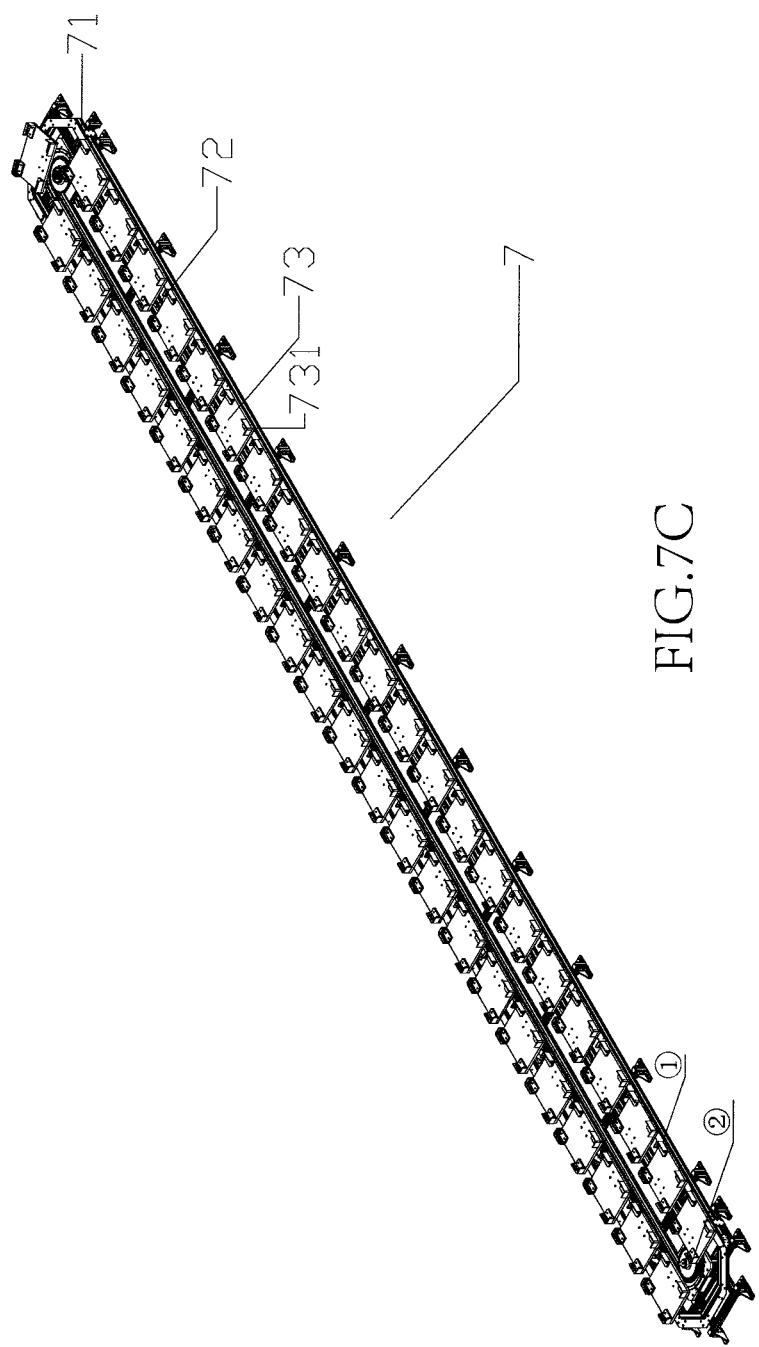

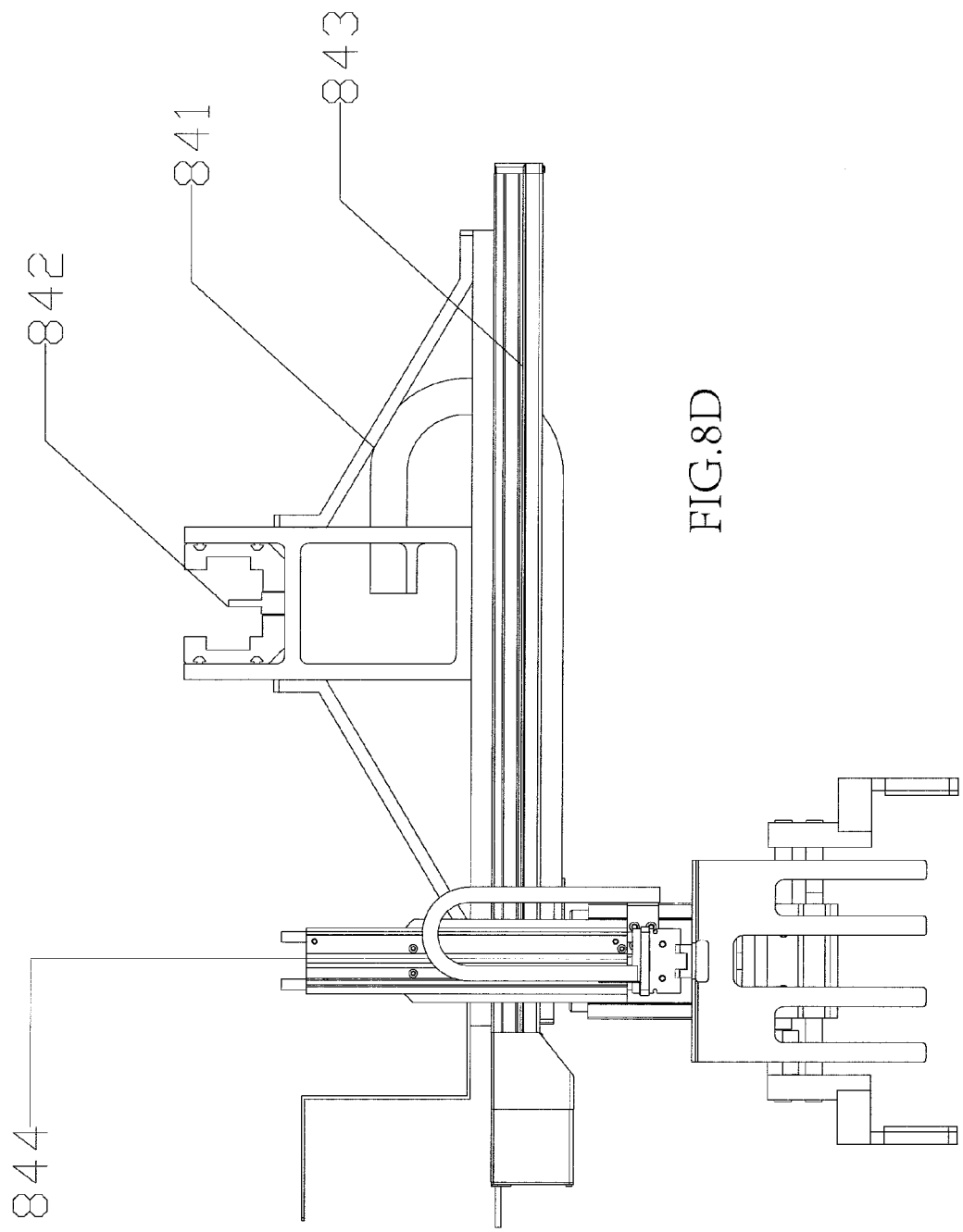

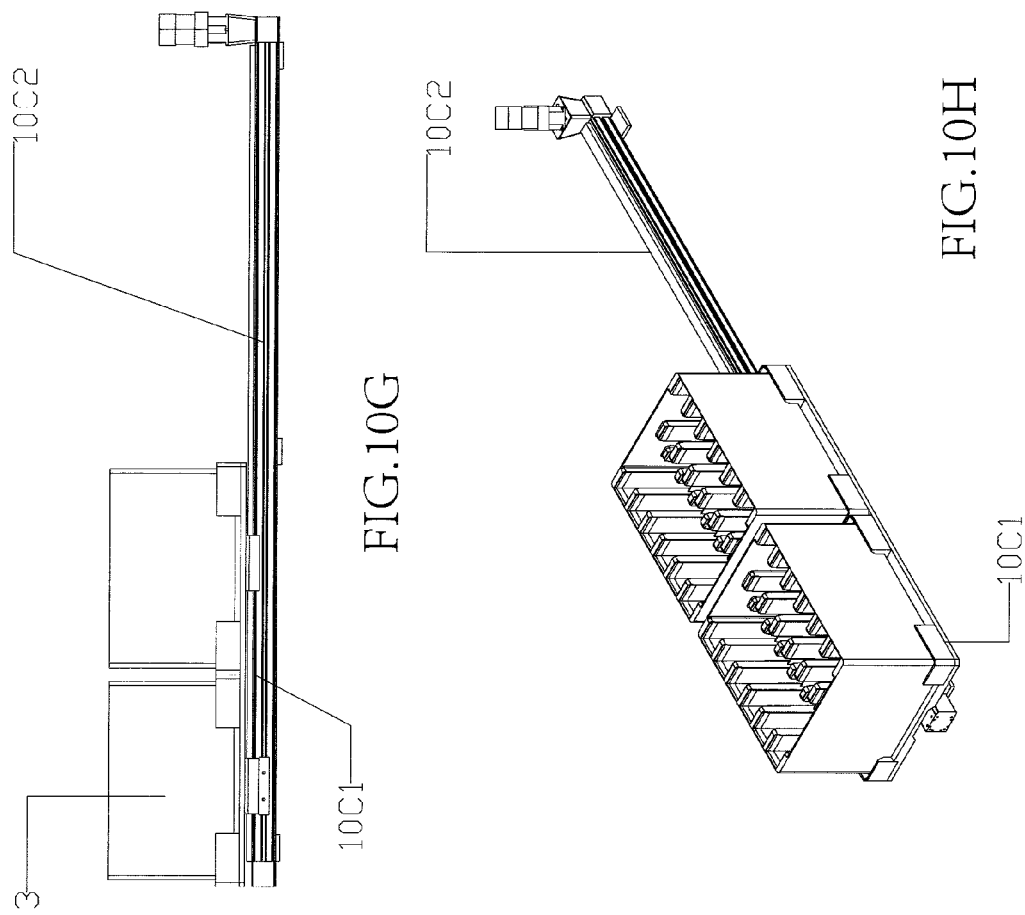

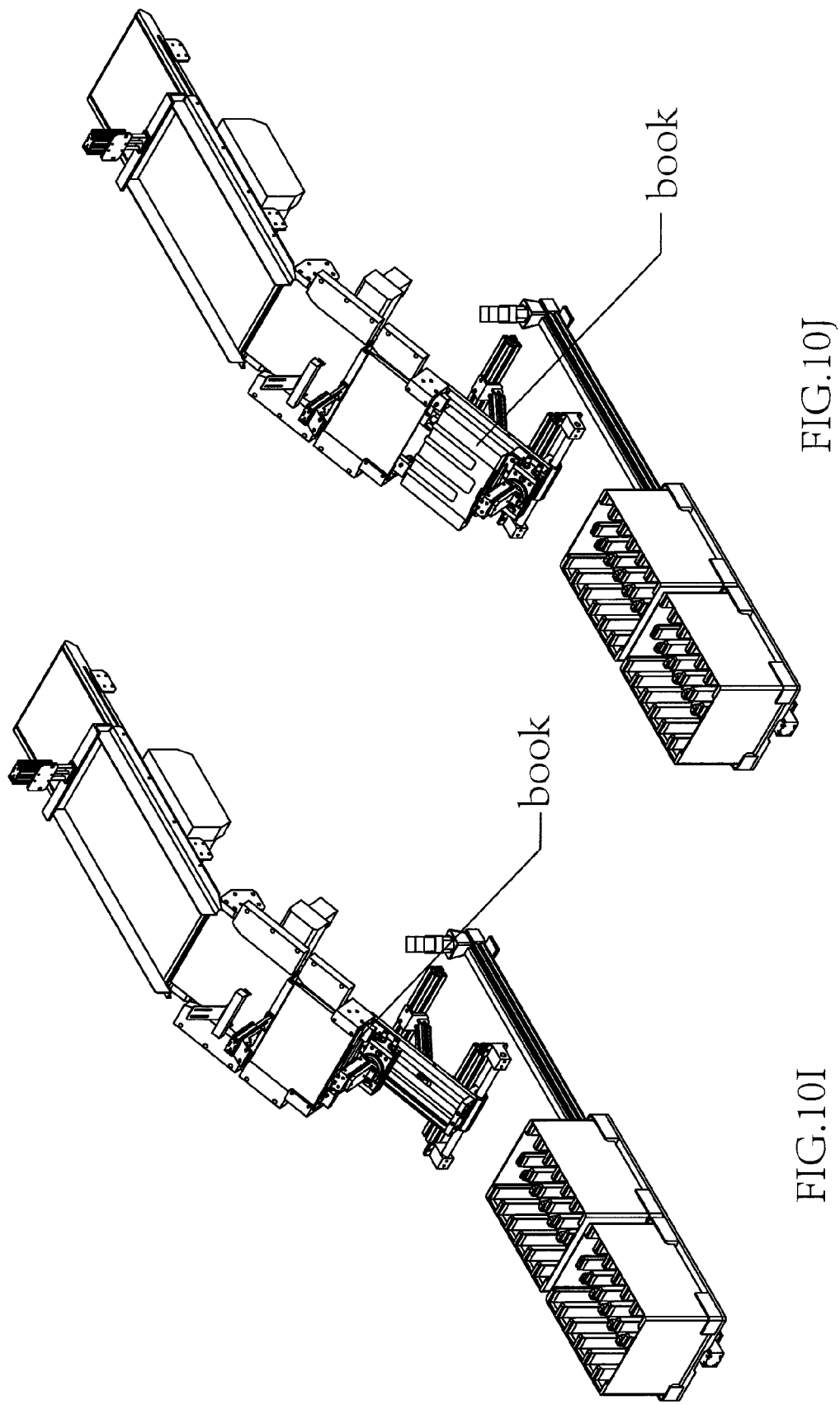

UNATTENDED FULL-AUTOMATIC BOOK MANAGEMENT SYSTEM

CROSS REFERENCE TO RELATED APPLICATIONS

This application is the national stage of PCT application serial number PCT/CN2013/000435, filed op Apr. 15, 2013 which claims priority to Chinese application Serial number 201210117253.8, filed on Apr. 19, 2012 the entire contents of which are incorporated herein.

FIELD OF THE INVENTION

The present invention relates to an unattended full-automatic book management system for library, which includes closed-shelf an upper-level book management system and a full-automatic closed-shelf stack room. Functions like Automatic borrowing, returning and reorganizing, etc. to books by a full-automatic closed-shelf stack room mechanical system are achieved by interaction between the upper-level book management system and a control system of the full-automatic closed-shelf stack room, thus ultimately enabling 24-hour full-automatic unattended borrow for books in a library.

RELATED ART

A library has been a collection center for the physical files such as books, periodicals, newspapers, CDs etc. Collecting, reorganizing, storing and use to these files have been the major function for a library for a long time. In recent years, open-shelf reading has become a mainstream of library management. However, issues on losing of books due to bookracks disordering and reading room occupation are also brought thereby. Therefore, a plurality of libraries at home and abroad start to transfer a large amount of books to the closed-shelf stack room systems through management by precisely automated systems.

An automatic library circulation system is a specific application of industrial automatic logistics and storage technology for industry production in the field of library and has been developed for about 15 years. Known in the art are a lot of application cases at present in North America, Canada and Japan, such as the California State University, Northridge; the Cornell University; the University of Louisville; the University of Nevada, Las Vegas; the University of British Columbia; the International Christian University of Japan and the Waseda University of Japan. The HK System Company in the U.S. and the Nipponfiling Company in Japan are producers of the automatic library circulation system. Single copies of books are packaged and stored in a large storage box and bar codes are captured and recognized in the products and application cases thereof. The problem with such an approach is that the whole storage box is needed to be removed when any one copy of books is requested, relying on librarians to find the book desired, and thus it cannot be accomplished completely without library staffs; because of the characteristic of the bar codes are needed to be precisely aligned for scanning, there is some influence upon the precision and accuracy of recognizing books; and the time required is long and it is not applicable in the environment for a high circulation rate for books depending on the limited mechanical devices to grasp books.

An automated book management system for library based on closed-shelf stack rooms is described in the patent No. 200910080132.9, in which closed-shelf stack rooms are used and books are stored on closed-shelf bookracks, the bookracks, which are formed by inserting and connecting several supporting boards, being placed hierarchically; intellectual laneway vehicles run in the laneways among the bookracks and books are captured by intellectual mechanical hands for book taking and book returning. Among other things, six intellectual mechanical hands are included in each intellectual laneway vehicle; each intellectual mechanical hand mounted includes a clamper for capturing books and a belt transmission apparatus to achieve book capturing and mechanical hands transmission. Accordingly, a laneway vehicle interface is provided at the end of each laneway to connect with the main transmission laneway and to accomplish the transmission for books from the intellectual laneway vehicles to the main transmission laneway. The main transmission laneway, based on different functions, is divided into a double-layer structure, wherein the lower-layer is the laneway for book taking to be borrowed and the upper-layer is the laneway for carrying-in returned books. In addition, an automatic transmission apparatus, according to requirement on functions, further includes an interface for temporary storage, an interface for book taking and a connection laneway for returning books.

Books are taken off the bookracks by an intellectual mechanism hand and are conveyed to the laneway vehicle interface by the intellectual laneway vehicle and are transmitted to the interface for temporary storage through the main transmission laneway. Finally, actions of the intellectual mechanical hand on the shelf for temporary storage are accomplished for conveying books from the books shelves for temporary storage to the interface for book taking.

It has been confirmed through practice that unattended management for libraries can be achieved with above-mentioned structure. However, several problems exist in the structure in consideration of optimizing the structure:

1. The bookrack, a mechanism hand and an automated transmission apparatus are all metallic members, sparks are easily produced when the members are used as medium for storing and transmitting books and severe consequences may be caused.

2. Every intellectual laneway vehicle includes a plurality of intellectual mechanism hands with the same function and the operation mode and the implementation mode of each mechanism hand are completely the same, making repetition and waste in both function and structure.

3. The main transmission laneway and the laneway vehicle interface are designed as an upper-layer and lower-layer structure to cooperate with the borrowing and returning of books; although it is simple in design, resource is wasted in respect to resource conservation considerations.

4. Only single copies of books are transmitted during the process of books transmission, only one book being transmitted at the same point in time, thus reducing the whole efficiency.

5. Books are stored in the stack room for temporary storage before being carried-out, which is accomplished by mechanical hands provided on laneway vehicles on the stack room for temporary storage side; when a plurality of books are requested by the same borrower, taking-storing-takings are repeated by the system, functions of the system not being optimal enough.

SUMMARY

Optimization and improvement are made based on original closed-shelf stack rooms in the present invention against the characteristics of books circulation in libraries. The concept of a book basket is brought in to process an order of each borrower in a batch. The device is simplified and the efficiency of single functional part is enhanced during the period of storing books, taking books, returning books, conveying a book basket and transmission, thereby the functions of the whole system being optimized.

Specifically, first of all, a full-automatic closed-shelf stack room is provided in the invention, including bookracks, a laneway vehicle, a laneway vehicle interface, a transmission device, a book taking window, and a book returning window, the laneway vehicle running in the laneways among the bookracks. The major improvement lies in that a book basket is included, which includes a plurality of book lattices, the book lattices being separated by bookends; a book box is included, which is mounted on the bookrack in groups and is independent of the bookrack; a mechanical arm and a bracket for the book basket are provided on the laneway vehicle, a book clamping mechanism being provided on the mechanical arm, the book clamping mechanism being connected with a rotation device, which is mounted on a linear guiding device perpendicular to the laneway, the linear guiding device being mounted on a fixed slider, the mechanical arm being connected with the laneway vehicle through the fixed slider, the book basket bracket is located under the mechanical arm, the bookends for limiting the book basket driven by a movement device for the bookends for limiting the book basket being provided thereon; the transmission device includes a main transmission line and a transmission line for temporary storage, both of which are single-layer closed circulation transmission line; the bookracks are provided beside the main transmission line, the laneway vehicle interface being provided between the laneway entrance and the main transmission line, a book basket clamper being provided on the interface of the laneway vehicle and being fixed on an extending device, the extending device being connected with a rotation device of the book basket clamper, the rotation device of the book basket clamper being provided on a linear guiding device at the entrance of the laneway vehicle, the linear guiding device at the entrance of the laneway vehicle being extended in a direction from the main transmission line to the laneway vehicle; an online book organizing mechanism is provided between the main transmission line and the transmission line for temporary storage, the online book organizing mechanism including a supporting frame for organizing books crossing the main transmission line and a transmission line for temporary storage, a mechanism for book taking and book basket taking being provided on the supporting frame for organizing books, organizing transmission lines being provided below the mechanism for book taking and book basket taking; the organizing transmission lines are located between the main transmission line and the transmission line for temporary storage; the mechanism for book taking and book basket taking includes the first linear guiding device, which is located above the organizing transmission lines and is parallel thereto, the second linear guiding device perpendicular to the first linear guiding device being provided thereon; a lift cylinder for the book clamping mechanism and a lift cylinder for book basket clamper are provided on the second linear guiding device, the book clamping mechanism being connected with the bottom of the lift cylinder for the book clamping mechanism, a book basket clamper being connected with the bottom of the lift cylinder for the book basket clamper; the book taking window and the book returning window being provided on one side of the temporary storage transmission line; the book taking window includes a supporting bracket for the taking window and an in-line supporting bracket crossing the temporary storage transmission line, a lower-layer book basket bracket and an upper-layer window baffle board being provided on the supporting bracket for the taking window, the book basket bracket moving upward and downward through a frame lift cylinder; the book basket clamper moving from the upper side of the temporary storage transmission lines to the upper side of the lower-layer book basket bracket is provided on the in-line supporting bracket; the book returning window includes a book returning mechanism and a book basket transmission bracket for returning books provided on a book returning window bracket; the returning mechanism includes a horizontal transmission line, the end of which being connected with a slope slide, the lower end of the slope slide being provided with the book clamping mechanism, the book clamping mechanism being connected with a rotating cylinder for book returning, the rotating cylinder for book returning being provided on a translational cylinder for book returning, a push and pull cylinder being provided on the translational cylinder for book returning, the translational cylinder for book returning being pushed by the push and pull cylinder to be parallel with the slope slide to accomplish the book taking action of the book clamping mechanism under the slope slide, the translational cylinder for book returning being pushed continuously to drive the book clamping mechanism rotate so as to be perpendicular to the ground; the book basket transmission bracket of the book returning window is provided below the book returning mechanism, including a book basket lattice and an electric cylinder to drive the book basket to move on the transmission bracket of the returning window; a book basket carrying mechanism is provided beside the transmission bracket of the returning window, the book basket carrying mechanism including a rotating bracket body, on which a lift carrying cylinder of a book basket clamper is provided, the lift carrying cylinder of a book basket clamper being connected with the book basket clamper, said rotating bracket body rotating between the position above the book basket transmission bracket of the book returning window and the position above the temporary storage transmission line to accomplish the carrying from the book basket transmission bracket of the book returning window to the temporary storage transmission line.

Meanwhile, another key point of the improvement in the invention is that the book box tilts with some certain angle and is provided on a bookrack; the mechanical arms and the book basket bracket are provided on the laneway vehicle with the same inclination; an extending device at the laneway vehicle interface is connected with a L-shaped supporting seat, the upper end of which being connected with a telescopic rod, the lower end of the telescopic rod being connected with an adapter base through a pivot, the other end of the adapter base being connected with the lower end of the L-shaped supporting seat through a pivot, the lower end of the adapter base being connected with the book basket clamper, the telescopic rod being expanded for the adapter base to rotate the same inclination.

Moreover, an unattended full-automatic book management system is provided in the invention, characterized in that a full-automatic closed-shelf stack room and a book management system are included, a control system of the full-automatic closed-shelf stack room including a communication module for receiving instructions from the book management system; the book management system includes a collection system and a closed-shelf stack room management system, wherein the collection system includes a collection database, information on readers and information on book recognition are included therein; the closed-shelf stack room management system includes a database of closed-shelf stack room system, data information on said bookracks, the book box, the book basket, the laneway vehicle, the laneway vehicle interface, the transmission device, the book taking window, the book returning window and the book basket carrying device is stored inside the database of the closed-shelf stack room system; the data information inside the database of the closed-shelf stack room system is administered and operated by the closed-shelf stack room management system to accomplish the interaction between the collection system and the control system of the full-automatic closed-shelf stack room, the closed-shelf stack room management system including a module for generating an order for book taking, a module for dynamically assigning book baskets, a module for carrying out a book, a module for returning a book; the module for generating an order for book taking receives the information on readers and the identification information on books transmitted by the collection system, generates an order for book taking, and conveys the order for book taking to the communication module of control system of the full-automatic closed-shelf stack room; said order for book taking including at least information on readers, identification information on books and location information on onbook box; the function of said book returning module is to receive an in place signal of the book returned, assign a book box in the closed-shelf stack room according to the identification information on book of the book returned, and conveys the location information of the book box to the following book basket assignment module for book returned, meanwhile informing the control system of the full-automatic closed-shelf stack room to activate the book returning window to start book returning actions; the function of said module for dynamically assigning book baskets is to refresh dynamically the position information of the book basket where the book is located and the book lattice where the book is located and assign a book basket during the book exchange process for books at the organizing transmission line, a book basket assignment module for book taking and a book basket assignment module for returning a book are included in the module for dynamically assigning book baskets; among other things, the book basket assignment module for book taking assigns a book basket to temporary storage transmission line for borrowed books from different laneways, books corresponding to the orders for readers from each reader being carried inside the book basket being conveyed to the temporary storage transmission line; among other things, the book basket assignment module for returning a book assigns a book basket to the main transmission laneway for book returned according to the location information of a book box conveyed by the book returning module; said book taking module receives an in place signal of a reader and convey the number of the book taking window, the control system activating the corresponding book taking window to act.

There are apparent advantages as follows when above technical schemes are utilized.

1. A book basket for carrying books is used in the invention, only a single mechanical hand being provided on the laneway vehicle, and the actions of taking a book and returning a book can also be accomplished. The whole structure of the system is simplified, the materials are saved and the functions are enhanced during the transmission progress.

2. A single book box structure independent of a bookrack is used and light-weight, durable and antistatic materials are used, making the overall weight of a bookrack reduced, lifetime being extended. An individual book box can be targeted to be replaced if it is damaged, without repairing and replacing bookracks on a large scale, and the rate of books in store could be kept. The book box is provided obliquely on a bookrack, assigning the weight of books to the side bracket from the bottom bracket, thus enhancing the stability and lifetime of the bookrack.

3. A clamper controlled by an air cylinder is used by the mechanical hand of the laneway vehicle and is controlled to be rotated through rotating the air cylinder, the structure being simple, the fitting between the mechanical hand and the book basket making the structure of the whole laneway vehicle optimized.

4. A notch design fitting with fingers for book taking on the book clamping mechanism is provided on a side board of the book box and a bookend of the book basket, making the fingers for book taking stretching into the book box and the book basket easily, preventing the fingers from stretching into the title page of a book.

5. The concept of a book basket is used and a book basket clamper, a transmission device and an online book organizing mechanism are designed targeting the book basket, thus simplifying the framework of the whole system, replacing original double-layer transmission lines and a double-layer laneway vehicle interface.

6. The book basket on the temporary storage transmission line is designed for each reader, i.e., an order of each reader corresponds to a book basket on the temporary storage transmission line, status of all books can be examined one-time by the book taking window, and all books in one book basket can be taken one-time by a borrower.

7. The design of the book returning window and the book basket carrying device achieves the effect of batch examining books and batch returning books.

8. The books requested by one same reader and at the same time the book basket fully carrying the books returned by readers are included on the temporary storage transmission line, which exchanges books with the main transmission line at the online book organizing mechanism, the book basket fully carrying the books returned being positioned at the online book organizing mechanism, which conducts the act of returning through entering directly the main transmission line and the act of books exchange with the book basket on the main transmission line can also be accomplished herein. The book basket carrying the books borrowed on the main transmission line is positioned at the online book organizing mechanism, accomplishing the act of books exchange with the temporary storage transmission line.

BRIEF DESCRIPTION OF THE DRAWINGS

FIG. 5A to FIG. 5G are schematic structural views of the laneway vehicle in the invention, wherein FIG. 5E is a layout drawing of the electrical components in the laneway vehicle.

FIG. 6A to FIG. 6E are schematic structural views of the interface of the laneway vehicle in the invention, wherein FIG. 6C is a layout drawing of the electrical components in the interface of the laneway vehicle, and FIG. 6D and FIG. 6E are schematic views of actions of the book basket rotated by the interface of the laneway vehicle.

FIG. 7A to FIG. 7C are schematic structural views of the transmission lines in the invention, wherein the lay out of the electrical components of the transmission lines is annotated in FIG. 7C.

FIG. 8D and FIG. 8E are schematic structural views of the mechanism for book taking and book basket taking of the online book organizing mechanism.

FIG. 9A to FIG. 9D are schematic structural views of the book taking window in the invention, wherein FIG. 9D is a lay out of the electrical components of the book taking window.

FIG. 10A to FIG. 10C are schematic structural views of the book returning window in the invention, wherein FIG. 10B is a lay out of the electrical components of the book returning window.

FIG. 10G and FIG. 10H are schematic structural views of the book basket exchanging mechanism for the book returning window in the invention.

FIG. 10I to FIG. 10N are schematic structural views of the work flow of the book returning mechanism for the book returning window in the invention.

DETAILED DESCRIPTION

The present invention relates to an unattended full-automatic book management system, which includes a closed-shelf stack room book management system and a full-automatic closed-shelf stack room. An unattended full-automatic work flow of a library could be accomplished through the combination of the book management system and a control system of the full-automatic closed-shelf stack room.

1. The structural composition of the full-automatic closed-shelf stack room

The full-automatic mechanical structure of an unattended library, aiming at a full-automatic closed-shelf stack room, achieving functions as physical storage of books, mechanical conveying, books borrowing by readers, books returning by readers, books organizing, and damaged books processing, etc., is the physical foundation of the overall full-automatic library. Specifically speaking, the full-automatic closed-shelf stack room includes bookracks, a book box, a book basket, a book clamping mechanism, a laneway vehicle, transmission lines, an online books organizing mechanism, a book taking window, a book returning window and a book basket bracket carrying device, each device being coordinated to accomplish above functions of a library. The structures and the implementation flow of each composition part will be described in detail below.

Figure 1A:
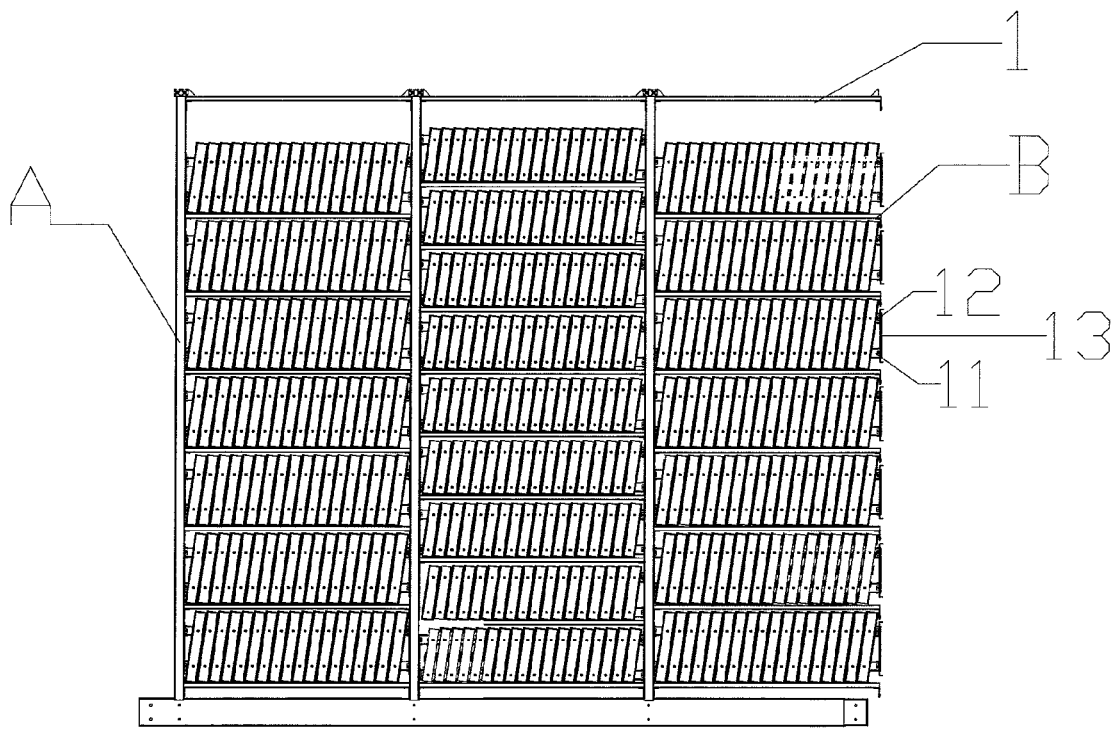
FIG. 1A to FIG. 1C are schematic structural views of the bookrack in the invention.
Figure 1B:
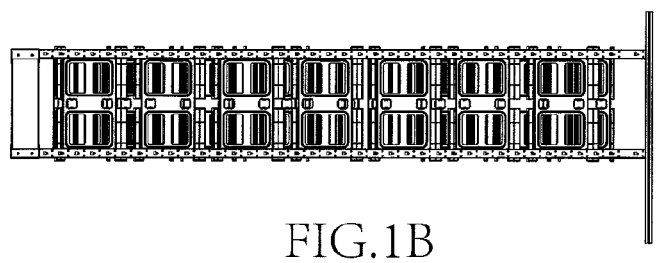
Figure 1C:
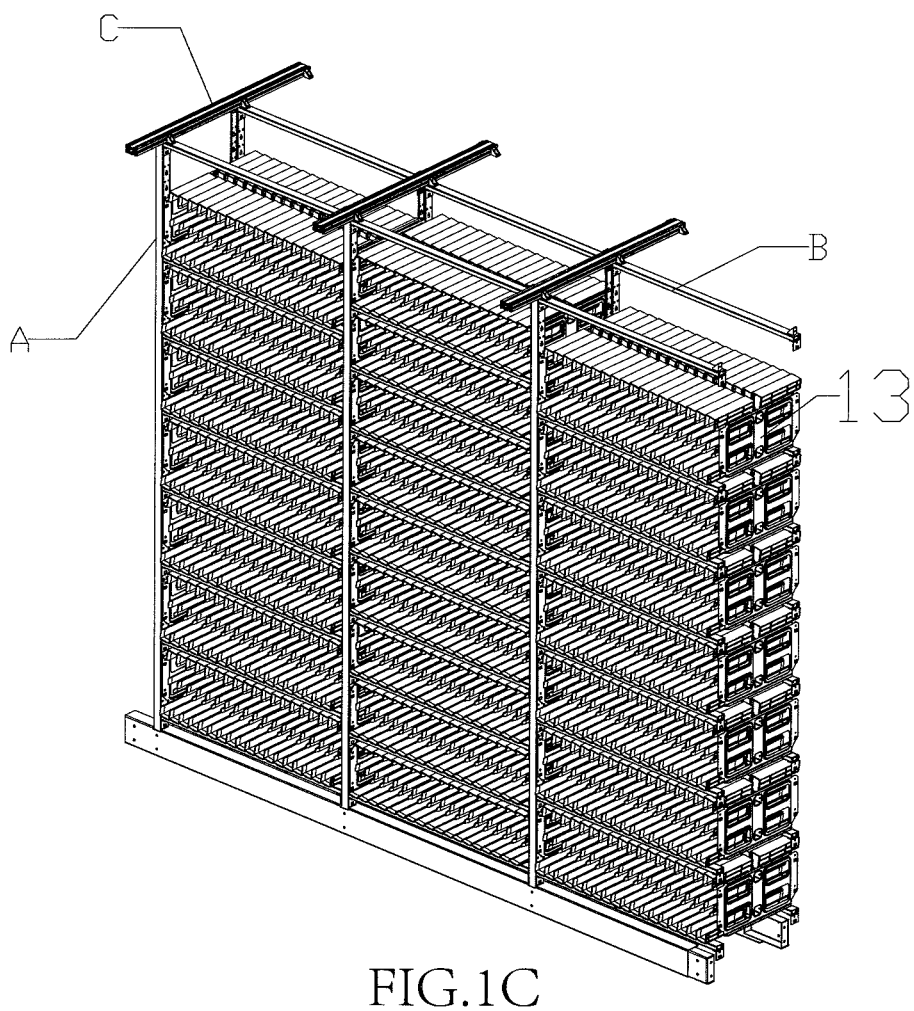

Firstly, please refer to FIG. 1A to FIG. 1C, which are schematic structural views of the bookracks in the invention. Novel improvement has been made to the bookracks by the invention to make the structure thereof easier, more economical and more practical, together with advantages for book box replacement in time and static generation prevention. Among other things, the bookracks include a frame 1 and a plurality of book boxes 2 mounted on the frame 1, the frame including a plurality of longitudinal columns A, a transverse columns B and the third columns C, a column being between two longitudinal columns, a row being between two transverse columns B, a supporting board being provided on the bottom of each row. A plurality of book boxes 2 are connected in parallel to form a group of book boxes, each group of book boxes 2 being fixed on the frame 1 through a connection member. Two groups of book boxes are provided back-to-back on each row of the bookracks in order to maximize the use of space.

The space between two transverse columns B, i.e., between the rows, can be configured to be different according to different book standards, such as 260 mm×185 mm, 184 mm×130 mm, 135 mm×85 mm, etc., books with some special thickness being also included. These are achieved completely by book boxes with different standards. The standards of book boxes with completely uniform standards (the book box of the largest book) required by some certain library can be designed according to different requirements of clients during the detailed design progress. Different storage regions, such as a storage region for 260 mm×185 mm, a storage region for 184 mm×130 mm, a storage region for 135 mm×85 mm, a storage region for books with special types, a region for mixed books, etc., can also be provided inside the closed-shelf stack room. Basic intelligence and information of books, for example, the size of a book, the title of the book, the author, the abstract of content, the publication date, the edition, etc., are recorded by RFID for books.

Please refer to FIG. 2A to FIG. 2D, which are schematic structural views for book boxes in the invention. The book box 2 includes the back board 21, the upper and lower board 22, 23, the left and right side board 24, 25. An upper and a lower mounting holes 210, 211 being provided on the back board 21, the book box 2 being fixed on the transverse connection rods 11, 12 through the mounting holes, the transverse connection rods 11, 12 being fixed on the longitudinal column A of the frame 1 through the connection board 13.

The book boxes, with a single structure independent of the bookracks, can be made of materials completely different from the frame, such as plastics, in order to decrease the cost of the fully metallic bookracks and stop static from being generated between metallic book boxes and metallic mechanical hands during use. The book boxes are damaged during use or are worn after a long time, and a single damaged book box or a single group of the book boxes can be replaced for flexibility, convenience and cost saving.

As shown in FIG. 1A, each book box 2 is mounted on the transverse connection rods 11, 12 with an inclination, the book box being leaned against an adjacent book box. with an inclination in turn, the angle of inclination being 7 degrees to 9 degrees. The angle of inclination of 8 degrees is used in the present embodiment. The volume of a book box is larger than that of a book and a book may incline as the same angle as that of a book box due to the weight itself and the inclination of the book box when it is put into the book box, and the weight of a book downward may be assigned partially to the sides of the hook box and even to the longitudinal columns of the bookrack, strengthening the stability of book and the whole stability of bookrack, contributing to enhance the lifetime of bookrack. Meanwhile, the book inclines toward the book box and at least the fingers on one side do not contact with any book at all when the fingers for book taking of the laneway vehicle stretch into the two sides of the book box. The fingers for book taking would not be inserted into any title page of a book on the corresponding side.

Figure 2A:
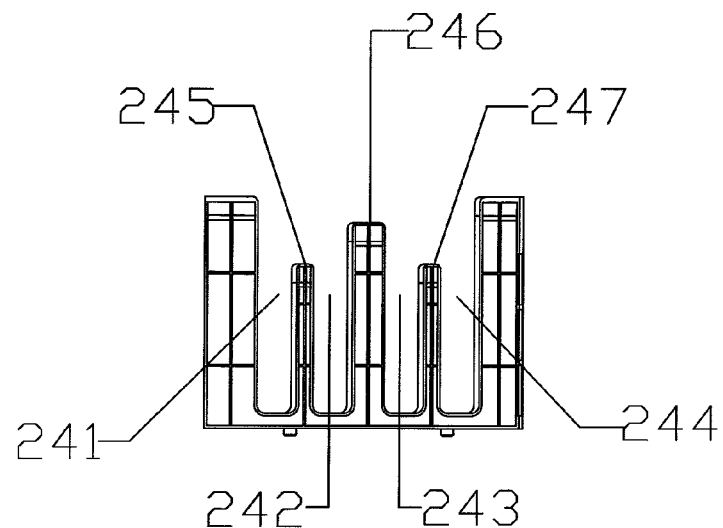
FIG. 2A to FIG. 2D are schematic structural views of the book box in the invention.
Figure 2C:
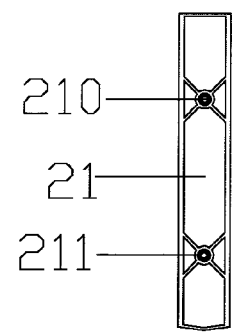
Figure 2B:
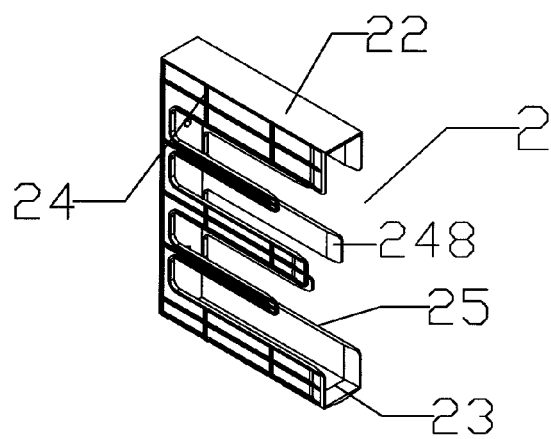
Figure 2D:

A notch on a book box fitted with the fingers for the book clamping mechanism is needed to be configured on the side board of the book box 2 for the convenience of the action of book taking and book returning of the book clamping mechanism, the book clamping mechanism being inserted to take a book at its convenience. As shown in FIG. 2A and FIG. 2B, take the left side board 24 for example, the first jack 241, the second jack 242, the third jack 243 and the fourth jack 244 are provided thereon, the first partition board 245 being provided between the first jack 241 and the second jack 242, the second partition board 246 being provided between the second jack 242 and the third jack 243, the third partition board 247 being provided between the third jack 243 and the fourth jack 244. The second partition 246 is provided lower than the height of the board body of the left side board, the height of the first partition board 245 being the same as that of the third partition board 247, both of which are lower than the height of the second partition board 246. Meanwhile, guiding portions 248 are provided at the end of the left board, the right board and said partition boards, respectively in order that a book is placed therein and the book clamping mechanism is inserted.

Figure 3A:
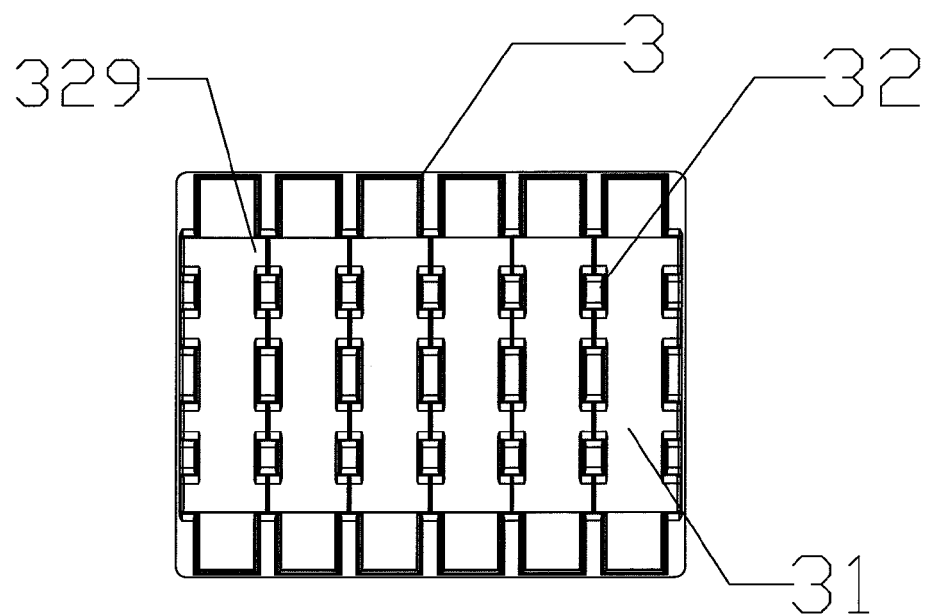
FIG. 3A to FIG. 3B are schematic structural views of the book basket in the invention.
Figure 3B:
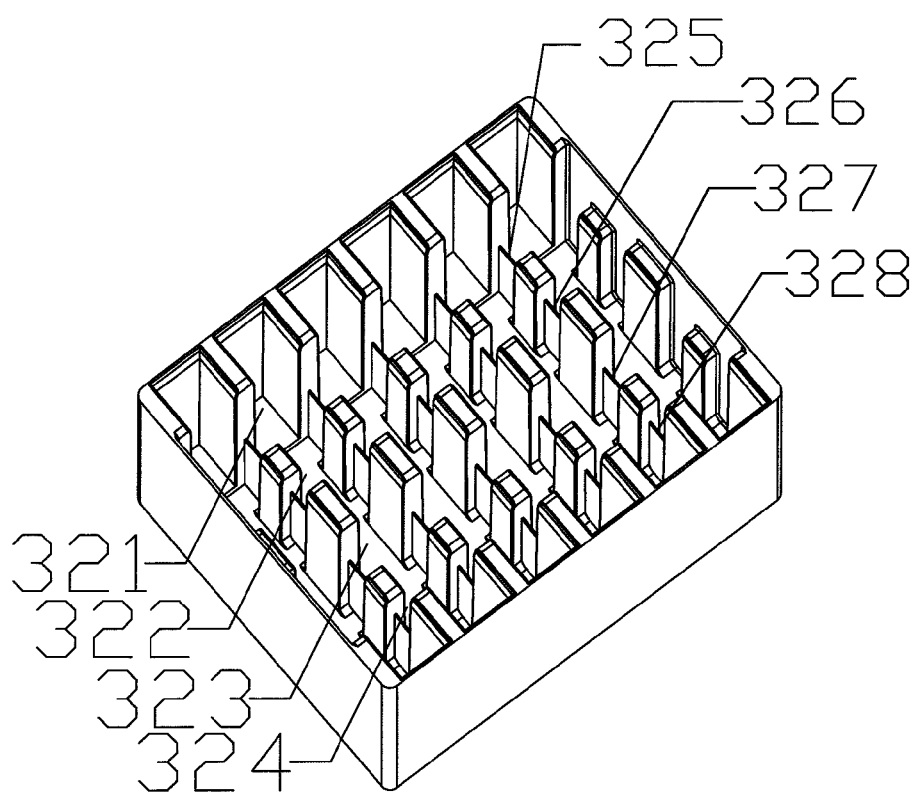

Please refer to what are shown in FIG. 3A and FIG. 3B, the figures are schematic structural views of the book box in the invention. The book box is a container for holding books during the batch transmission process for books. The mechanical hand and the main transmission laneway are simplified by the book box and the configuration of temporary storage bookracks is canceled. As to the structure of the book box, specifically speaking, the book box 3 includes a plurality of book lattices, each book lattice being partitioned by a bookend. An entrance for stretching a finger that is fitted with the fingers for book taking is provided on the bookend. At most 6 books can be borrowed with each order from each student according to the current situation of book borrowing and returning in the present book management system during the implementation of the invention, and each book box includes 6 book lattices in the design of a book box. The book lattices 31 are partitioned through the bookend 32, an entrance for stretching the fingers that provides convenience to fit with the book taking hand of the book clamping mechanism being provided on each bookend 32. The bookend is of high requirements in thickness and strength compared to the structure of the book box, the thickness and strength of the bookend being higher than those of the side boards of the book box in order to support the stress during the transmission process at a high speed. Please refer to what is shown in FIG. 3, the bookend is formed by thin boards and thick boards in turn, the height of a thin board being less than that of a thick board, the height of a thick board in the middle being less than the thick boards on the edge of both sides. The first notch 321, the second notch 322, the third notch 323 and the fourth notch 324 are provided on the upper end of the bookend 32, the first thin board 325, the second thin board 326, the third thin board 327 and the fourth thin board 328 being correspondingly provided on the lower end of said notches. A guiding groove 329 is formed between the thin board and the adjacent thick board, and the fingers for book taking of the book clamping mechanism could enter the corresponding notch and be inserted into the bottom of the book lattice along the guiding groove.

Please refer to what are shown in FIG. 4A to FIG. 4D, the figures are schematic structural views of the book clamping mechanism in the invention. An action of book taking and returning, actions for book taking and exchange used in the laneway vehicle, the book organizing window, the online book organizing window, the book taking window and the book returning window are accomplished by the book clamping mechanism fitted with the book box and the book basket. Specifically speaking, the book clamping mechanism 4 includes a fixed rail 41, the first palm 42 and the second palm 43 with the same structure and corresponds with each other being connected on a sliding rail 45 of the fixed rail 41. Take the first palm 42 for example, the end of the palm is fixed on a guiding slider 44 through a cranked board, the guiding slider being fitted with the sliding rail 45 on the fixed rail 41, and the driving mode of the guiding slider and the sliding rail is that a gear and a gear belt being fitted with each other through an internal gas drive to achieve synchronous clamping and releasing.

Figure 4A:
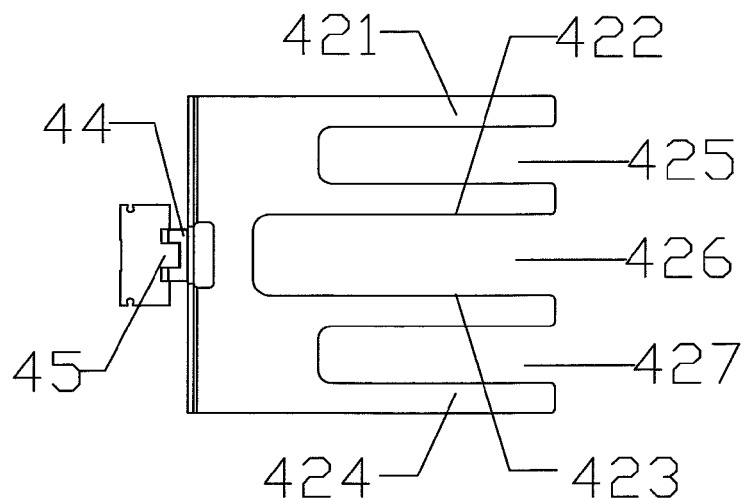
FIG. 4A to FIG. 4D are schematic structural views of the book clamping mechanism in the invention.
Figure 4B:
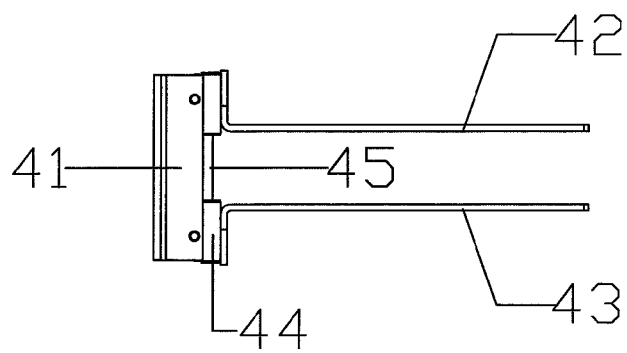
Figure 4C:
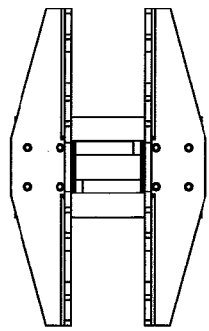
Figure 4D:
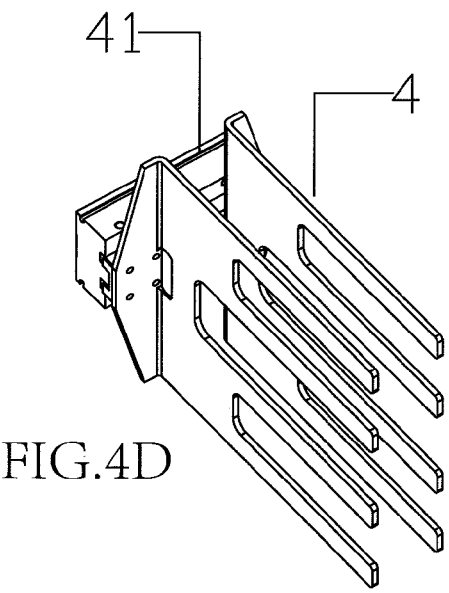

Fingers for book taking are provided on said palms, said fingers for book taking corresponding with the notch on the book box and the entrance for stretching a finger for a book on the book basket so as to take a book from the book box and the book lattice and release a book onto the book box and the book lattice. Specifically speaking, said book clamping mechanism includes the first finger 421, the second finger 422, the third finger 423 and the fourth finger 424, the first finger gate 425, the middle finger gate 426 and the second finger gate 427 being provided between two fingers, wherein the depth of the middle finger gate 426 is larger than that of the first finger gate and the second finger gate. Please refer to what are shown in FIG. 2A and FIG. 4A, the fingers for book taking on said book clamping mechanism correspond to the first jack 241, the second jack 242, the third jack 243 and the fourth jack 244 on the side board of the book box successively, said first finger gate 425, middle finger gate 426 and second finger gate 427 corresponding to the first partition board 245, the second partition board 246 and the third partition board 247 successively, in order to achieve correspondence between each other. The numbers of the notches of the book box, the entrance for stretching a finger of the book basket and the fingers for book taking are not limited only in the present embodiment and are proper when it is convenient to take a book.

Figure 5A:
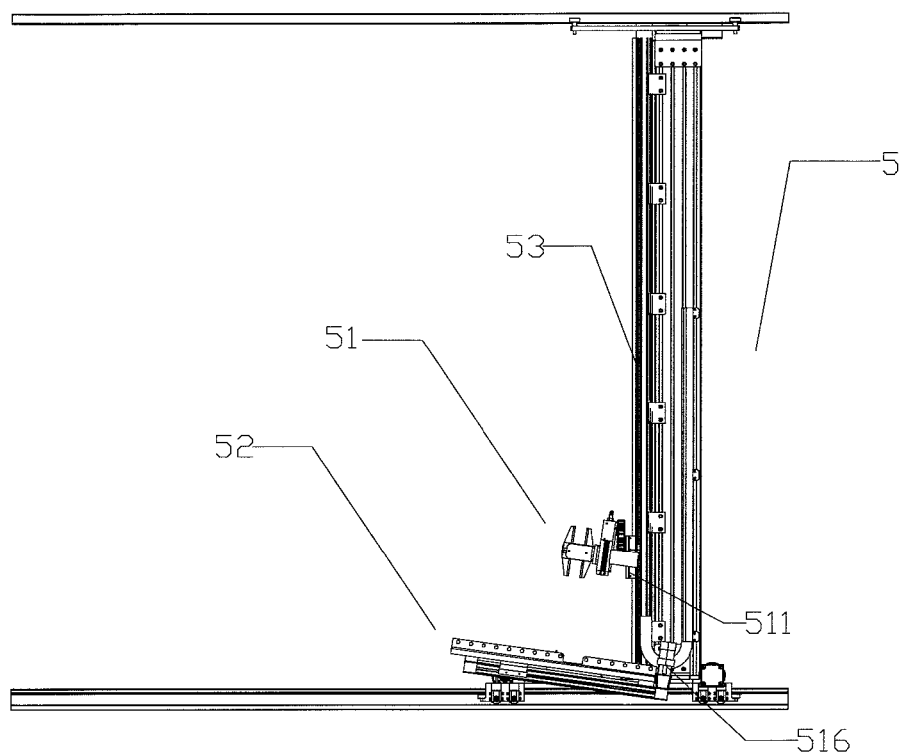

Please refer to what are shown in FIG. 5A to FIG. 5G, the figures are schematic structural views of the laneway vehicle in the invention. The laneway vehicle 5 runs in the laneway formed among the bookracks. The laneway vehicle 5 is fixed relative to the rail through the fitting mode of a pulley and the sliding rail and relatively slides through the driving mode of a motor. Please refer to what is shown in FIG. 5A, the laneway vehicle 5 includes two functional parts: a mechanical arm 51 and a book basket bracket 52, the mechanical arm 51 being mounted on the longitudinal sliding rail 53 of the laneway vehicle and moves upward and downward through a rail motor 54 and a corresponding gearing device. Specifically speaking, the book clamping mechanism 4 is mounted on the mechanical arm 51 and is connected with a rotation device 513, which is mounted on the linear guiding device L, the linear guiding device being mounted on a fixed slider 511, the mechanical arm 51 being connected with a longitudinal sliding rail 53 of the laneway vehicle through the fixed slider 511, said book basket bracket 52 being located under the mechanical arm.

Among other things, the linear guiding device is provided perpendicular to the direction of the laneway and includes the linear guiding rail L and the parts connected therewith are driven to move linearly by an internal driving motor and a transmission track T. Said rotation device 513 is a rotating gas cylinder, the back end of which is connected to the linear rail L through a gas cylinder slider 514 and moves linearly on the linear rail L driven by the driving motor and the transmission track T. Exchanges on a horizontal direction and a vertical direction are achieved through the connection and driving between the rotation end of the rotation gas cylinder 513 and the book clamping mechanism 4 through the L-shaped board 515 and the fixed rail 41 of the book clamping mechanism 4.

The book box is inclined with some certain angle in the invention. Accordingly, the mechanical arm 51 and the book basket 52 are required to be inclined as well, the inclination of which is the same as that of the book box. Specifically speaking, an inclined fixed board 512 is provided between the fixed slider 511 and the linear guiding device, the inclination of the inclined fixed board being the same as that of the book box and thus the linear guiding device, the rotation device and the book clamping mechanism connected thereto are inclined, the inclination of the whole mechanical arm being the same. The fingers for book taking and the side wall of the book box are parallel when a book is clamped by the book clamping mechanism.

Figure 5B:
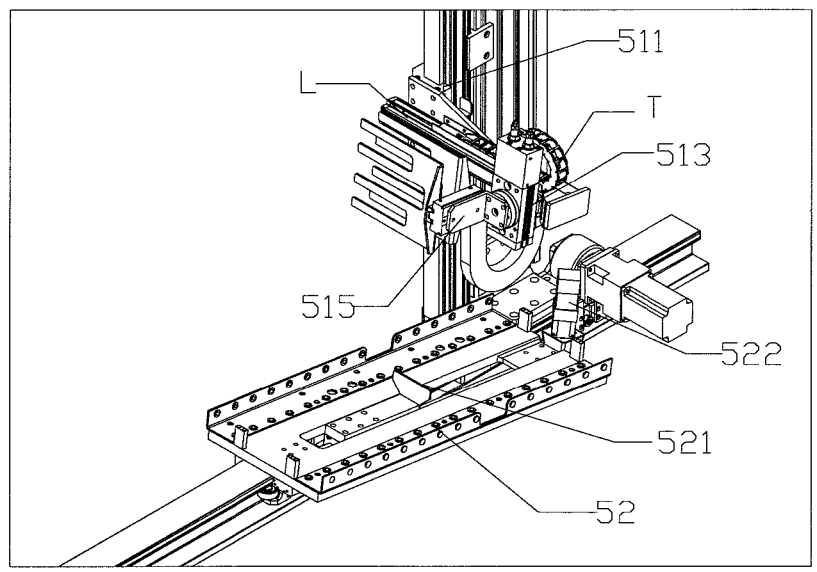
Figure 5F:
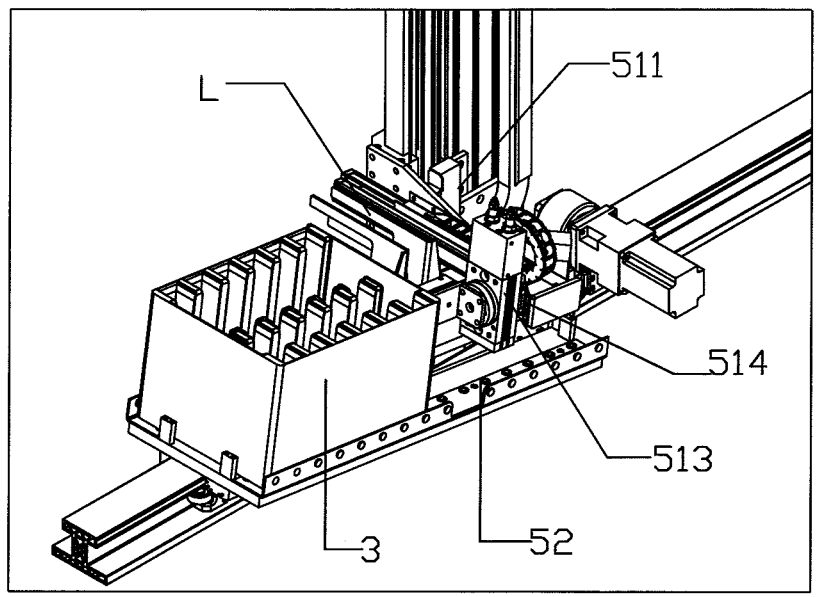
Figure 5G:
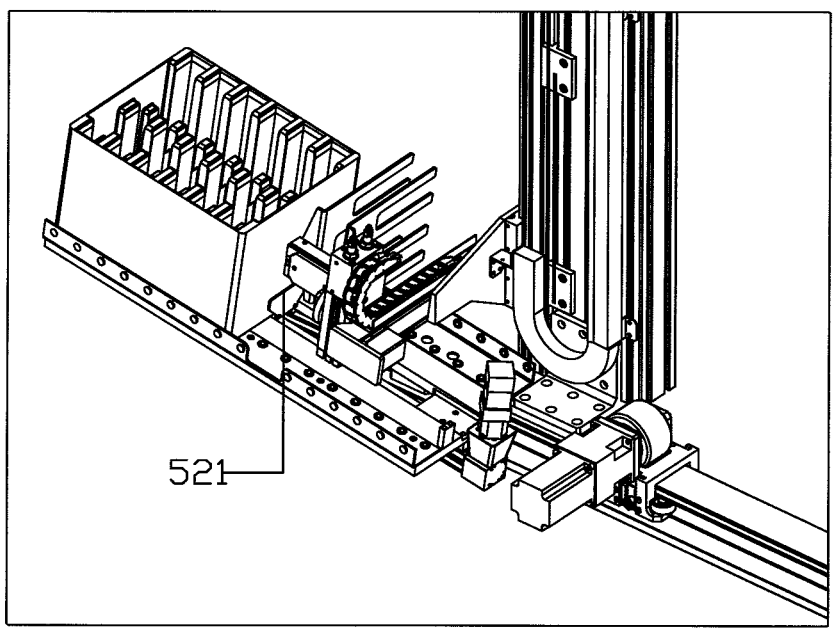

As shown in FIG. 5B, the book basket bracket 52 is located under the mechanical arm 51, the length of the book basket bracket 52 being several times longer than that of the book basket, a limiting baffle of the book basket 521 being provided on the book basket. The limiting baffle of the book basket 521 moves through the baffle driving device of the book basket, which is an electrical cylinder 522. One book basket is carried by the book basket in the present embodiment; the length of the book basket bracket 52 is two times of the book basket, the limiting baffle of the book basket 521 being provided at the center location. The book basket may be moved from one end of the book basket to another end by the limiting baffle of the book basket 521 driven by the electrical cylinder 522, thereby receiving a plurality of books released by the mechanical arm in turn. The book basket may also be moved from one end of the book basket bracket to another end by a direct traction through a traction device in the invention.

The action of taking a book out of the book box is accomplished by the cooperation of the book basket on the book basket bracket and the book clamping mechanism. Therefore, the book basket bracket 52 should be fixed to the bottom of the laneway vehicle through a supporting bracket 516 when the book box is inclined, the inclination of the supporting bracket 516 being the same as that of the book box. The limiting baffle of the book basket 521 is moved rightward (bottom right) to a book lattice position driven by the electrical cylinder 522, the first book being released into the book lattice of the book basket by the fingers for book taking after a 90 degrees rotation. Books are taken in turn by the fingers for book taking, the book basket being moved step by step by the electrical cylinder to the right (bottom right) so that books are released into different book lattices of the book basket.

Please refer to what are shown in FIG. 6A to FIG. 6E, the figures are schematic structural views of the interface for laneway vehicle in the invention, and the interface for laneway vehicle is provided as a basket exchange mechanism between the entrance of a laneway and the main transmission line to accomplish a bidirectional exchange on the laneway vehicle and the main transmission line. Please refer to FIG. 12A at the same time, an overall supporting bracket M is provided aside of the main transmission line, the interfaces 6 for laneway vehicle being provided in turn on the overall supporting bracket M to correspond with each entrance of the laneways. The overall supporting bracket M includes a column and a horizontal supporting bracket corresponding to each laneway.

Figure 6A:
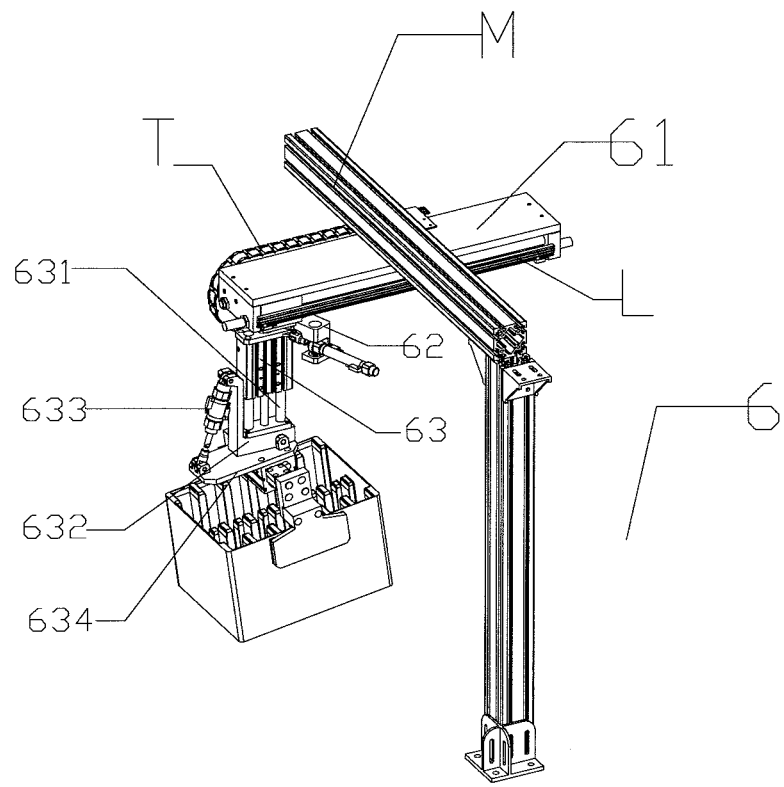
Figure 6B:
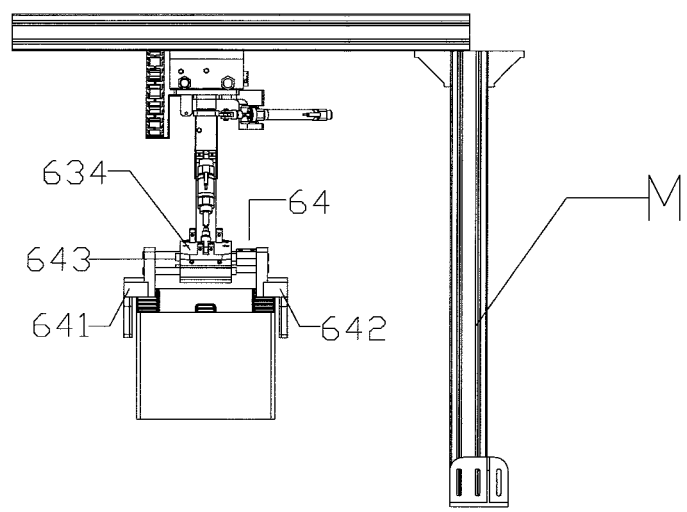

As shown in FIG. 6A and FIG. 6B, a book basket clamper 64 is provided on the interface 6 of a laneway vehicle, the book basket clamper 64 being fixed on an extension device 63, which is connected with a rotation device 62 for the book basket clamper, the rotation device 62 for book basket clamper being connected with a linear guiding device L of the interface of a laneway vehicle, the linear guiding device L of the interface of a laneway vehicle being extended in a direction from the transmission device to the laneway vehicle.

Figure 6C:
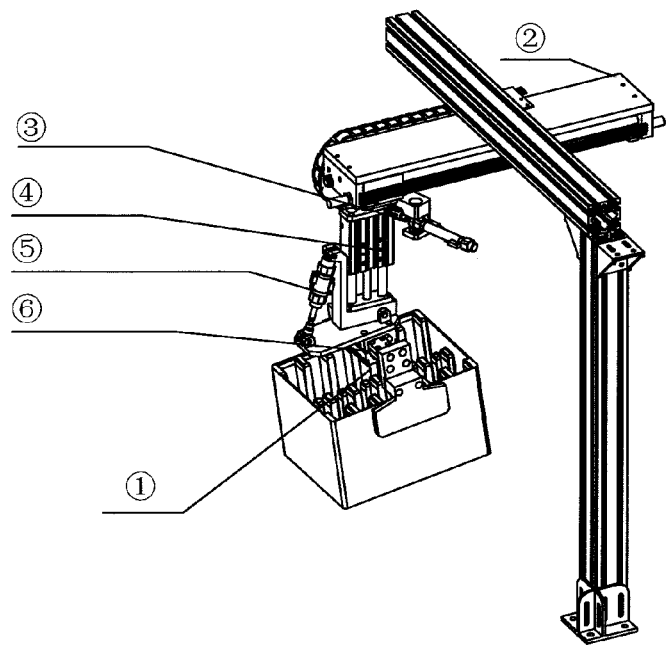
Figures 6D, 6E:
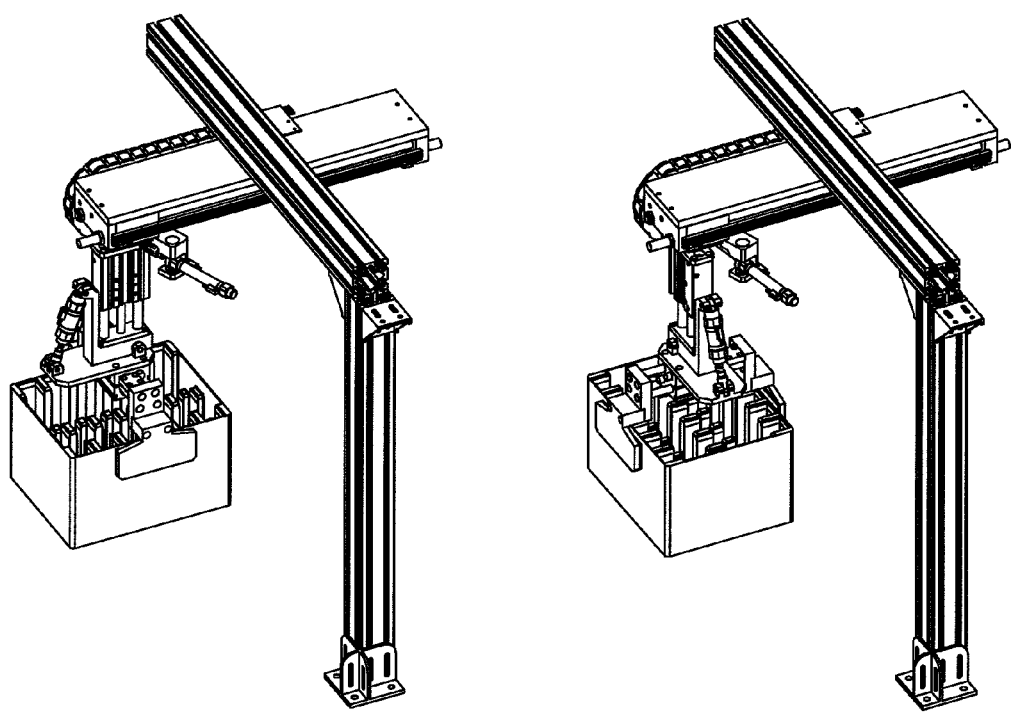

The interface 6 for laneway vehicle is fixed on the horizontal bracket of the overall supporting bracket M through an interface connecting bracket 61, which is perpendicular to the horizontal bracket. Said linear guiding device of the interface of a laneway vehicle includes a linear guiding rail L and the parts connected therewith are driven to move linearly by an internal driving motor and a transmission track. T. The extension device 63 is a telescopic cylinder and an extension arm 631 is provided on the lower end thereof. Please refer to what are shown in FIG. 6D and FIG. 6E, the rotation device 62 for book basket damper is a. rotating gas cylinder, the extension arm 631 being driven by the rotating gas cylinder to accomplish a 90 degrees rotation for the purpose of releasing the book basket from the laneway vehicle after a 90 decrees rotation on the main transmission line.

Also, a book basket clamper for the interface of a laneway vehicle should be inclined the same angle due to the inclination configuration of the book basket bracket for the convenience of receiving the book basket on an inclined book basket bracket from a laneway vehicle. Specifically speaking, an L-shaped supporting base 632 is connected with the lower end of said extension arm 631, the upper end of the L-shaped supporting base 632 being connected with an extension rod 633 through a rotation shaft, the lower end of the extension rod 633 being connected with an adapting base 634 through a rotation shaft, the other end of the adapting base 634 being connected with the lower end of the L-shaped supporting base 632 through a rotation shaft, the lower end of the adapting base 634 being then connected to the book basket clamper 64. As shown in FIG. 6C, the adapting base 634 may be rotated counter-clock wise with some certain inclination angle from a horizontal position with the action of extension of the extension rod 633, the inclination angle being the same as that of the book box so that the book basket clamper on the interface of the laneway vehicle is relatively parallel to the book basket on the laneway vehicle for the action of taking the book basket.

Please refer to what is shown in FIG. 6B, the book basket clamper 64 is a pickup part of the book basket and includes the first claw-board 641 and the second claw-board 642. The action to clamp a basket for clamping a book basket is accomplished by the two claw-boards driven by an internal gas cylinder 643.

As shown in FIG. 7A to 7C, the figures are schematic structural views of the transmission device in the invention. Said transmission device includes the main transmission line and the temporary storage transmission line, both of which being a single-layer closed circulation transmission line to transmit a book basket circularly and being configured parallel to one another. A transmission line bracket 71 is provided to the transmission device 7, a transmission line 72 being mounted on the transmission line bracket 71, several book basket bases 73 being provided on the transmission line 72, a book basket limiting position 731 being provided on the book basket base 73. The book basket limiting position 731 is a folded board structure provided on the four corners of the book basket base in the embodiments of the invention. According to the functional partition, the main transmission line 7A is responsible for transmitting the book basket carrying borrowed books from a laneway or the book basket carrying books returned for a laneway, the temporary storage transmission line 7B being responsible for transmitting the book basket carrying borrowed books from a reader or the book basket carrying books returned. Said bookracks are provided aside the main transmission line and the main transmission line may be designed as any closed shapes according to the scale of books.

Figure 8A:
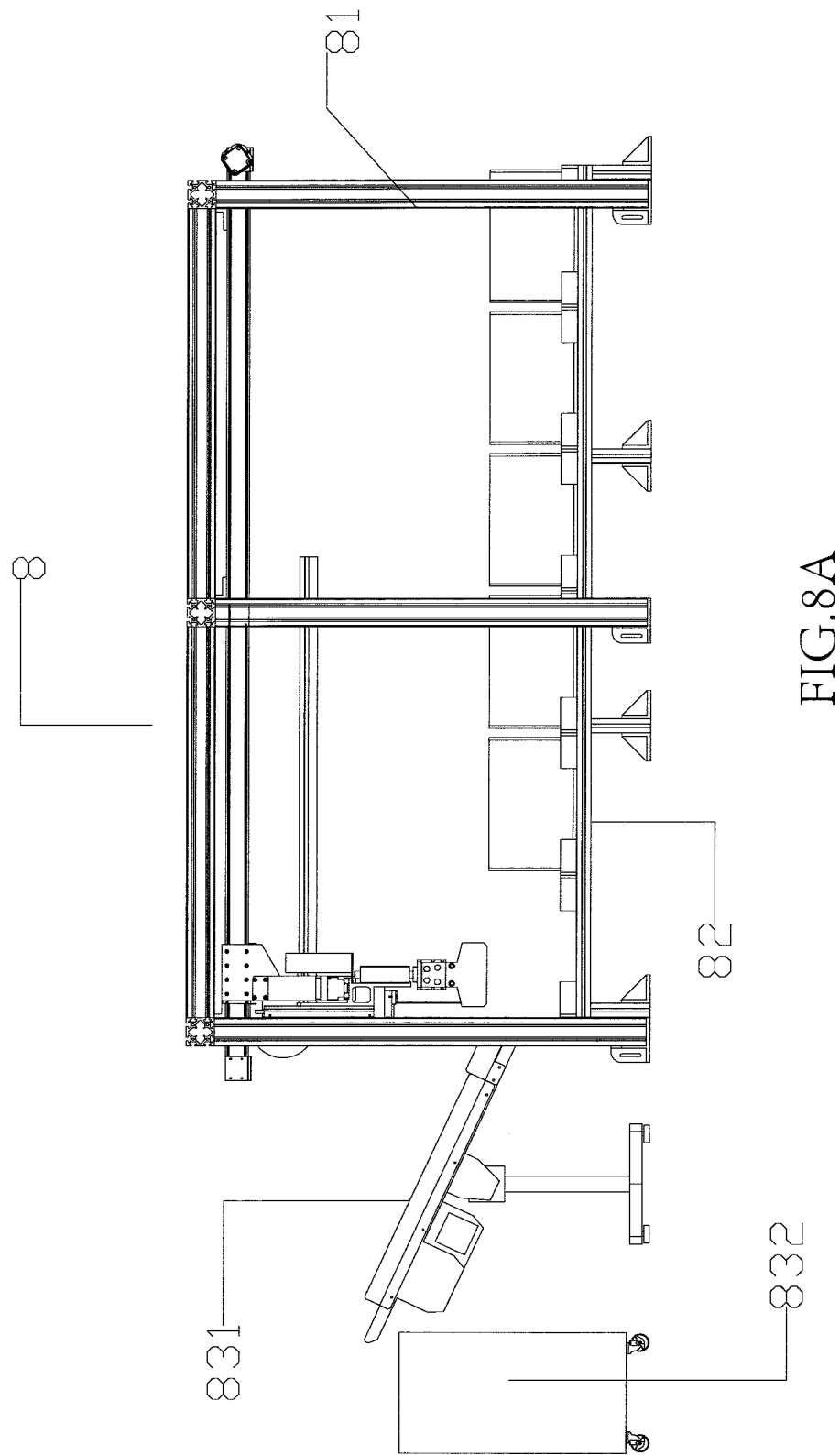
FIG. 8A to FIG. 8C are schematic structural views of the online book organizing mechanism in the invention, wherein the lay out of the electrical components of the online book organizing mechanism is annotated in FIG. 8C.
Figure 8B:
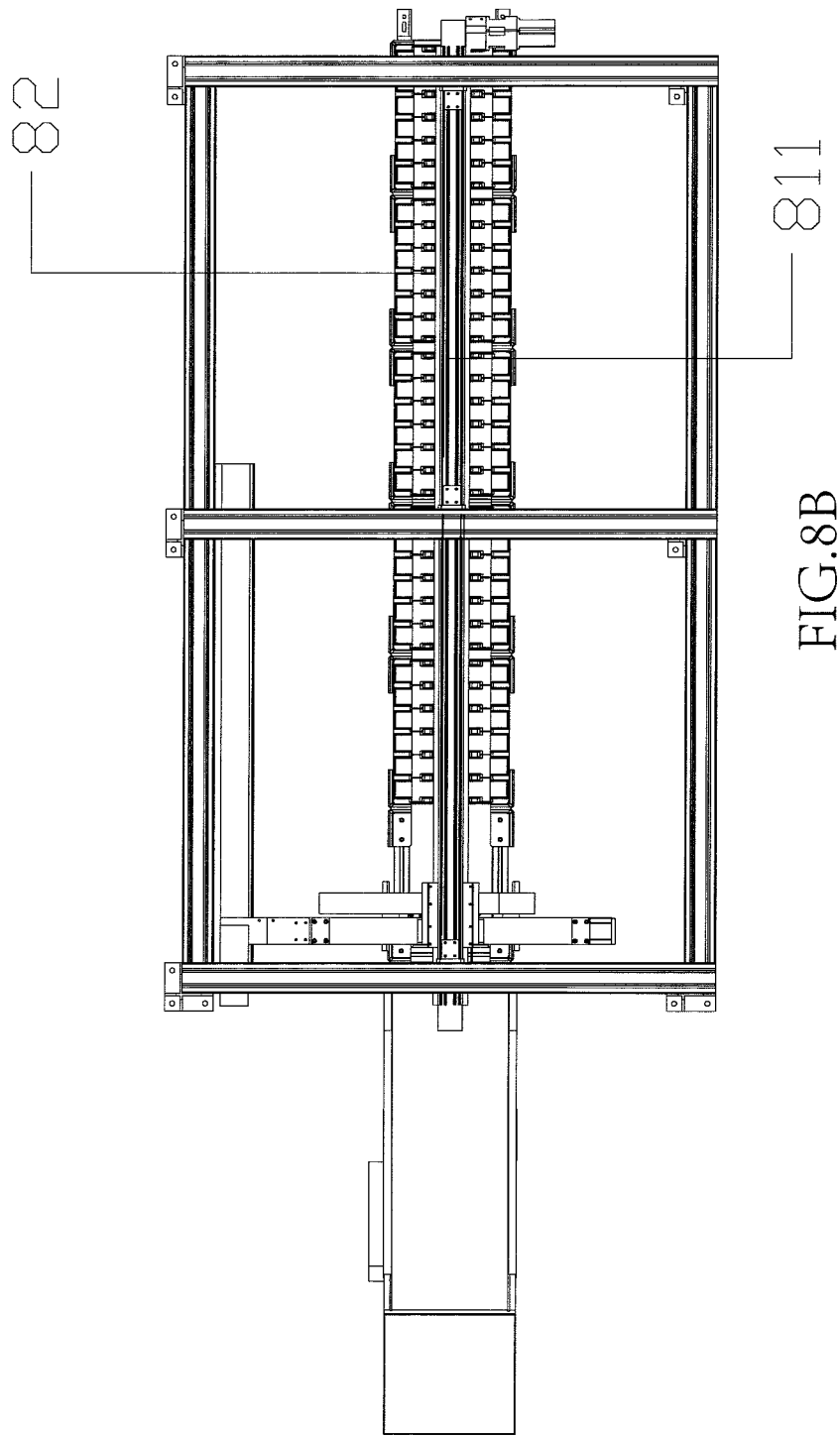
Figure 8C:
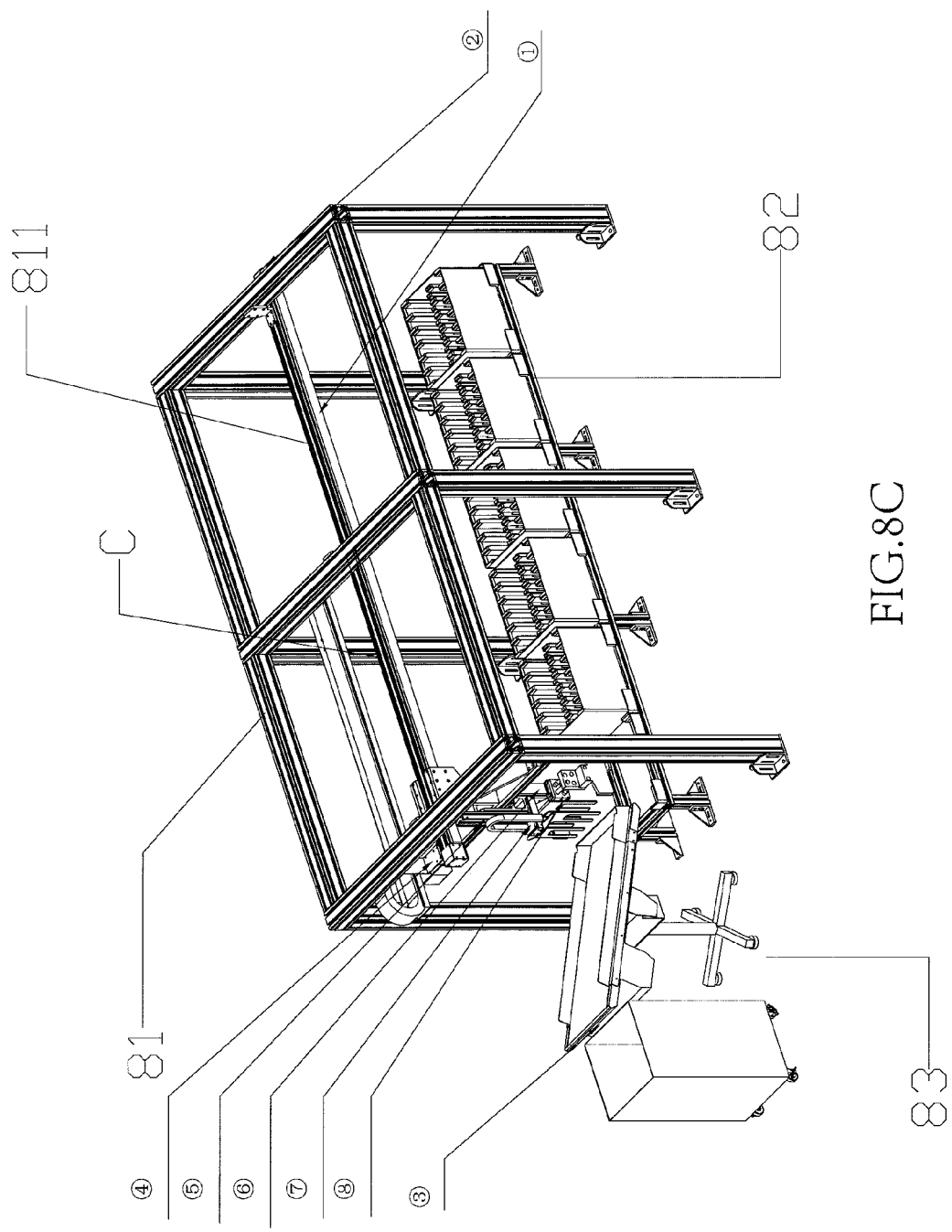
Figure 12A:
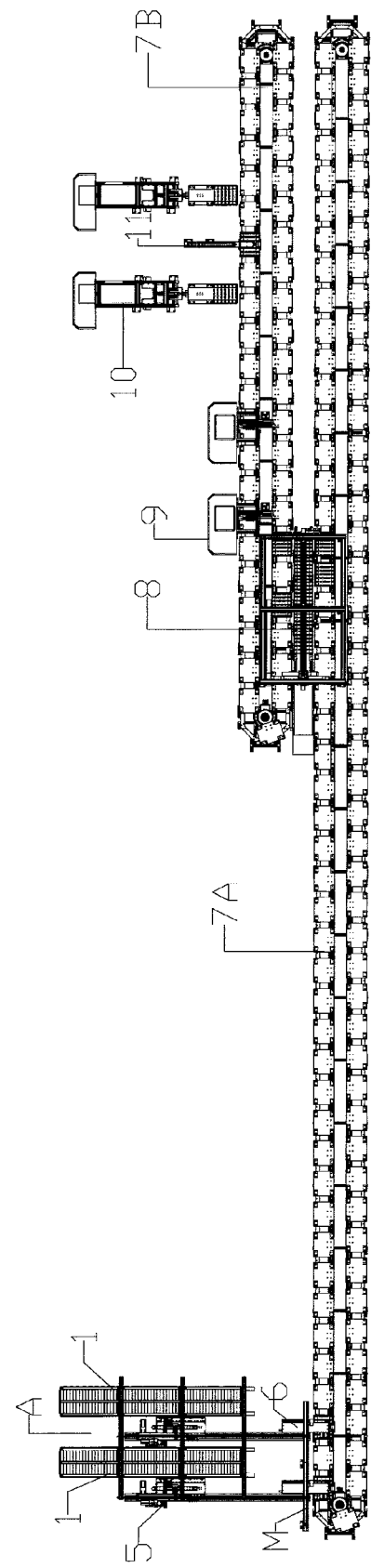
FIG. 12A to FIG. 12C are overall schematic views of the technical scheme of the invention.
Figure 12B:
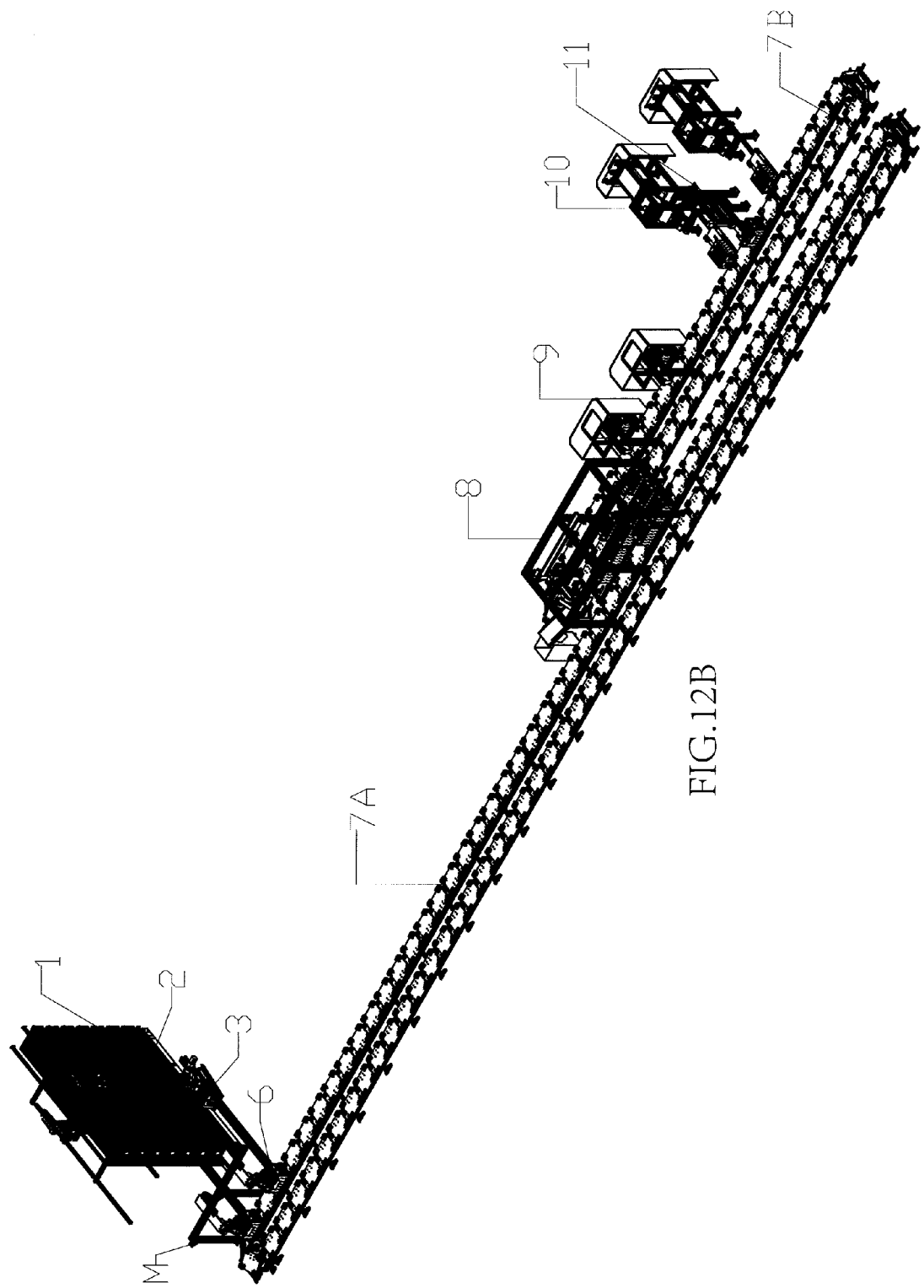

Please refer to what are shown in FIG. 8A to FIG. 8C, the figures are schematic structural views of the online book organizing mechanism in the invention. The online book organizing mechanism includes a supporting bracket 81 for organizing books, a book taking and basket exchanging mechanism 84 an organizing transmission line 82 and a book collection device 83. Please refer to what are shown in FIG. 12A and FIG. 12B at the same time, the supporting bracket 81 for organizing books is provided across the main transmission line 7A and the temporary storage transmission line 7B, the organizing transmission line 82 being provided parallel to the main transmission line 7A and the temporary storage transmission line 7B, a book basket or a book on the main transmission line 7A and the temporary storage transmission line 7B being exchanged through the book taking and book returning mechanism and the organizing transmission line 82.

Figure 8E:
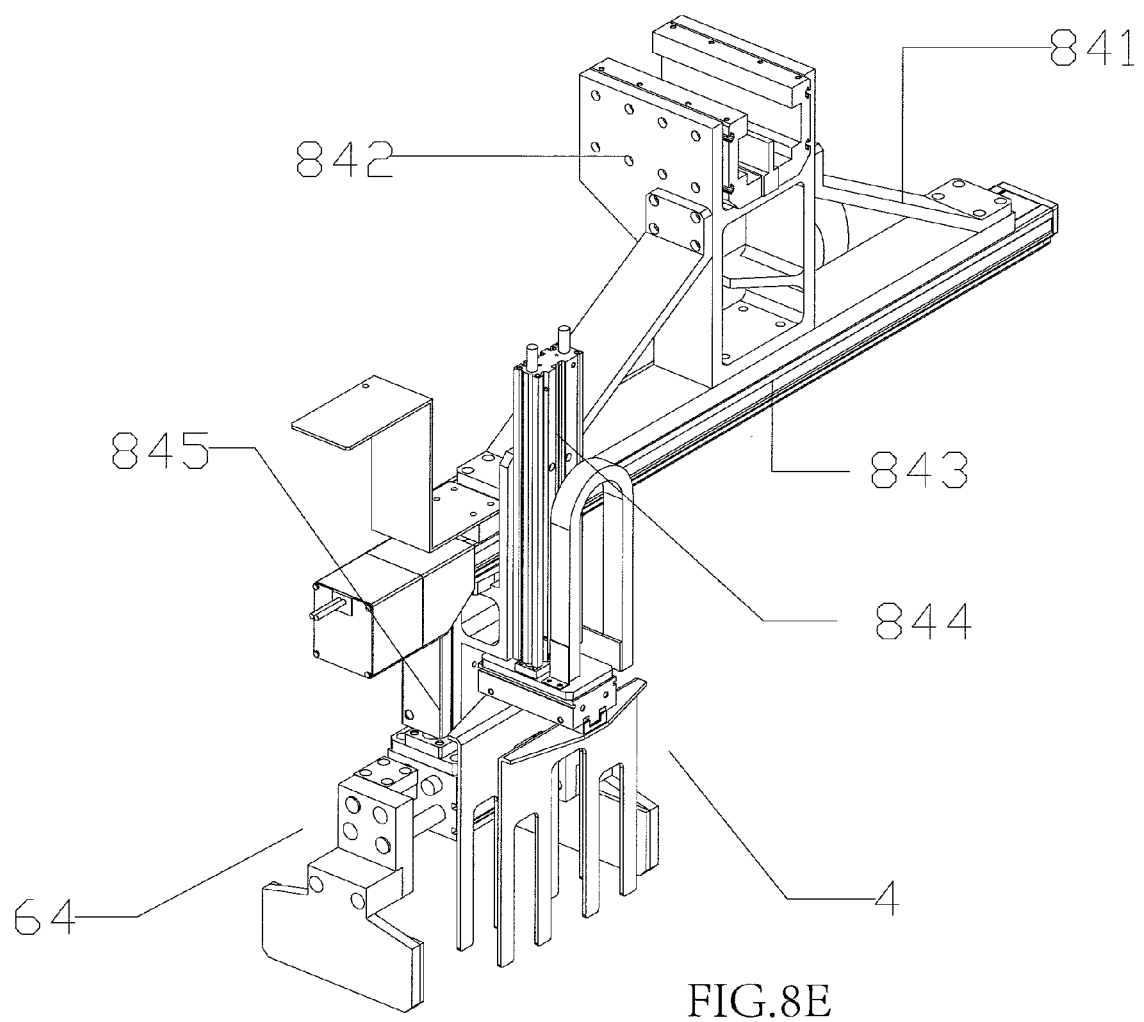

As shown in FIG. 8C, the organizing transmission line 82 is provided at the middle position of the lower end of the supporting bracket 81 for organizing books, the main transmission line 7A and the temporary storage transmission line 7B being the two side adjacent thereto. The book taking and basket exchanging mechanism 84 is provided on the supporting bracket 81 for organizing books. Please refer to what are shown in FIGS. 8D and 8E, the book taking and basket exchanging mechanism 84 is provided on the supporting bracket for organizing books and the first linear guiding device 811 parallel to the organizing transmission line, the first linear guiding device 811 being located above the organizing transmission line, a slider bracket 841 being connected with the first linear guiding device 811 through a slider 842, the second linear guiding device 843 perpendicular to the first linear guiding device 811 being provided on the slider bracket 841. Among other things, the first linear guiding device includes a liner guiding rail and the parts connected therewith are driven to move linearly by a driving motor and a transmission track. The length of the first linear guiding device 811 is larger than that of the organizing transmission line so that the operation space of the mechanism for book taking and book basket taking is from the beginning to the end of the organizing transmission line 82. Said second linear guiding device may be a translational gas cylinder, the length of which crossing the main transmission line, the organizing transmission line and the temporary storage transmission line so that the operation space of the mechanism for book taking and book basket taking is along the three transmission lines. The mechanism for book taking and book basket taking includes a lifting gas cylinder 844 of a book clamping mechanism and a lifting gas cylinder 845 of a book basket clamper provided on the second linear guiding device 843, both of which connecting with the book clamping mechanism 4 and the book basket clamper 64 for book clamping, respectively to drive the book clamping mechanism 4 and the book basket clamper 64 for book clamping to move upward and downward.

Temporary positions for storing book baskets is provided on the organizing transmission line 82 as a temporary storage space for exchanging book baskets, the number of temporary positions being increased or decreased according to the system capacity and the frequency to borrow books, and the length of the organizing transmission line may also be increased or decreased according to the system capacity and different library designs.

A detection device is provided at the online book organizing mechanism according to system requirements to be responsible for checking whether any RFID tags cannot be recognized. If any RFID tag cannot be recognized, the book with unrecognizable information would be collected. Please refer to what are shown in FIGS. 8A and 8C, a book collection device 83 is provided to the system, including a collection transmission line 831 and a book storage basket 832. A book is taken by the book clamping mechanism 4 at the online book organizing mechanism, released on the collection transmission line 831 and is transmitted to the book storage basket 832 through the collection transmission line 831, when the book is detected with some error. The collection transmission line 831 may be a transmission belt provided upswept or may be a sliding board directly inclined downward in the present embodiment, the lower end of which being connected with the book storage basket, books slipped directly to the sliding board, making it easy and without any driving devices.

The work content of the online book organizing mechanism is that the book basket carrying borrowed books is placed on the organizing transmission line 82 after its arrival, the books borrowed by the same one reader in different book baskets being arranged in the same book basket at the organizing transmission line, then the book basket carrying books borrowed by the same reader being arranged on the temporary storage transmission line, waiting the reader to take the books, the cleared book basket on the organizing transmission line taking part in exchanging the returned books. Meanwhile, the book basket fully carrying the returned books from the temporary storage transmission line is arranged on the organizing transmission line 82 first to determine whether it can enter directly the main transmission line. The books are exchanged thereon if the sizes of the books in the book basket belong to different regions and the books belong to different regions being exchanged to different book baskets, then the book basket fully carrying returned books being exchanged to the main transmission line and being transmitted to different laneways through the main transmission line.

Please refer to FIG. 9A to FIG. 9D, the figures are schematic structural views of the book taking window in the invention. The book taking window 9 includes a supporting bracket at the exit 91, which includes two layers, the lower-layer being a book basket layer 911, a window baffle 912 being provided on the upper-layer. The window baffle 912 is controlled to open through an open gas cylinder 913, the book basket bracket 911 being moved upward and downward through a bracket lifting gas cylinder 92. A detection device is provided at the window baffle to detect whether any book is taken.

The book taking window 9 further includes an in-line supporting bracket 93 across the temporary storage transmission line, a translational mechanism 94 being provided on the in-line supporting bracket 93, the translational mechanism 94 being extended to the supporting bracket at the exit 91 from the in-line supporting bracket 93. An elongation board 95 is provided on the translational mechanism 94, one side of the elongation board 95 being fixed above the translational mechanism 94 and the other side having an elongation section 951, which is moved above the book basket bracket 911 through the translational mechanism 94, a lifting gas cylinder 96 for book basket clamper being provided on the elongation section 951. Said translational mechanism 94 is a translational gas cylinder for book basket clamper.

Figure 9A:
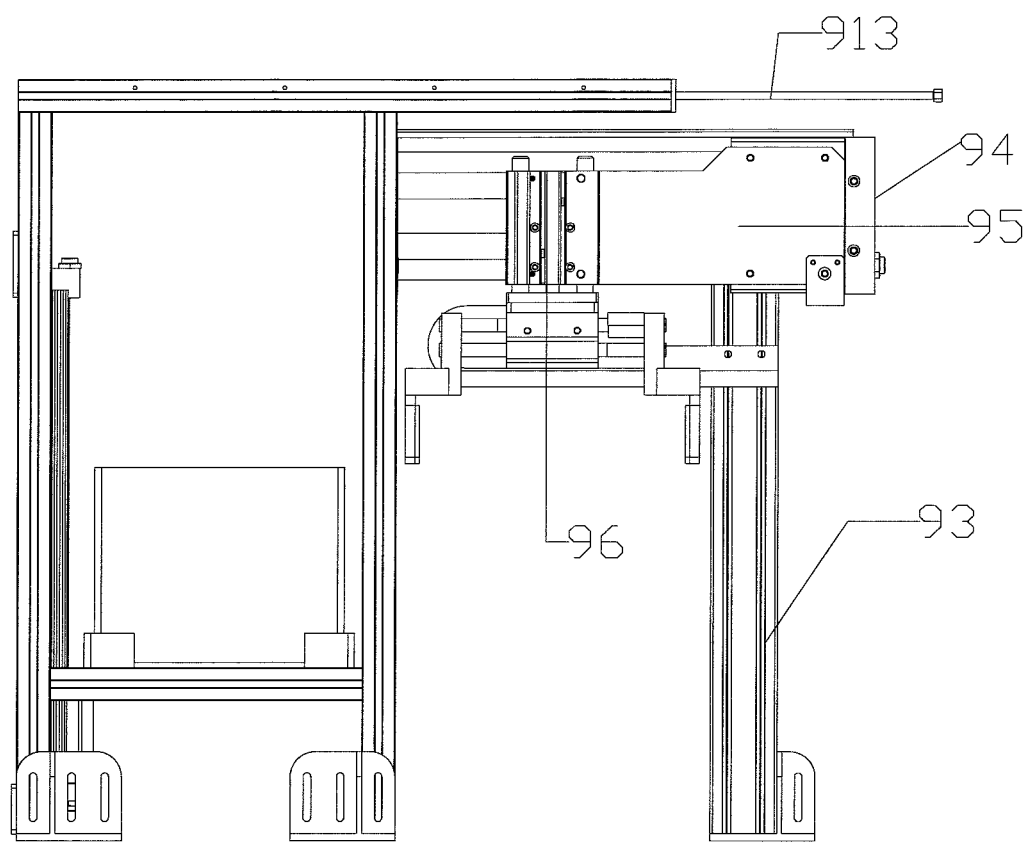
Figure 9B:
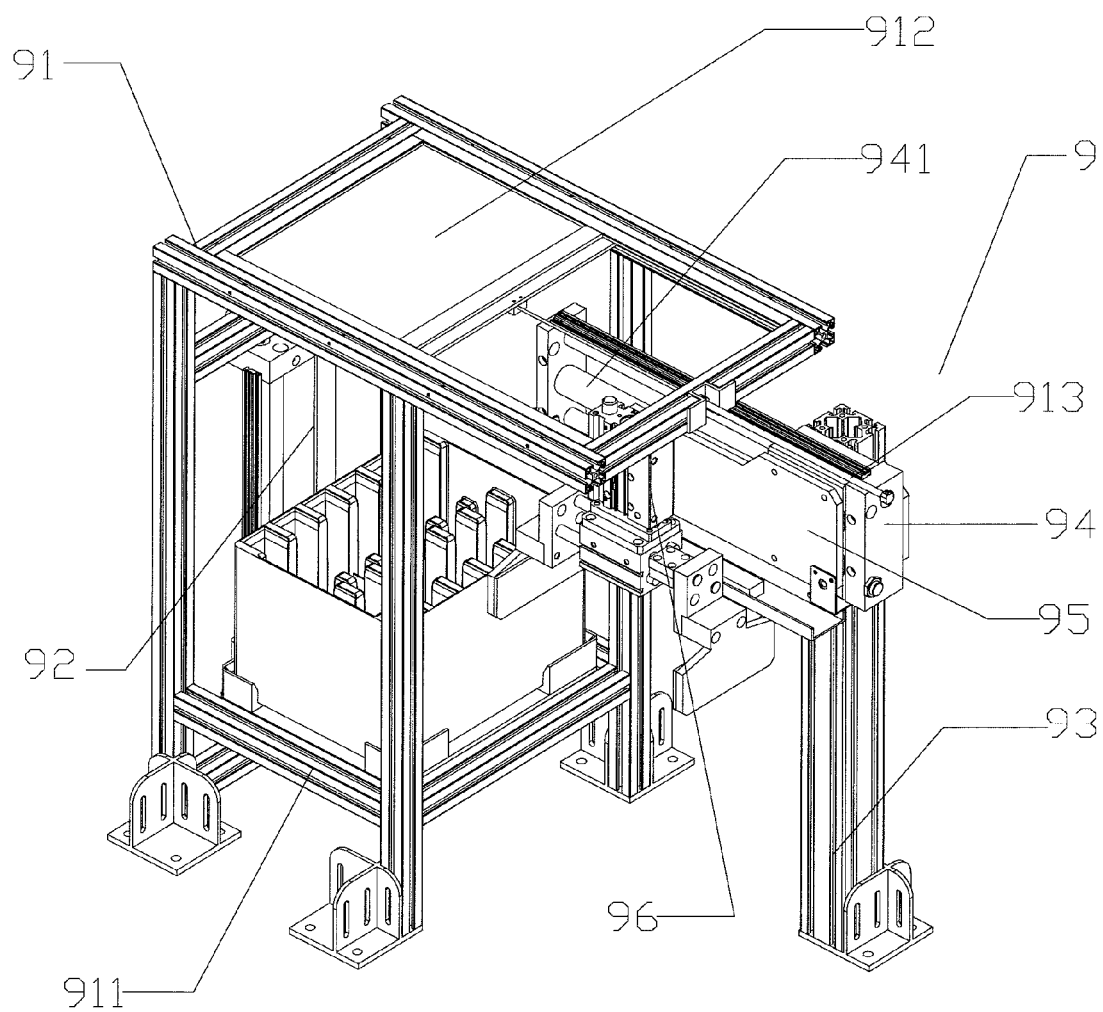
Figure 9C:
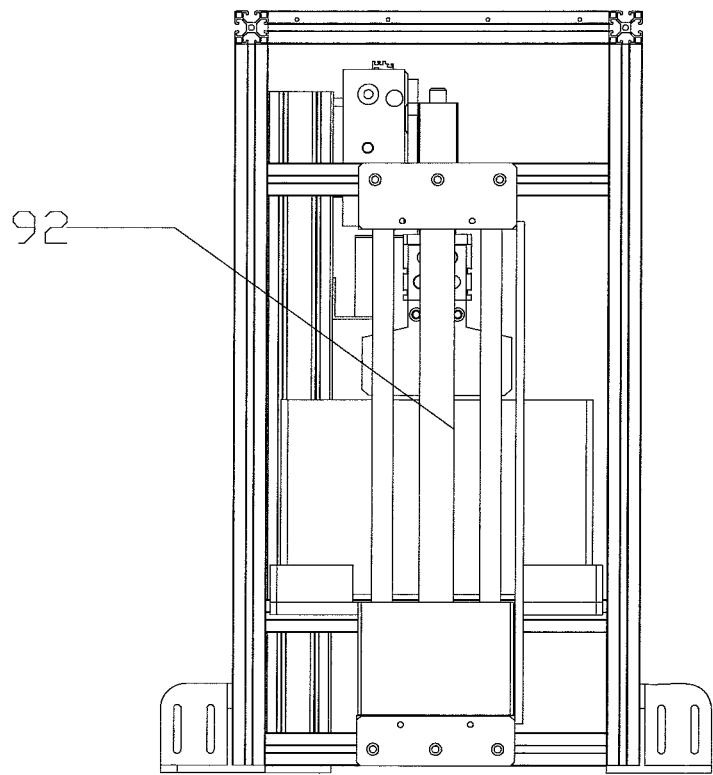
Figure 9D:
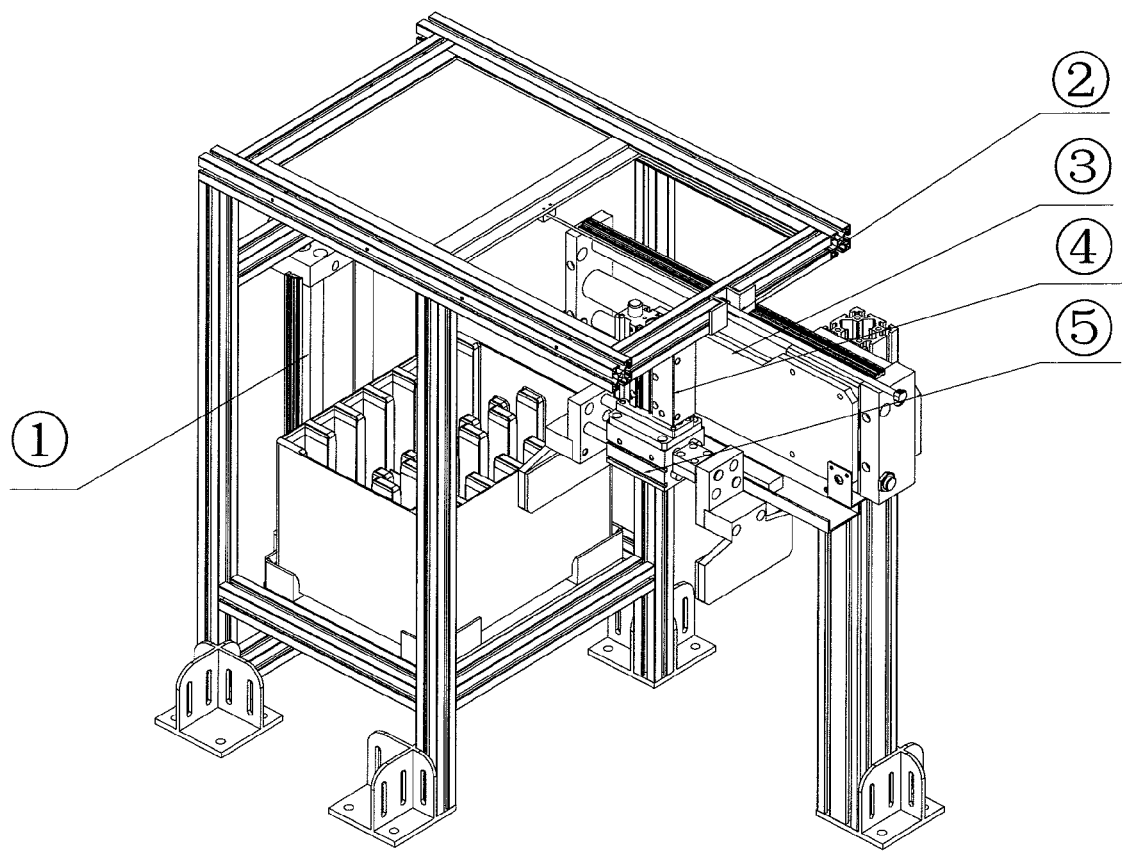
Figure 9E:
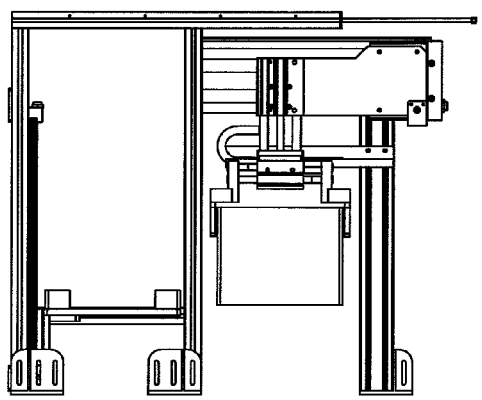
FIG. 9E to FIG. 9K are schematic views of the work flow of the book taking window.
Figure 9F:
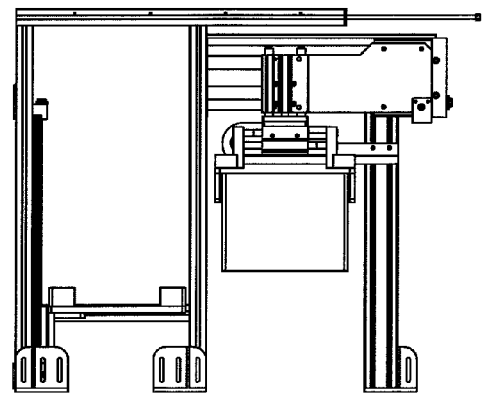
Figure 9G:
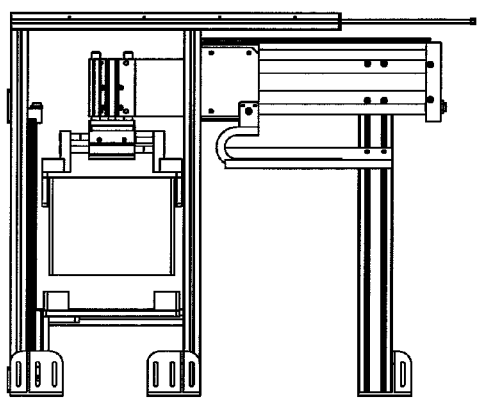
Figure 9H:
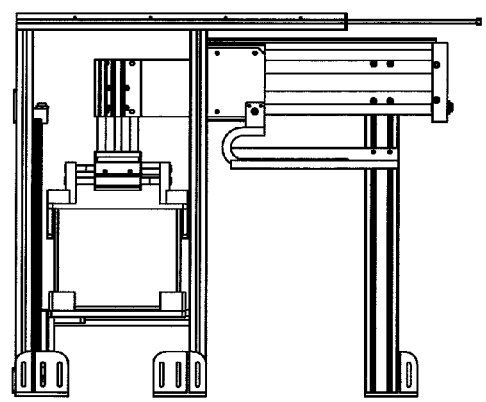
Figure 9I:
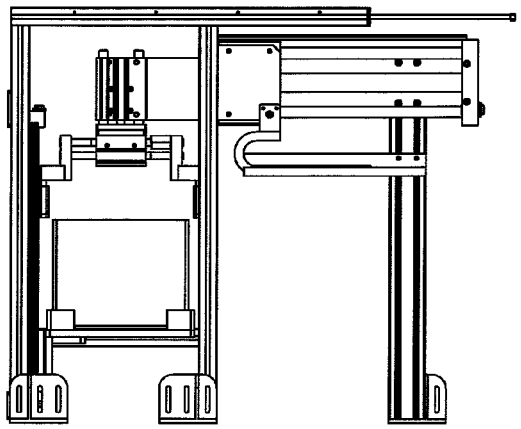
Figure 9J:
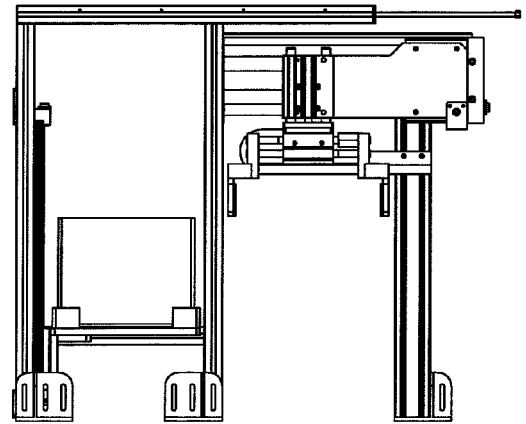
Figure 9K:
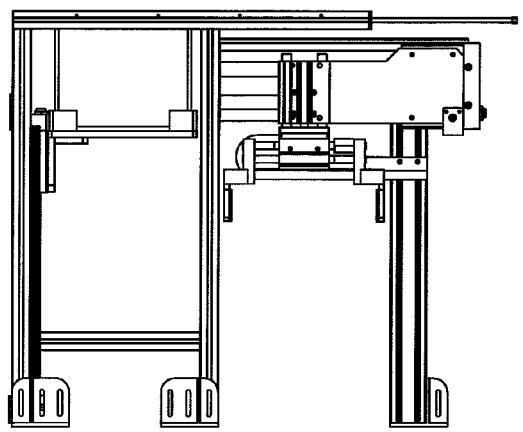

The operation flow of the books in the book taking window is that, as shown in FIG. 9E and FIG. 9F, the book basket lifting gas cylinder 96 is moved downward when a book basket for book taking (B-type book basket in the following)

being in place, the book basket being clamped by the first claw-board 641 and the second claw-board 642 of the book basket clamper, the book basket lifting gas cylinder 96 being moved upward. As shown in FIG. 9G to 9I, a translational gas cylinder 94 for book basket clamper translates left, the elongation section 951 extending above the lower-layer book basket bracket 911, the lifting gas cylinder 96 for book basket clamper being moved downward to release the book basket on the book basket bracket 911, then the lifting gas cylinder 96 for book basket clamper being moved upward and being translated right. The lifting gas cylinder 92 for book basket works, the B-type book basket being moved upward to the bottom of the window baffle through the lower-layer book basket, the window baffle 912 being opened by the open gas cylinder 913, the books being taken by a reader, whether the books are taken being detected by the detection device after the book taking is over. The closed-shelf stack room management system is informed to be updated about the borrowing status of the books when all books are taken.

Figure 10A:
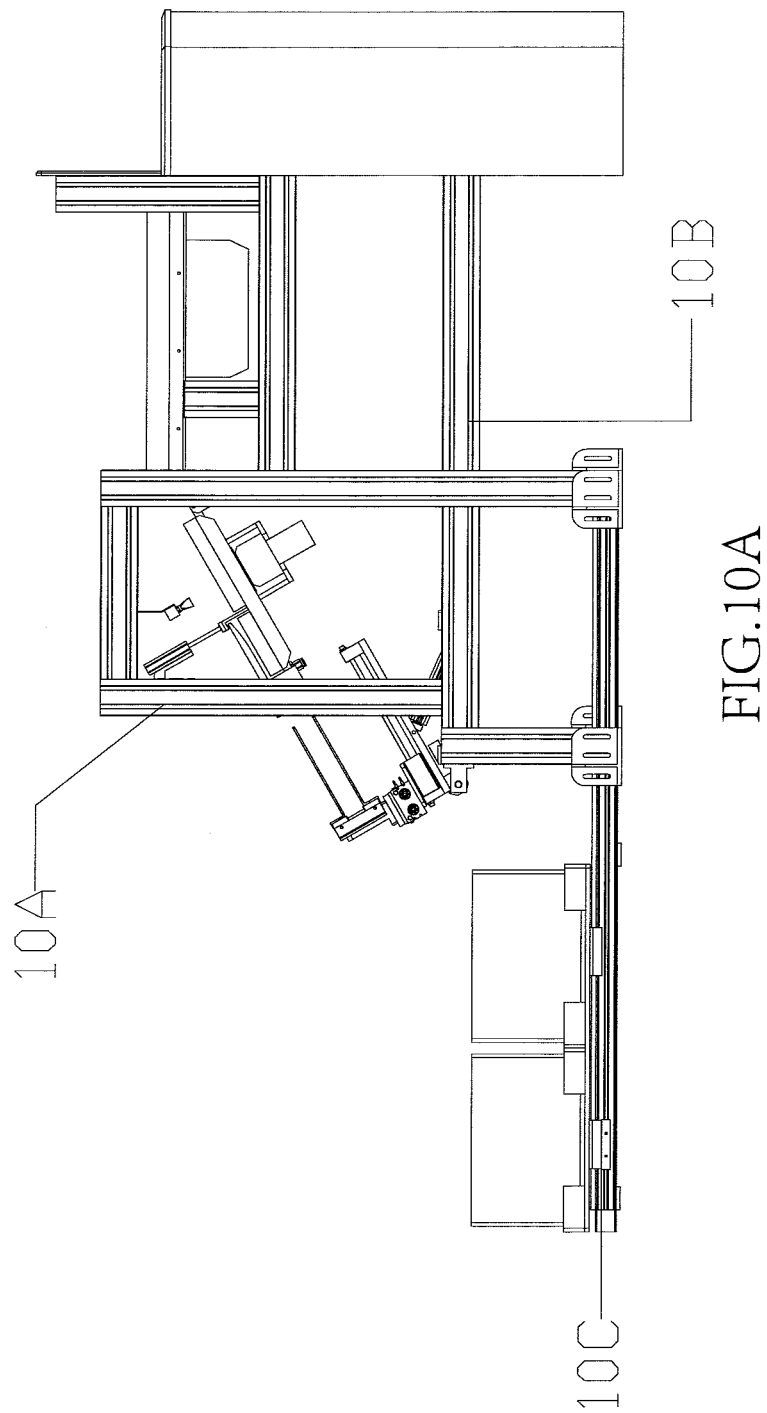
Figure 10B:
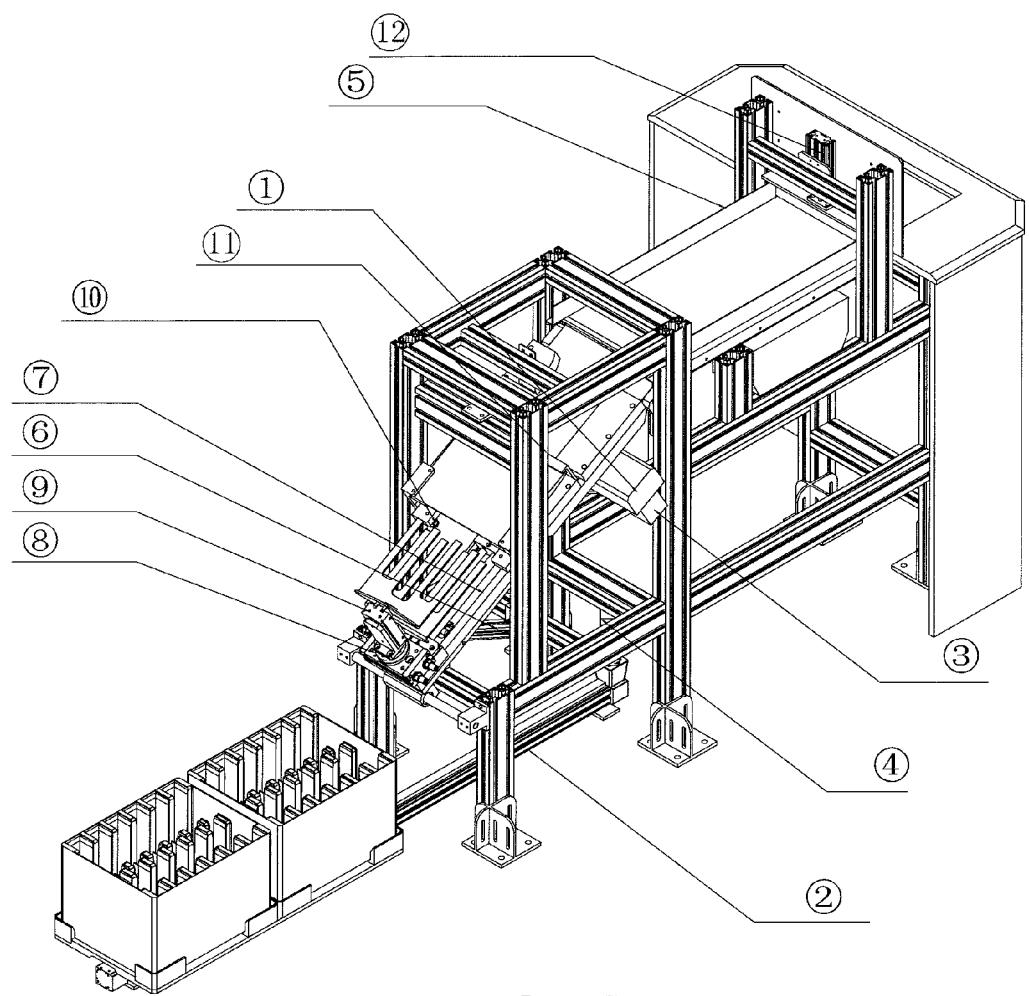
Figure 10C:
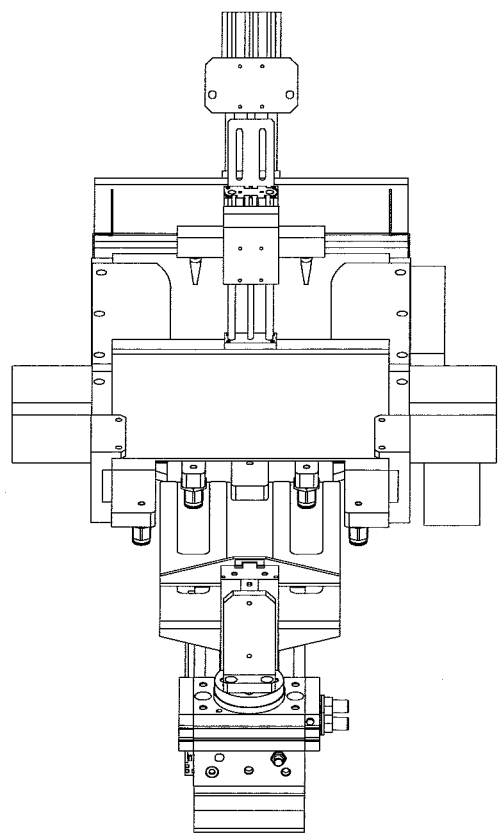

Please refer to what are shown in FIG. 10A to FIG. 10B, which are schematic structural views of the book returning window in the invention. The book returning window includes a window bracket, a book returning mechanism provided on the book returning window bracket and a book returning basket transmission bracket provided under the book returning mechanism.

Figure 10D:
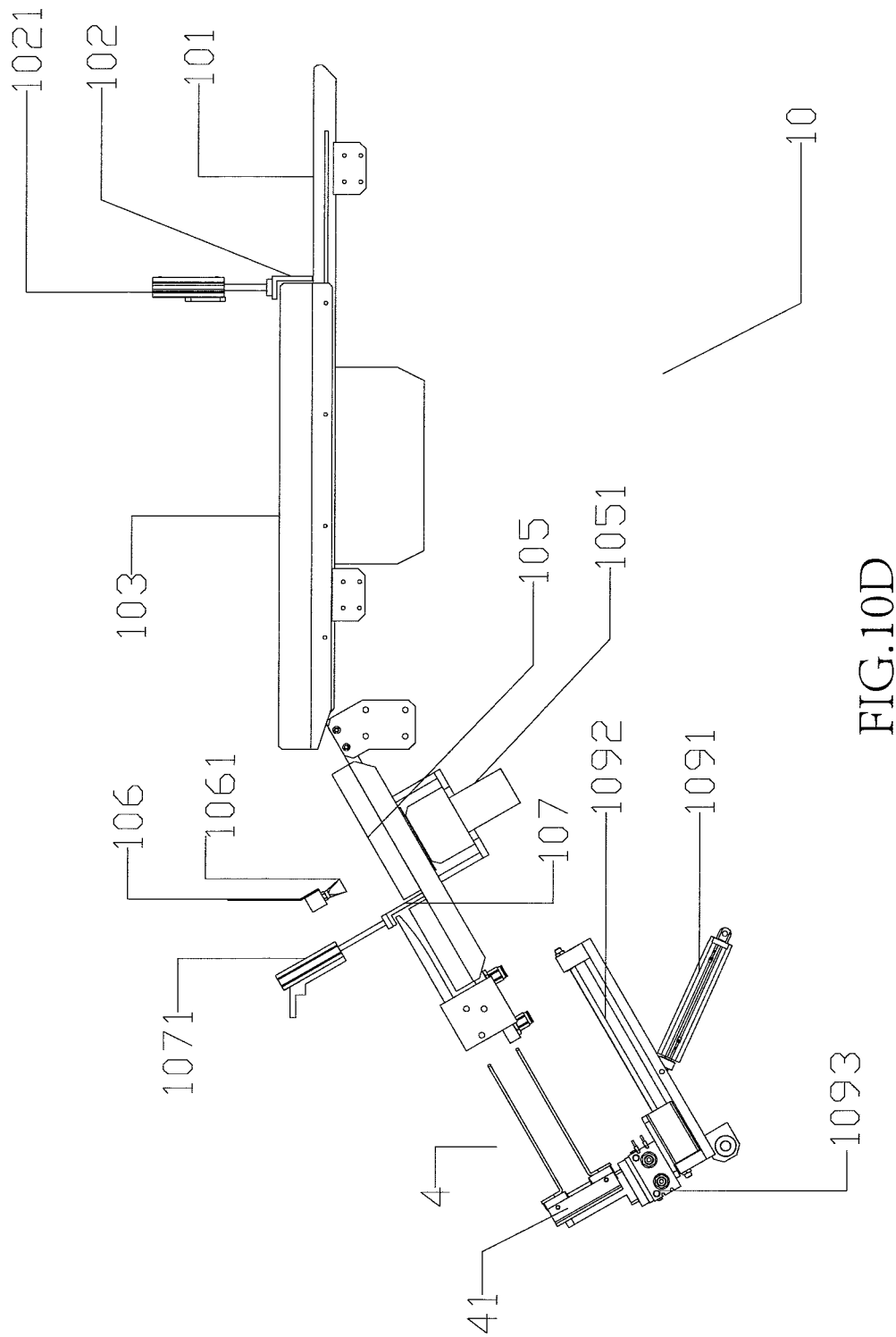
FIG. 10D to FIG. 10F are schematic structural views of the book returning mechanism for the book returning window in the invention.
Figure 10E:
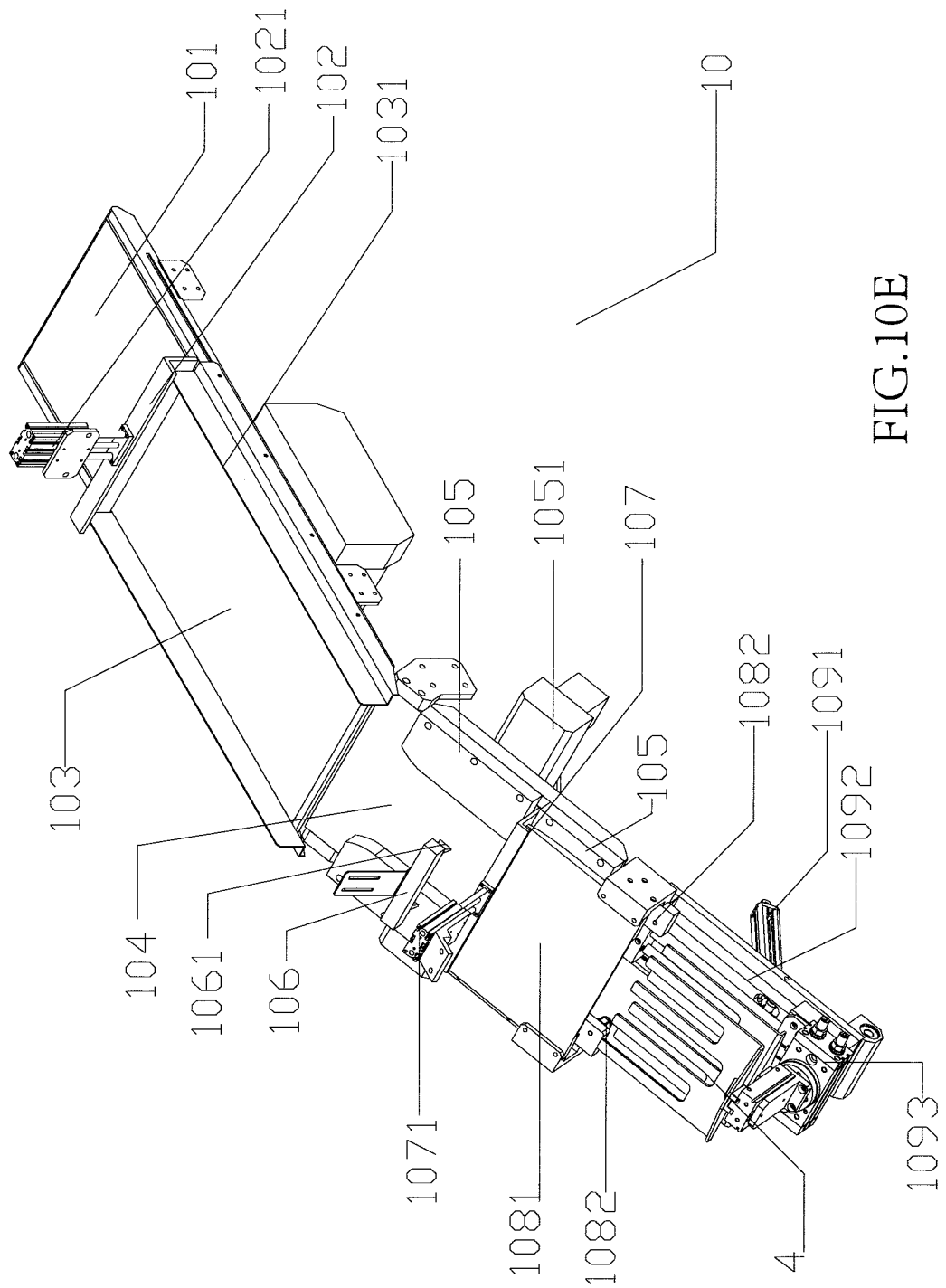
Figure 10F:
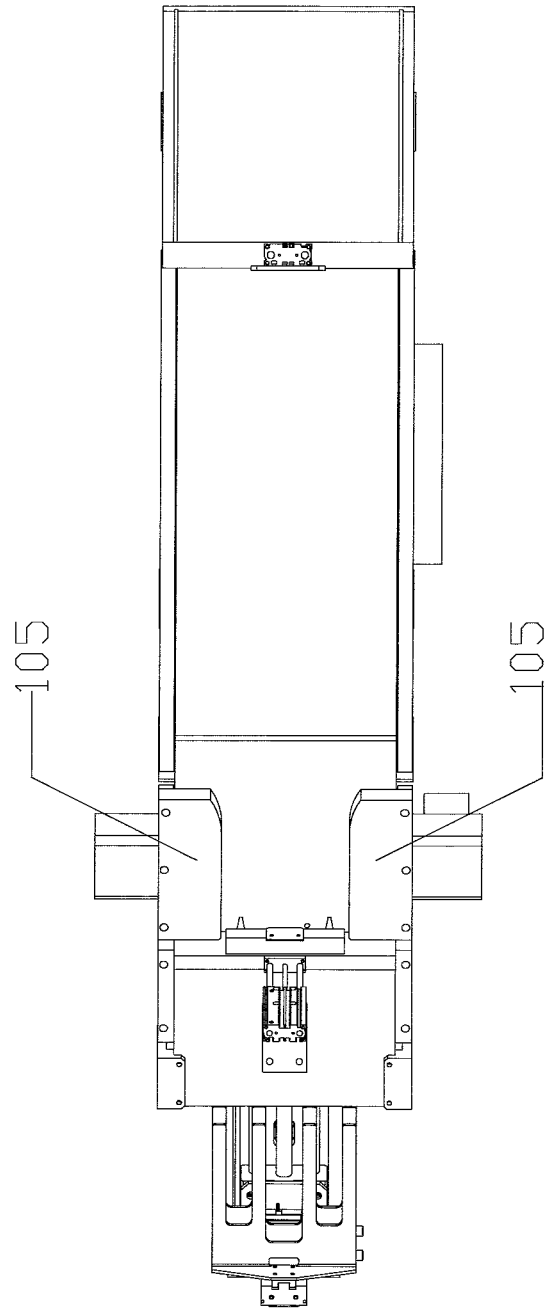
Figure 10L:
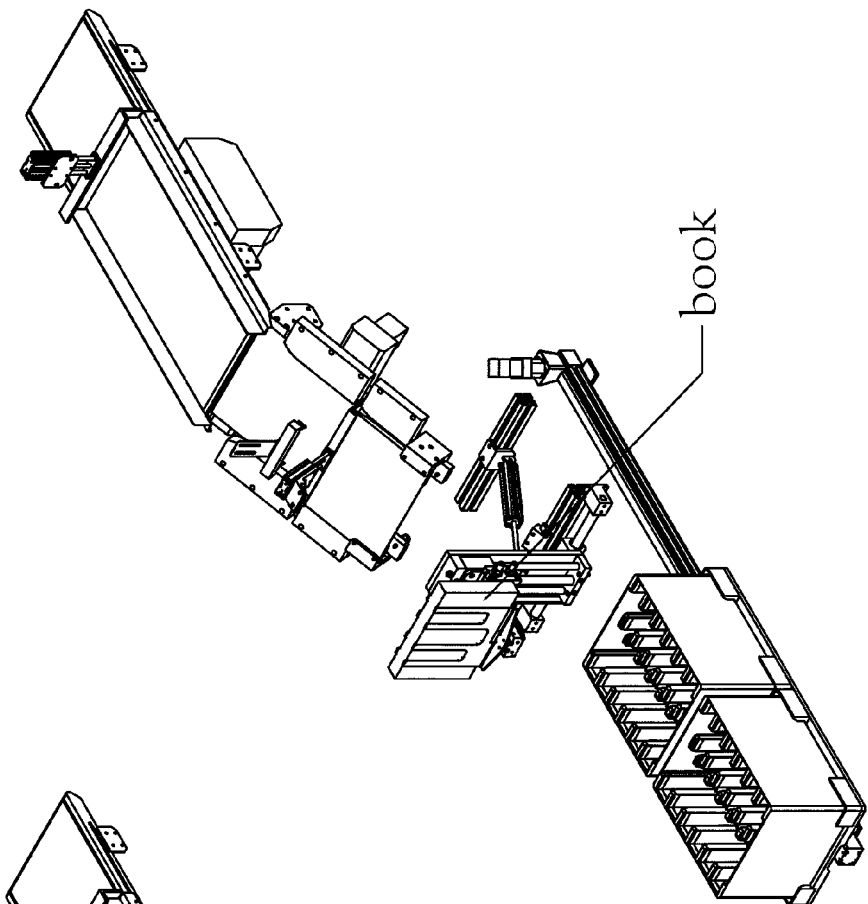

Please refer to what are shown in FIG. 10D to FIG. 10F, which are schematic structural views of the book returning mechanism 10 provided on a book returning window bracket 10A. The book returning mechanism includes a horizontal transmission line, an inclined sliding board 104 provided at the end of the horizontal transmission line, the book clamping mechanism 4 being provided below the inclined sliding board, the book clamping mechanism 4 being connected with a book returning rotation gas cylinder 1093 provided on a book returning translational gas cylinder 1092, which is provided on the book returning window bracket through a rotation shaft and the back of which is connected with a push and pull cylinder 1091, the other end of the push and pull cylinder 1091 being fixed to the book returning window bracket. The book returning translational gas cylinder 1092 is pushed by the push and pull cylinder 1091 to keep parallel to the inclined sliding board 104 when books are being taken and the book returning translational gas cylinder 1092 is pushed by the push and pull cylinder 1091 to rotate the book clamping mechanism rotate counter-clock wise provided thereon after the book taking is over, making the book clamping mechanism perpendicular to the ground in the present embodiment.

Please refer to what are shown in FIG. 10G and 10H. which are schematic views of the book returning window book basket transmission bracket 10C. The book returning window book basket transmission bracket 10C includes a book basket lattice 10C1 and 10C2 which drives the book lattice to move.

Further, said horizontal transmission line includes the first horizontal transmission line 101 and the second horizontal transmission line 103, a baffle 102 being provided there between, a lifting gas cylinder 1021 at the window being controlled to open the baffle 102. A detection device is provided above the first horizontal transmission line, the RFID tag of a book being detected to determine whether it is readable, the horizontal transmission line entering the book returning mechanism if the information is integral, and an administrator is needed to be contacted to return the book manually if the RFID tag is not readable. The books are released on the first horizontal transmission line 101 to be detected and the baffle 102 is opened if no error occurs during detection. The delivered books enter the second horizontal transmission line 103, a baffle 1031 being provided on both sides thereof in case any book slips in the operation progress.

The inclined sliding board 104 is provided to connect the end of the second horizontal transmission line 103 and is configured to be inclined from the upper-layer to the lower-layer of the book returning window bracket. A middle baffle 107, which is controlled to move upward and downward through a baffle lifting gas cylinder 1071, is provided in the middle position of the inclined sliding board 104. A middle device is provided on the inclined sliding board 104, said middle baffle including a middle claw-board 105 on both sides of the inclined sliding board 104 driven by a middle gas cylinder 1051. A book pressing device includes an air supply divided manifold 106 and an air supply nozzle 1061 is provided above the middle device.

A book organizing device is provided on the lower half of the inclined sliding board 104. The book organizing device includes an upper guiding board 1081 and a baffle gas cylinder 1082 for distinguishing a large-sized book from a small-sized book.

Figure 10K:
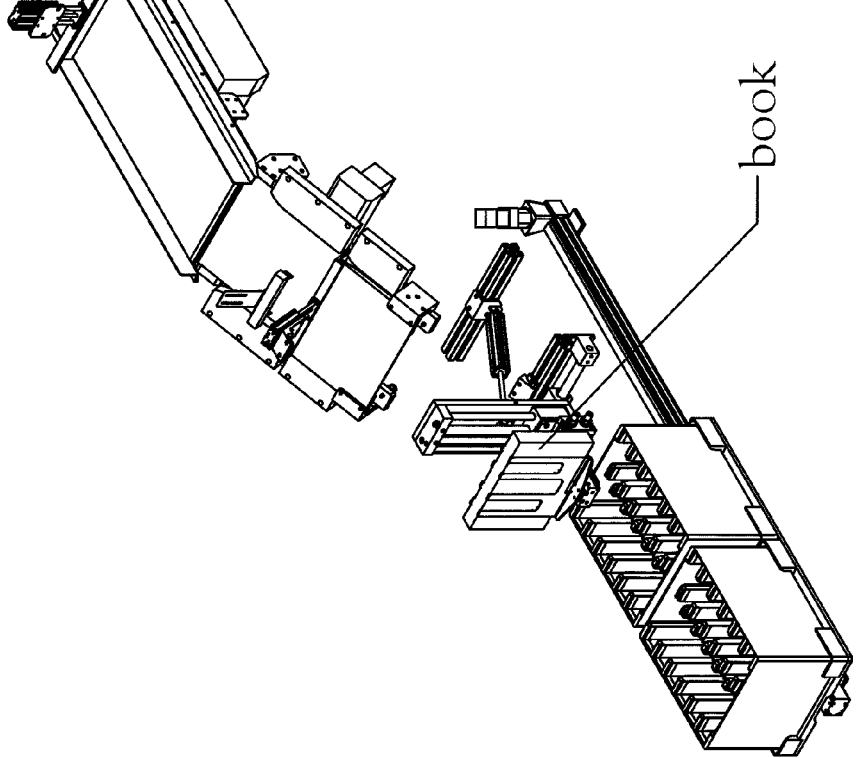
Figure 10N:
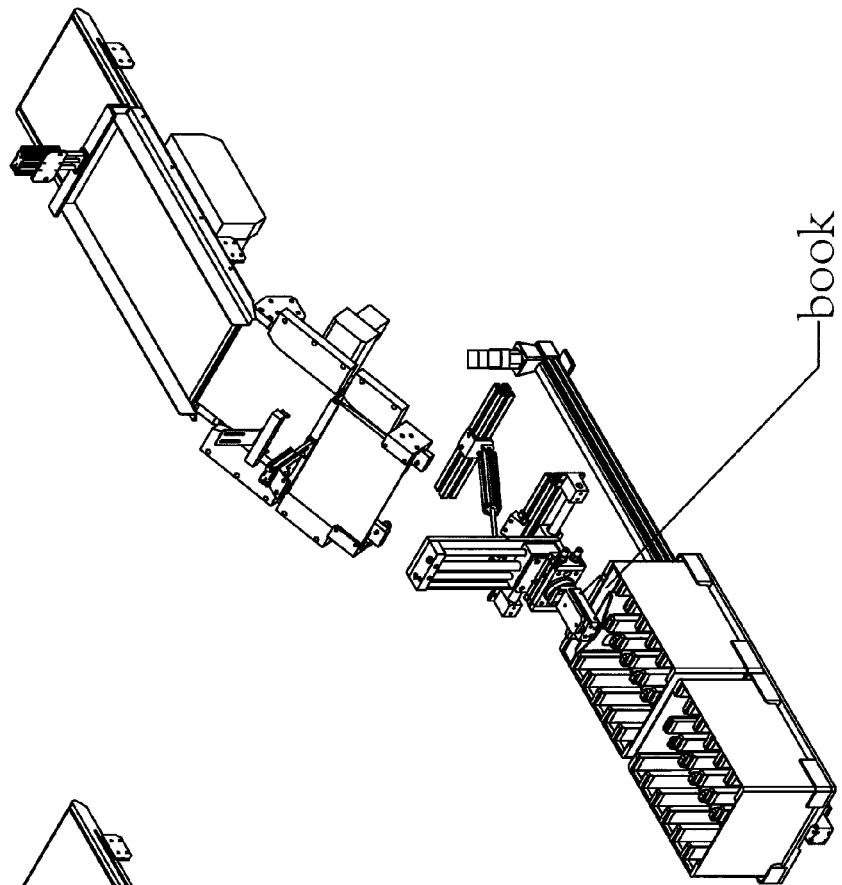
Figure 10M:
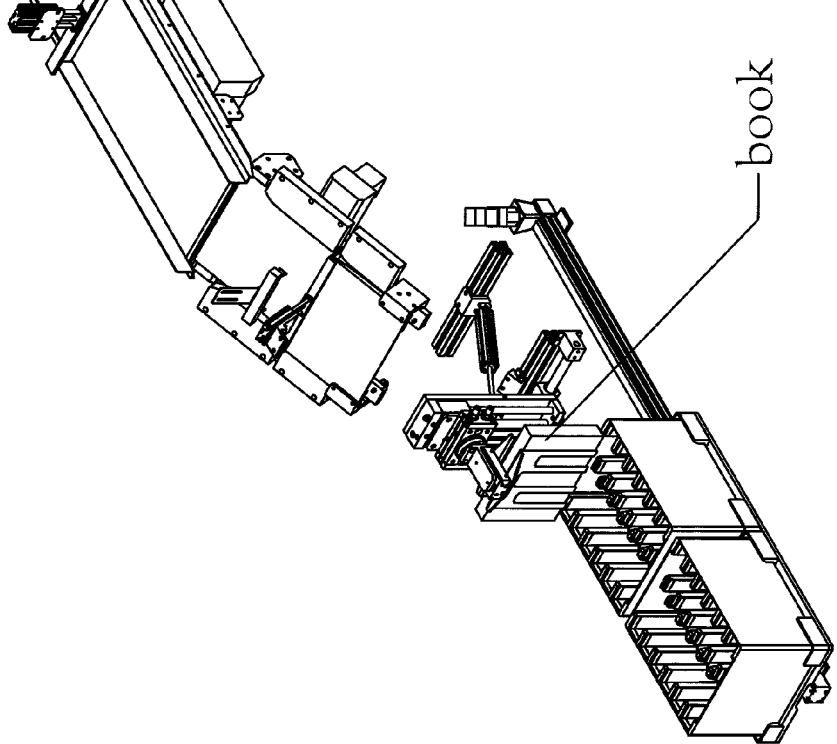

The work flow of the books at the book returning window is that the baffle 102 is pulled to move upward by the window lifting gas cylinder 1021 when any book is returned and detected to be correct, the book being transmitted to the inclined sliding board 104 by the operation of the first horizontal transmission line 101 and the second horizontal transmission line 103, the baffle 102 being closed, the horizontal transmission lines being stopped to operate, the book being placed in the middle by the middle claw-board 105 driven by a middle electrical driver 1051 and the book being clamped tightly. The middle baffle 107 is lifted upward through the contraction of a middle baffle lifting gas cylinder 1071, then the middle baffle 107 being controlled to be closed by the window lifting gas cylinder 1071, a corresponding gas cylinder being lifted upward by the baffle gas cylinder 1082 for distinguishing a large-sized book from a small-sized book according to the book, air being supplied by an air supply nozzle 1601 to flatten the book with air. The middle claw-board 105 being released, the book slipping to the lower part of the upper guiding board 1081, the book being stopped by the baffle gas cylinder 1082 for distinguishing a large-sized book from a small-sized book, preventing the book from continuous fall, the middle baffle lifting gas cylinder 1071 being lifted upward, the middle baffle 107 being extended. As shown in FIG. 10I, the book returning translational gas cylinder 1092 is translated to the right, the fingers for book taking of the book clamping mechanism being stretched to two sides of the book, a groove being provided on the inclined sliding board 104 and the upper guiding board 1081 so that an interference with any finger for book taking would not occur. As shown in FIG. 10J, a book is clamped when the fingers for book taking on the first palm and the second palm of the book clamping mechanism are clamped tightly, the baffle gas cylinder 1082 for distinguishing a large-sized book from a small-sized book being contracted, the book returning translational gas cylinder 1092 being translated to the left and the book being taken. As shown in FIG. 10K, a book returning rotating push and pull cylinder 1091 is lifted upward to make the book clamping mechanism 4 rotate to a position with 90 degrees. As shown in L, the book returning translational gas cylinder 1092 is translated to the right (upward), as shown in FIG. 10M, the JRT and the book being rotated with 90 degrees by the act of a JRT rotating gas cylinder, the JRT and the book being rotated with 180 degrees by the act of a book returning rotating gas cylinder 1093, an opening corresponding to a book basket being translated by an electrical cylinder 10C2, as shown in FIG. N, a translational gas cylinder of the book clamping mechanism being moved to the left to transmit a book into a book basket, the JRT being released and all mechanisms being homing.

Please refer to what are shown in FIG. 11A to 11E, the figures are schematic views of the book basket carrying device at the book returning window in the invention. The book basket carrying device 11 is provided aside a book returning basket transmission bracket at the book returning window, is parallel thereto, and includes a main bracket 111 and a rotating bracket 113 provided thereon through a rotating shaft 112, the rotating bracket 113 being extended externally, a lifting gas cylinder 114 for carrying book basket clamper being provided on an outside end, the gas cylinder 114 being connected with the book basket clamper 64. The rotating bracket 113 is rotated between two positions above the book returning basket transmission bracket and the temporary storage transmission line to accomplish the carrying work of the book baskets for book returning from the book returning basket transmission bracket to the temporary storage transmission bracket.

Figure 12C:
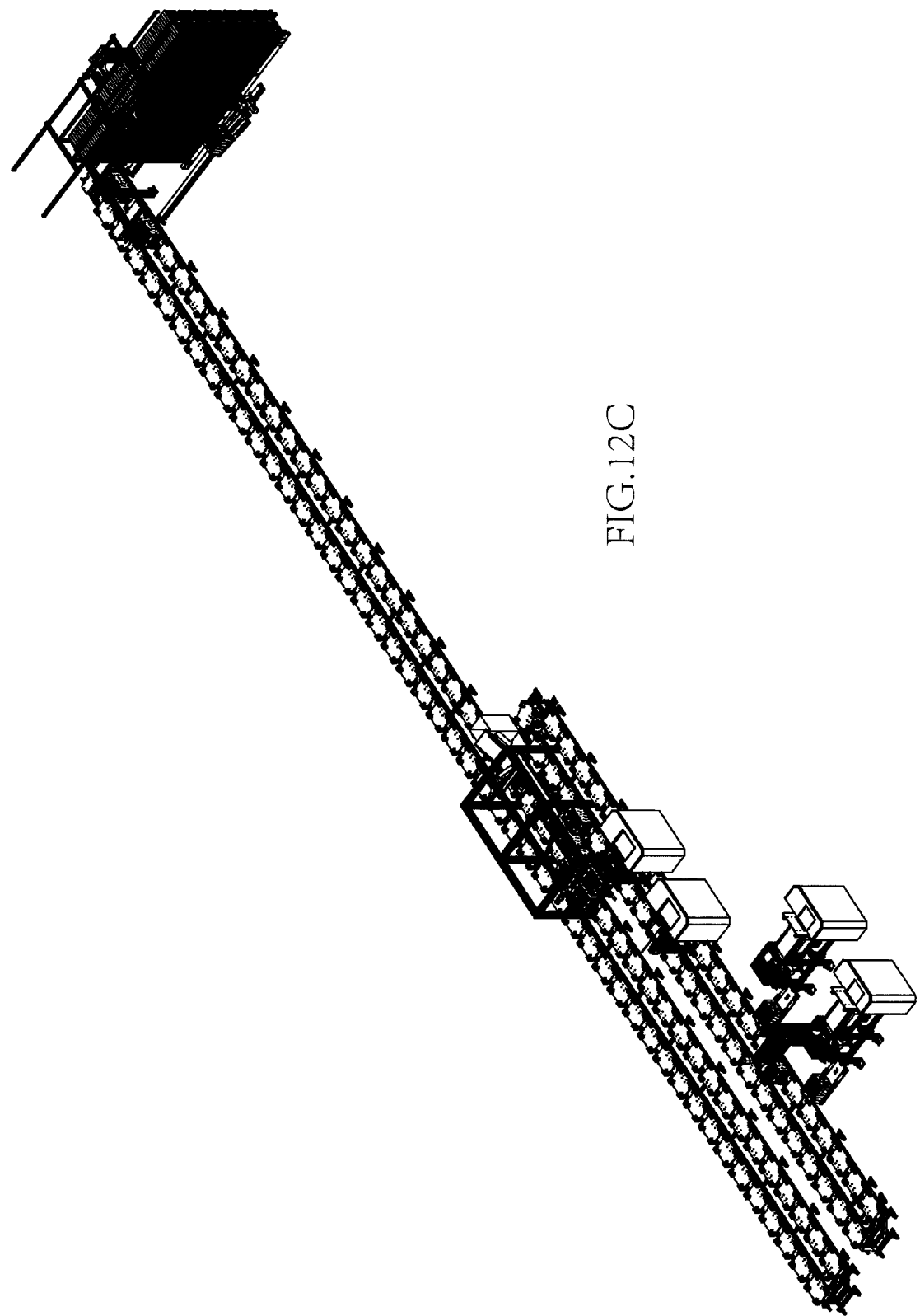
Figure 13:
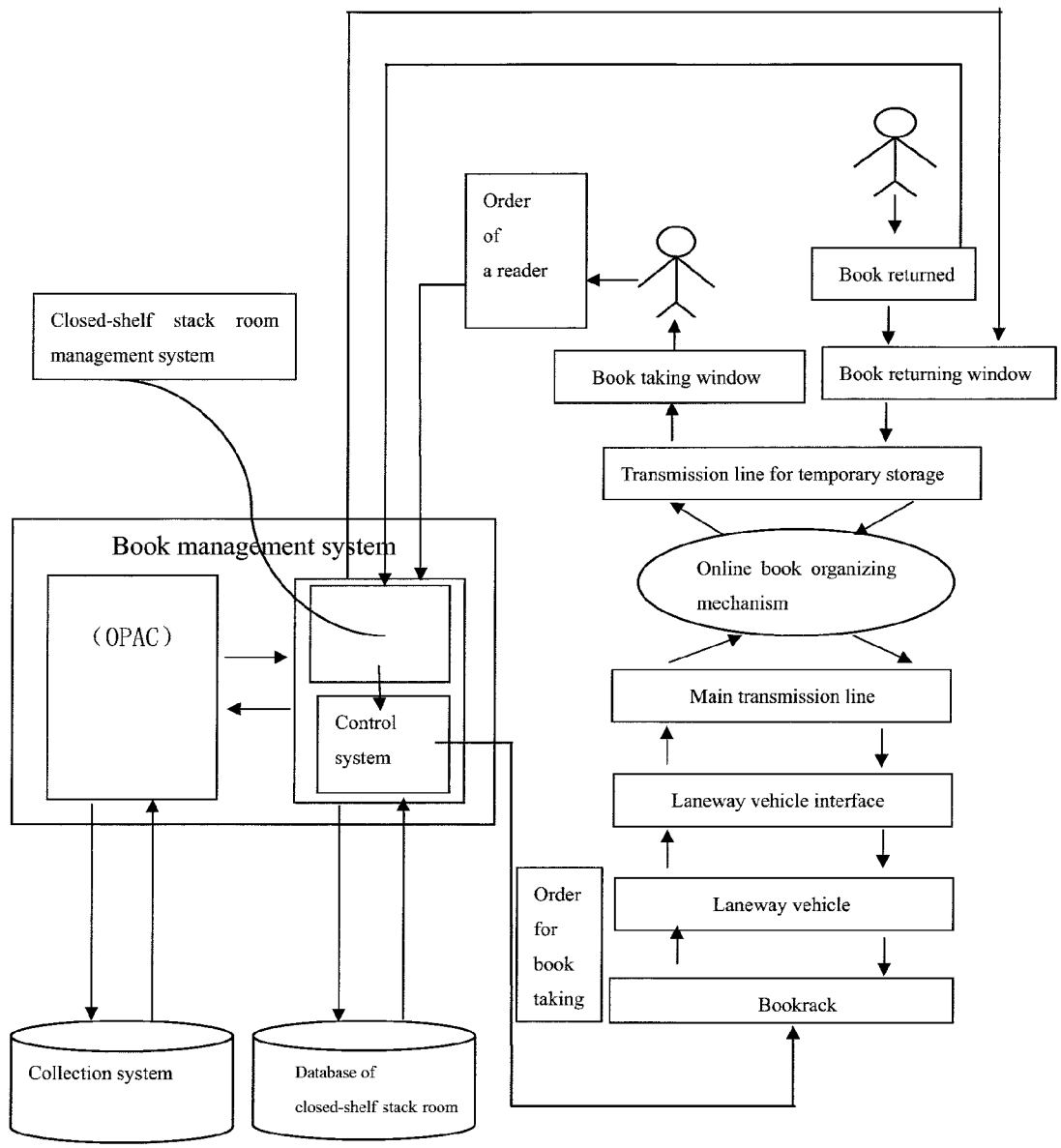
FIG. 13 is system structural diagram of the unattended full-automatic book management system of the invention.

Please refer to what are shown in FIG. 12A to FIG. 12C, which are schematic structural views of the overall invention. Bookracks are provided on both sides of the main transmission line 7A column by column, a laneway A being formed between each two bookracks. A laneway vehicle 5 runs on the rail of each laneway, a laneway vehicle interface 6 being provided between an entrance of the laneway and the main transmission line, the main transmission line 7A and the temporary storage transmission line 7B being parallel to each other, the online book organizing mechanism 8 being provided across the main transmission line and the temporary storage transmission line, a book taking window 9, a book returning window 10 and a book basket carrying device 11 being provided in the region aside the temporary storage line 7B.

The above content is the content about the full-automatic closed-shelf stack room, each mechanism being formed as an organic integral, and the storage and transmission functions for books in the stack room being accomplished by the cooperation between each other. Introduction on the upper-layer management system and the control system of the full-automatic closed-shelf stack room will be focused on below.

2. The Constitution of the Book Management System.

The book management system is an unattended book management system and the processing core of the whole system, of which the existing functions being implemented through a collection system and mainly focus on the following aspects: to record basic intelligence and information on books; to provide functions on search and browse books; to accomplish the function to subscribe books for readers. It can be the OPAC system widely used in the present libraries and can also be other online book management system with similar functions.

The improvement of the invention is that: the book management system manages the functions like location information on books in the closed-shelf, and laneway vehicle, the laneway vehicle interface, the book taking window, the book returning window, the book basket carrying device and the online book organizing mechanism management, generation of the order for book taking, dynamic assignment of a book basket, and the communication between the OPAC system and the control system, etc. through the closed-shelf stack room management system.

The closed-shelf stack room management system may be associated with the OPAC system through book identification information (Book_ID as follows). After a book to be borrowed is subscribed by a reader on the network, that is, the reader information and the book identification information are determined, the reader information and the book identification information are transmitted by the OPAC system and the order for book taking is generated. The actions of book taking and delivery of books out of the library are accomplished by the control system of the full-automatic closed-shelf stack room informed by the closed-shelf stack room management system.

Because book boxes are used as storage space for books and book baskets are used as transmission space for books in the invention, correspondingly, a database of the closed-shelf stack room system is added to the closed-shelf stack room management system on the basis of the collection system to store and manage the device information on the physical location information (the location information of book boxes) to store books, the laneway vehicle, the laneway vehicle interface, the transmission line, the online book organizing mechanism, the book taking window, the book returning window and the book basket carrying mechanism, etc.

Introduction to the information content on the database of the closed-shelf stack room system matched with the technical improvement will be focused on in the embodiment, in combination of the technical improvement of the invention. It should be noted that the description below is not limited to the composition of the information in the invention and the way to define the data in the database of the closed-shelf stack room system may not be limited specifically under the spirit of the invention.

| Name of the Table: Bookracks | | |
|---|---|---|
| Sequence Number | Segment Name | Name and Description |
| 1 | Location_No | Physical location number of a bookrack: Physical location number of a books on a closed-shelf bookrack inside a closed-shelf book stack room |
| 2 | Laneway_No | Number of a laneway |
| 3 | Bookrack_No | Number of a bracket |
| 4 | Level_No | Number of a row |
| 5 | P_No | Number of a position |

| Name of the Table: Book Boxes | | |
|---|---|---|
| Sequence Number | Segment Name | Name and Description |
| 1 | Box_ID | Identification information on a book box: identification information of a book box, a book box ID corresponding to each book box. |
| 2 | Book_ID | Identification information on a book: unique identification information of a book. |
| 3 | Location_No | Location information on a book box: the laneway thereof, the bracket thereof, the column thereof, the row thereof. |
| 4 | Reader_ID | Information on a reader: unique identification information of the reader. |
| 5 | Box_Status | Status information on a book box: empty or not empty. |

| Name of the Table: Book Basket | | |
|---|---|---|
| Sequence Number | Segment Name | Name and Description |
| 1 | Basket_ID | Identification information on a book basket: identification information on a book basket, a book basket ID corresponding to each book basket. |
| 2 | Lattice_ID | Identification information on a book lattice: the position number of a book lattice, the first book lattice, the second book lattice, the third book lattice, the fourth book lattice, the fifth book lattice, the sixth book lattice. |
| 3 | Book_ID | Identification information on a book: unique identification information of a book. |
| 4 | Reader_ID | Information on a reader: unique identification information on the reader. |
| 5 | Basket_Nature | Properties of a book basket: The A-type book basket: a book basket on the main transmission line, each corresponding to a laneway, carrying borrowed books from the same laneway; The A'-type book basket: a book basket on the main transmission line, each corresponding to a laneway, carrying returned books for the same laneway; The B-type book basket: a book basket on the temporary storage transmission line, each corresponding to a reader, carrying borrowed books by each reader: The B'-type book basket: a book basket on the temporary storage transmission line, carrying returned books by a reader; |
| 6 | Basket_Status | Status information on a book basket: empty or not empty. |
| 7 | Lattice_Status | Status information on a book lattice: empty or not empty. |

| Name of the Table: Laneway Vehicle | | |
|---|---|---|
| Sequence Number | Segment Name | Name and Description |
| 1 | Vehicle_ID | Identification information on a laneway vehicle: identification information on a laneway vehicle, a laneway vehicle ID corresponding to each laneway vehicle. |
| 2 | Laneway_No | Number of the laneway |
| 3 | Basket_ID | Identification information on a book basket: identification information on a book basket, a book basket ID corresponding to each book basket. |

| Name of the Table: Laneway vehicle interface | | |
|---|---|---|
| Sequence Number | Segment Name | Name and Description |
| 1 | Interface_ID | Identification information on a laneway vehicle interface. |
| 2 | Laneway_No | Number of the laneway |
| 3 | Basket_ID | Identification information on a book basket: identification information on a book basket, a book basket ID corresponding to each book basket. |

| Name of the Table: Transmission Line | | |
|---|---|---|
| Sequence Number | Segment Name | Name and Description |
| 1 | Interface_ID | Number of a transmission line: the main transmission line and the temporary storage transmission line in the present embodiment. |
| 2 | Basket_Position | Position number of a book basket on a transmission line, representing the position information for arranging each book basket. |
| 3 | Basket_ID | Identification information on a book basket: identification information on a book basket, a book basket ID corresponding to each book basket. |
| 4 | Interface_Nature | Property of the transmission line: the main transmission line or the temporary storage transmission line. |

| Name of the Table: Interface for Book Taking | | |
|---|---|---|
| Sequence Number | Segment Name | Name and Description |
| 1 | B_Window_No | Number of a book taking window. |

| Name of the Table: Interface for Book Returning | | |
|---|---|---|
| Sequence Number | Segment Name | Name and Description |
| 1 | R_Window_No | Number of a book returning window. |

| Name of the Table: Book Basket Carrying Device | | |
|---|---|---|
| Sequence Number | Segment Name | Name and Description |
| 1 | M_No | Serial Number of a book basket carrying device. |

An order for book taking is generated by the operation of the closed-shelf stack room management system (management system for short hereinafter) to the data information in the closed-shelf stack room system, in combination with the order of a reader including the information on a reader and identification information of a book) transmitted by the collection system (OPAC system), and the order for book taking is transmitted to the control system of the full-automatic closed-shelf stack room. The actions of taking the book and carrying out the borrowed book are accomplished by specific functional parts in the full-automatic closed-shelf stack room operated by the control system.

Specifically speaking, the closed-shelf stack room management system includes a module for generating an order for book taking, a module for dynamically assigning book baskets, a module for carrying out a book, a module for returning a book, a racking module for new books, and a system check module.

Among other things, the information on a reader and identification information on a book transmitted by the collection system are received by the module for generating an order for book taking and an order for book taking is generated and is transmitted to a communication module of the control system, wherein the communication module is a communication interface of the control system of the full-automatic closed-shelf stack room and is responsible for receiving instructions from the closed-shelf stack room management system, which is a prior art and will not be described in detail here.

Said order for book taking at least includes information on a reader, identification information on a book, identification information on a book box, position information of a book box, application time of a reader, and book taking time of a reader.

Said order for book taking is designed to the laneway vehicle in each laneway. The work accomplished by the module for generating an order for book taking is to "translate" the order of a reader into an order for book taking, the order of a reader and the order for book taking are related to each other through the identification information on a book, wherein the order of a reader is transformed to an order for book taking, and is transmitted in turn to the control system of the laneway vehicle according to different time.

Name of the Table: Order for Book Taking (B_Order)

| Sequence Number | Segment Name | Name and Description |
|---|---|---|
| 1 | Order_ID | Number of an order: the number of an order of each reader. |
| 2 | Reader_ID | Information on a reader: unique identification information of the reader. |
| 3 | Book_ID | Identification information on a book: unique identification information of a book. |
| 4 | Box_ID | Identification information on a book box: identification information of a book box, a book box ID corresponding to each book box. |
| 5 | Location_No | Location information on a book box: the laneway thereof, the bracket thereof, the column thereof, the row thereof. |
| 6 | App_Time | Application time of a reader: the time to apply a request for borrowing a book by a reader |
| 7 | T_Time | Time for book taking of a reader: specific time for a reader to take a book |

Among other things, the function of the module for book returning is to receive the in place signal of book returning, inform the control system of the book returning window to be activated, assign a book box for each returned book according to the identification information of the book returned by the reader, and transmit the position information of the assigned book box to the following book basket assignment module for book returning.

The module for returning a book includes an activation module and a choosing and assignment module, wherein the activation module receives the identification information of a book in place and informs the control system to activate the book returning window to act. Said choosing and assignment module assigns a book into a book box located in different book regions with different sizes according to the different sizes of the books, i.e., the book box in the same laneway is assigned directly if the sizes of the books are the same, and if the sizes are different, books with the same size will be assigned to a book box in the same laneway and other books will be assigned to the book boxes in other laneways to accomplish the match between the identification information of a book and the identification information of a book box for an empty book box in different laneways, and the position information of the book boxes assigned is transmitted to the following book basket assignment module for book returning to accomplish the book basket exchange for books.

The book basket exchange occurs at the online book organizing mechanism in the present system, including book taking exchange and book returning exchange. Among other things, the book taking exchange is an exchange process from the A-type book basket to the B-type book basket accomplished on the organizing transmission line. The book returning exchange is an exchange process from the B'-type book basket to the A'-type book basket accomplished on the organizing transmission line. The function of the module for dynamically assigning book baskets is to dynamically assign a book basket for a book during the book basket exchange process and dynamically refresh the position information of the book basket where the book is located and the book lattice where the book is located in real time during the book transmission process.

The module for dynamically assigning book baskets includes a book basket assignment module for book taking and a book basket assignment module for book returning, wherein the function of the book basket assignment module for book taking is to assign for each reader a book basket to be transmitted to the temporary storage transmission line and the book basket assignment module for book taking defines an empty book basket on the organizing transmission line to be a B-type book basket to receive books from the same reader in different laneways and the book basket are transmitted to the temporary storage transmission line. However, the function of the book basket assignment module for book returning is to assign a book basket to be transmitted for the main transmission line for each book returned and to assign a book lattice position of a book, or to put into an unoccupied book lattice in the book basket in proper order, defining the empty book basket on the organizing transmission line to be the A'-type book basket. The book basket is transmitted to the main transmission line after the book exchange.

The book basket assignment module for book returning further includes a judgment module, which set directly the B'-type book basket to be the A'-type book basket when the books returned are assigned to book boxes in the same laneway, and inform the control system of the online book organizing mechanism to transmit the A'-type book basket which was released on the organizing transmission line to the main transmission line for actions of book returning. A book basket for different laneways is assigned for the books in each region when the books returned are located in different large-sized and small-sized regions. The function of the module for updating a book basket status is to update the book basket status information and the property of a book basket in the database in real time to accomplish the interaction of the control system.

Books for different readers from the same laneway are carried in the A-type book basket on the main transmission line, and books returned for different readers from the same laneway are carried in the A'-type book basket on the main transmission line. The books borrowed by the same reader are carried in the B-type book basket on the temporary storage transmission line, and the books returned are carried in the B'-type book basket on the temporary storage transmission line, either a plurality of books from the same reader or a plurality of books from different readers. The B'-type book basket enters the online book organizing mechanism for an exchange after it is full loaded. The property of a book basket is dynamically updated through the module for dynamically assigning book basket according to different functions thereof.

A plurality of orders for book taking may be received at the same time by a laneway vehicle and at the same time a plurality of books in the laneway are captured. The action of book taking from a book box is accomplished firstly by a laneway vehicle controlled by the control system according to the order for book taking, and the books in the laneway are then released into each book lattice of the book basket successively. Meanwhile, position information of the book basket where the book is located and the book lattice where the book is located are fed back in real time by the control system, and the database information is updated by the module for dynamically assigning book basket. When the book basket carrying borrowed books is transmitted to the online book organizing mechanism, books are exchanged according to the B-type book basket assigned by the book basket assignment module for book taking, after which the book basket is transmitted to the transmission process of the temporary storage transmission line. When the books returned by a reader are transmitted to the temporary storage transmission line by the book returning window, the A'-type book basket to be transmitted to the main transmission line is assigned by the book basket assignment module for book returning, the books in the same laneway being received successively to accomplish book returning in batch or the B'-type book basket being transmitted to the main transmission line directly.

The books enter waiting status after being located on the temporary storage transmission line. When an instruction for book taking is activated by a reader at the book taking window, the book taking module of the closed-shelf stack room management system starts to work. The reader in place signal is received by said book taking module; the action to borrow a book is activated by a reader through swiping a card, the number of the book taking window being transmitted to the control system, which activates a corresponding book returning window to act.

Among other things, the main function of the racking module for new books is similar to that of the book returning module, and the difference is that the racking module for new books further includes a book information writing module, RFID information of the books that enter the storage warehouse for the first time being read by the book information writing module and written into the collection database.

Among other things, the main function of the system check module is to transmit the broken books to a recycling transmission line and to a book storage basket according to the broken information on books detected by the control system.

3. The Control System of the Closed-Shelf Stack Room.

Please refer to what is shown in FIG. 5E, which is a layout drawing of the electrical components in an intelligent laneway vehicle. Meanwhile, control devices in the intelligent laneway vehicle are listed in detail in combination with the following table.

| Sequence Number | Model Type | Quantity | Comment | Description |
|---|---|---|---|---|
| ① | E3Z-G | 3 | Concave type photoelectric sensor | To limit and reset the laneway vehicle end to end |
| ② | E3Z-G | 3 | Concave type photoelectric sensor | To limit and reset the mechanical arm end to end |
| ③ | E3Z-G | 3 | Concave type photoelectric sensor | To limit and reset the book basket translation end to end |
| ④ | HF-KP73B | 1 | Servo motor | The mechanical arm lifting motor |
| ⑤ | HF-KP43 | 1 | Servo motor | The walking motor of the laneway vehicle |
| ⑥ | HF-053 | 1 | Servo motor | The book basket translational motor |
| ⑦ | LEFS25AA-320-R36N | 1 | Electrical cylinder | To translate the mechanical arm |
| ⑧ | D-M9BL | 2 | Magnetic switch | To detect the book clamping JRT |
| ⑨ | D-M9BL | 2 | Magnetic switch | To control the rotating gas cylinder |
|  | SY5220-5LZD-C6 | 4 | Electromagnetic valve | To detect the book clamping JRT To control the rotating gas cylinder |

Please refer to what is shown in FIG. 6C, which is a layout drawing of the electrical components in an interface of a laneway vehicle. Meanwhile, control devices in the laneway vehicle interface are listed in detail in combination with the following table.

| Sequence Number | Model Type | Quantity | Comment | Description |
|---|---|---|---|---|
| ① | E3-HF | 1 | Diffuse type photoelectric sensor | To detect whether a book basket exists or not |
| ② | D-M9BL | 2 | Magnetic switch | To detect the translational gas cylinder |

| Sequence Number | Model Type | Quantity | Comment | Description |
| --- | --- | --- | --- | --- |
| ③ | D-M9BL | 2 | Magnetic switch | To detect the rotational gas cylinder |
| ④ | D-M9BL | 2 | Magnetic switch | To detect the lifting gas cylinder |
| ⑤ | D-M9BL | 2 | Magnetic switch | To detect the push and pull gas cylinder |
| ⑥ | D-M9BL | 2 | Magnetic switch | To detect the book clamping JRT |
|  | SY5220-5LZD-C6 | 10 | Electromagnetic valve | To detect the translational gas cylinder<br>To detect the rotational gas cylinder<br>To detect the lifting gas cylinder<br>To detect the push and pull gas cylinder<br>To detect the book clamping JRT |

Please refer to what is shown in FIG. 7C, which is a lay out of the electrical components of a transmission line. Meanwhile, control devices in the transmission line are listed in detail in combination with the following table.

| Sequence Number | Model Type | Quantity | Comment | Description |
| --- | --- | --- | --- | --- |
| ① | E3Z-G | 1 | Concave type photoelectric sensor | To reset an annular line |
| ② | HF-SP152 | 1 | Servo motor | To drive a horizontal annular line |

Please refer to what is shown in FIG. 8C, which is a lay out of the electrical components of an online book organizing mechanism. Meanwhile, control devices in the online book organizing mechanism are listed in detail in combination with the following table.

| Sequence Number | Model Type | Quantity | Comment | Description |
| --- | --- | --- | --- | --- |
| ① | E2E-X4MD1 | 3 | Proximity switch | To limit and reset the transversely translational servo motor |
| ② | HF-KP43 | 1 | Servo motor | To transversely translate the servo motor |
| ③ | M41A3G2L | 1 | Unidirectional drive | To drive the error processing transmission line |
| ④ | LEFS32A__700 | 1 | Electrical cylinder | To longitudinally translate the electrical cylinder |
| ⑤ | D-M9BL | 2 | Magnetic switch | To detect book clamping JRT gas lifting cylinder |
| ⑥ | D-M9BL | 2 | Magnetic switch | To detect book basket clamping JRT gas lifting cylinder |
| ⑦ | D-M9BL | 2 | Magnetic switch | To detect the book clamping JRT |
| ⑧ | D-M9BL | 2 | Magnetic switch | To detect the book basket clamping JRT |
|  | SY5220-5LZD-C6 | 8 | Electromagnetic valve | To control book clamping JRT gas lifting cylinder<br>To control book basket clamping JRT gas lifting cylinder<br>To control the book clamping JRT |

-continued

| Sequence Number | Model Type | Quantity | Comment | Description |
|---|---|---|---|---|
| | | | | To control the book basket clamping JRT |

Please refer to what is shown in FIG. 9D, which is a lay out of the electrical components of a book taking window. Meanwhile, control devices in the book taking window are listed in detail in combination with the following table.

| Sequence Number | Model Type | Quantity | Comment | Description |
|---|---|---|---|---|
| ① | D-M9BL | 2 | Magnetic switch | To detect the book basket lifting gas cylinder |
| ② | D-M9BL | 2 | Magnetic switch | To detect the open door gas cylinder |
| ③ | D-M9BL | 2 | Magnetic switch | To detect the book basket translational gas cylinder |
| ④ | D-M9BL | 2 | Magnetic switch | To detect book basket clamping JRT gas lifting cylinder |
| ⑤ | D-M9BL | 2 | Magnetic switch | To detect book basket clamping JRT |
| | SY5220-5LZD-C6 | 10 | Electromagnetic valve | To control the book basket lifting gas cylinder<br>To control the open door gas cylinder<br>To control the book basket translational gas cylinder<br>To control book basket clamping JRT gas lifting cylinder<br>To control book basket clamping JRT |

Please refer to what is shown in FIG. 10B and the description in the following table, which is a lay out of the electrical components of a book returning window. Meanwhile, control devices in the book returning window are listed in detail in combination with the following table.

| Sequence Number | Model Type | Quantity | Comment | Description |
|---|---|---|---|---|
| ① | E2E-X4MD1 | 2 | Proximity switch | To limit the servo motor with a middle structure |
| ② | E2E-X4MD1 | 3 | Proximity switch | To limit and reset the book basket translational servo motor |
| ③ | HF-KP053 | 1 | Servo motor | The servo motor with a middle structure |
| ④ | HF-KP053 | 1 | Servo motor | The book basket translational servo motor |
| ⑤ | M41A3G2L | 6 | Unidirectional drive | The horizontal transmission line power motor |
| ⑥ | D-M9BL | 2 | Magnetic switch | To detect the push and pull gas cylinder |
| ⑦ | D-M9BL | 2 | Magnetic switch | To detect a translational gas cylinder |
| ⑧ | D-M9BL | 2 | Magnetic switch | To detect a rotational gas cylinder |
| ⑨ | D-M9BL | 2 | Magnetic switch | To detect a book clamping JRT |
| ⑩ | D-M9BL | 2 | Magnetic switch | To detect a bookend acicular gas cylinder |
| | D-M9BL | 2 | Magnetic switch | To detect a baffle gas cylinder |

-continued

| Sequence Number | Model Type | Quantity | Comment | Description |
|---|---|---|---|---|
| | D-M9BL | 2 | Magnetic switch | To detect a window baffle |
| | SY5220-5LZD-C6 | 14 | Electromagnetic valve | To control the push and pull gas cylinder |
| | | | | To control a translational gas cylinder |
| | | | | To control a rotational gas cylinder |
| | | | | To control a book clamping JRT |
| | | | | To control a bookend acicular gas cylinder |
| | | | | To control a baffle gas cylinder |
| | | | | To control a window baffle |

Figures 11A, 11B:
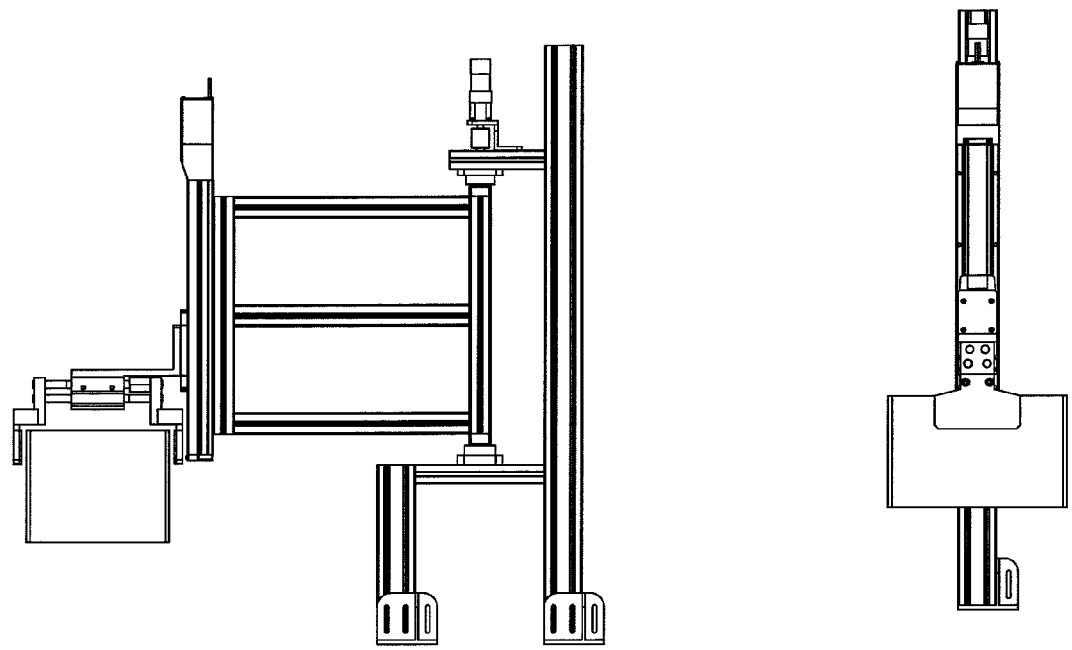
FIG. 11A to FIG. 11C are schematic structural views of the book basket carrying device in the invention, wherein a lay out of electrical components are annotated by FIG. 11C.
Figure 11C:
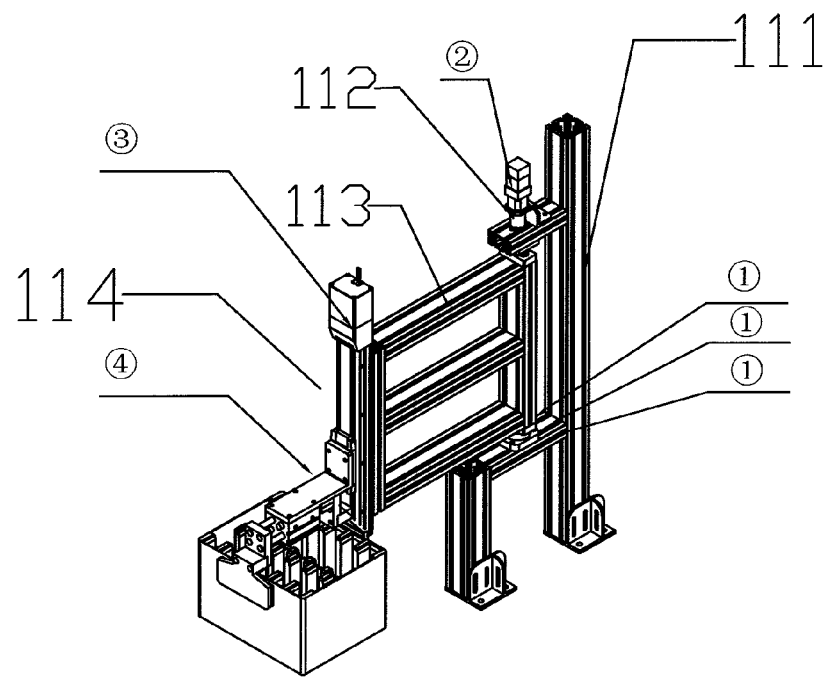

Please refer to what is shown in FIG. 11C and the description in the following table, which is a lay out of the electrical components of a book basket carrying device. Meanwhile, control devices in the book basket carrying device are listed in detail in combination with the following table.

| Sequence Number | Model Type | Quantity | Comment | Description |
|---|---|---|---|---|
| ① | E2E-X4MD1 | 3 | Proximity switch | To limit and reset the location switch motor |
| ② | HF-KP053 | 1 | Servo motor | To switch the positions of two book returning windows |
| ③ | LEFS40A_400 | 1 | Gas cylinder | The book basket clamping JRT lifting electrical cylinder |
| ④ | D-M9BL | 2 | Magnetic switch | To detect the book basket clamping JRT |
| | SY5220-5LZD-C6 | 2 | Electromagnetic valve | To detect the book basket clamping JRT |

4. Introduction on how Each Control System Accomplish the Book Taking and Book Returning in Combination with Mechanical Devices During the Whole Book Borrowing and Book Returning Progress Will be Given as Follows.

1) The Workflow of Book Taking in a Laneway Vehicle.

A PLC is used as a controller in an intelligent laneway vehicle. The QPLC servo motor of Mitsubishi and driving devices for mechanics are used actually in the invention to accomplish various actions of a taking and returning mechanism. The mainly constituent part of the PLC is a power module, a CPU, a baseboard, an input module, an output module, a positioning control module and a communication module. The servo motor includes two parts, i.e., a servo controller and a servo motor and the main function thereof is to be applied in situations of high speed/high accuracy/high response. The PLC module is connected with the servo controller through a positioning module, various controls on position, speed and torque with high accuracy being accomplished by the control motor.

An order for book taking generated by the closed-shelf stack room management system under the request for borrowing a book by a reader is received by PLC through the communication module, the order for book taking including the bracket number, the column number and the layer number of a book, the intelligent laneway vehicle (short for small vehicle hereinafter) moving in the direction of the position of the book with driving under the servo motor (a servo) which controls walking. Then, a horizontal in place signal of the intelligent laneway vehicle is generated and the lifting servo is controlled to be moved upward or downward by the PLC according to the number of layers of the books, a mechanical hand in place signal being output when the servo walks a predetermined length.

When the mechanical hand for book taking used in the closed-shelf stack room is in place, the book clamping JRT is rotated to a position to be for book taking by the rotating gas cylinder controlled by the PLC, and the electrical gas cylinder being translated by driving the mechanical hand to stretch ahead the book clamping JRT. When the book clamping JRT is stretched in place, the book is clamped tightly by the book clamping JRT action controlled by the PLC.

After the book is tightly clamped, the mechanical hand lifting motor and the mechanical translational electrical cylinder act at the same time driven by PLC to take a book out of a book box, and the book is moved above a book basket by the mechanical hand lifting motor and the mechanical translational electrical cylinder, the rotating gas cylinder being controlled to act by the PLC, the book clamping JRT being rotated to the position of the book basket, the mechanical hand being moved downward to a suitable position, the book clamping JRT being released, the book being released to a designated position of the book basket to accomplish the workflow of book taking.

A plurality of orders of book taking can be received within a period of time by the same laneway vehicle, a plurality of books in the same laneway being captured in a batch.

2) the Workflow of a Transmission Line from a Book Basket to an Interface of a Laneway Vehicle:

After the laneway vehicle accomplishes the book borrowing task in its own laneway, it is driven to the connection of the end of the laneway and the transmission line by PLC. The mechanical hand at the interface of the laneway vehicle translates to the laneway side after the laneway vehicle and the book basket thereon are positioned, the rotating gas cylinder being rotated with 90 degrees to correspond to the book basket on the laneway vehicle. Meanwhile, the push and pull gas cylinder acts to rotate the mechanical hand 8 degrees to correspond to the angle of the book basket on the laneway vehicle.

Having accomplished above actions, the lifting gas cylinder acts controlled by the PLC. After the mechanical hand is moved downward in place, the book basket clamping claw is closed to clamp the book basket tightly, the lifting gas cylinder acting to raise the mechanical hand; the push and pull gas cylinder acts, the mechanical hand being rotated reversely 8 degrees; the rotating gas cylinder acts, the book basket being rotated 90 degrees to correspond to the tooling position of the transmission line. After the tooling position of the transmission line is accomplished, the mechanical hand is translated to the transmission line side, the lifting gas cylinder acting, the mechanical hand being moved downward, the book basket clamping JRT being released to release the book basket onto the transmission line.

3). The Processing Workflow of the Online Book Organizing Mechanism:

A longitudinal translational servo motor of the book organizing mechanism acts under the control of the PLC. The mechanical hand for book organizing is moved above the transmission line, which corresponds to the position of a book taking lattice to be processed. After the book basket to be processed on the transmission line enters the working region of the online book organizing mechanism, a transverse translational servo motor of the book organizing mechanism is controlled by the PLC to move the mechanical hand for book organizing right above the transmission line, and being synchronized with the speed of the transmission line.

After the synchronization, the book clamping JRT lifting gas cylinder is controlled by the PLC to act. After the book is clamped in place, the JRT clamps tightly, the book clamping JRT lifting gas cylinder being moved upward to take the book out.

The longitudinal translational servo motor of the book organizing mechanism is controlled by the PLC to act, making the book moved to a middle working position and above a book basket of some certain reader, corresponding to the position of a book lattice in a book basket of some certain reader. The book clamping JRT lifting gas cylinder is controlled by the PLC to act. After the book clamped is moved downward in place, the JRT is released to arrange the book in the working book basket, the book clamping JRT lifting gas cylinder being moved upward, the book organizing mechanism being reset. The system repeats the acts above and books of some certain reader in book baskets in different laneways could be organized into one book basket, which is transmitted to the temporary storage transmission line by the book organizing mechanism after the organization is completed.

In the process of book organization, RFID information is detected at the same time. If the RFID information detection fails, the book is transmitted to an error processing transmission line by the book organizing mechanism, transmitted to a collection box by the error processing transmission line, and the error processing information is transmitted to the closed-shelf stack room management system.

4). The Workflow of the Book Taking Window:

After the book basket of a reader is transmitted to the book taking window through the temporary storage transmission line, the translational gas cylinder is controlled by the PLC to act, the mechanical hand being translated above the transmission line, the book basket clamping lifting gas cylinder acting to move downward to a position corresponding to a tooling board, the book basket clamping JRT acting to clamp the book tightly, the lifting gas cylinder being moved upward, the book basket being taken out.

The translational gas cylinder is controlled by the PLC to act, the mechanical hand being translated to the window side, the book basket clamping JRT being released, the book basket being released to a lifting platform. RFID information of the book in the basket is detected by the closed-shelf stack room management system. If the RFID information detection fails, the book basket will be transmitted back to the temporary storage warehouse.

After the RFID detection, the book basket jacking gas cylinder is controlled by the PLC to act, the book basket being moved upward, the open gas cylinder acting to open a pulling tray of the window, and the books in the book basket can be taken away by the reader.

After the books are taken away by the reader, an instruction from the closed-shelf stack room management system is received by the PLC, the pulling tray of the window being closed and the book basket being moved downward. After the book basket is moved downward in place, RFID information is detected to determine whether all books in the book basket have been taken away by the reader. If there are still any books left in the book basket, the books will be processed as returned books by the system.

5) The Workflow of the Book Returning Window

A transmission belt for books is provided outside the book returning window, a lifting shutter being provided on the transmission belt. The long side of a book should be near the shutter when the book is to be returned. The information and shape of the book are detected by the management system through RFID, the direction of the book being detected through an open light switch by the PLC. The system will remind the reader to place correctly if the direction of the book is incorrect.

After the book is placed correctly, the lifting shutter is moved upward, the transmission line being operated to transmit the book to the internal of the window. The book slips to an inclined board from the transmission line, a baffle controlled by a baffle gas cylinder under the inclined board stopping the book. The book is aligned in the middle with suitable moment by the clamp boards on both sides driven by the PLC controlled servo motor according to the size of the book (the servo motor works at a moment mode). After the middle alignment is accomplished, the baffle gas cylinder is moved away, the clamp boards on both sides being moved away a bit (the servo motor works at a position mode) to make the book slip below a guiding board.

The translational gas cylinder of the book clamping mechanism is translated to the book returning window side under the control of the PLC, the book clamping JRT being stretched to both sides of the book, the book being clamped tightly by the book clamping JRT, the translational gas cylinder of the book clamping mechanism being translated to the transmission line side of the temporary storage warehouse, the push and pull gas cylinder of the book clamping mechanism being lifted upward, the book clamping mechanism being rotated to a perpendicular position, the translational gas cylinder of the book clamping mechanism being translated upward, the rotating gas cylinder of the book clamping mechanism acting to rotate the book with 180 degrees.

The translational servo motor at the book basket position is controlled by the PLC to act, the vacancy corresponding to the book basket being translated below the book clamping JRT. The translational gas cylinder of the book clamping mechanism is translated downward, the book being transmitted to a book basket, the JRT being released, all mechanisms being reset.

After the book returning is accomplished by the reader, the translational servo motor at the book basket position controlled by the PLC acts to move the book basket to the transmission line side of the temporary storage warehouse, the book being moved by the book basket carrying device to the tooling board of the transmission line on the temporary storage warehouse to accomplish the book returning workflow.

The invention claimed is:

1. A fully automatic closed-shelf stack room, including bookracks, a laneway vehicle, a laneway vehicle interface, a transmission device, a book taking window, and a book returning window, the laneway vehicle running in the laneways among the bookracks, comprising:
   a book basket, the book basket includes a plurality of book lattices, wherein the book lattices are separated by bookends;
   a book box, the book box is mounted on the bookrack in groups and is independent of the bookrack;
   a mechanical arm and a bracket, the mechanical arm and the bracket are provided on the laneway vehicle, the mechanical arm including a book clamping mechanism, wherein the book clamping mechanism is connected with a rotational device, and the book clamping mechanism is mounted on a linear guiding device perpendicular to the laneway, the linear guiding device is mounted on a fixed slider, the mechanical arm is connected with the laneway vehicle through the fixed slider;
   the book basket is located under the mechanical arm,
   bookends for limiting the book basket, the bookends are driven by a movement device limiting the book basket provided thereon;
   the transmission device includes a main transmission line and a transmission line for temporary storage, both of which are single-layer closed circulation transmission line;
   wherein the bookracks are provided beside the main transmission line, and the laneway vehicle interface is provided between a laneway entrance and the main transmission line;
   the interface of the laneway vehicle including a book basket clamper and the book basket clamper is fixed on an extending device, the extending device is connected with a rotation device of the book basket clamper, the rotation device of the book basket clamper is provided on a linear guiding device at the entrance of the laneway vehicle, wherein the linear guiding device at the entrance of the laneway vehicle is extended in a direction from the main transmission line to the laneway vehicle;
   an online book organizing mechanism between the main transmission line and the transmission line for temporary storage, the online book organizing mechanism including a supporting frame for organizing books crossing the main transmission line and a transmission line for temporary storage;
   a book taking and basket exchanging mechanism on the supporting frame for organizing books, the organizing transmission lines provided below the book taking and basket exchanging mechanism;
   the organizing transmission lines are located between the main transmission line and the transmission line for temporary storage; the book taking and basket exchanging mechanism includes a first linear guiding device and a second linear guiding device, the first linear guiding device is located above the organizing transmission lines and is parallel thereto, the second linear guiding device is perpendicular to the first linear guiding device; the second linear guiding device comprising a lift cylinder for the book clamping mechanism and a lift cylinder for book basket clamper;
   the book clamping mechanism is connected with the bottom of the lift cylinder for the book clamping mechanism, and a book basket clamper is connected with the bottom of the lift cylinder for the book basket damper;
   a book taking window and a book returning window is provided on one side of the temporary storage transmission line; the book taking window includes a supporting bracket for the taking window and an in-line supporting bracket crossing the temporary storage transmission line, a lower-layer book basket bracket and an upper-layer window baffle board are on the supporting bracket for the taking window, wherein the book basket bracket moves upward and downward through a frame lift cylinder;
   the book basket clamper moving from the upper side of the temporary storage transmission lines to the upper side of the lower-layer book basket bracket on the in-line supporting bracket;
   the book returning window includes a book returning mechanism and a book basket transmission bracket for returning books provided on a book returning window bracket
   the returning mechanism includes a horizontal transmission line, the end of the horizontal transmission line is connected with a slope slide, the lower end of the slope slide includes the book clamping mechanism, wherein the book clamping mechanism is connected with a rotating cylinder for book returning, the rotating cylinder for book returning is provided on a translational cylinder for book returning;
   the translational cylinder for book returning includes a push and pull cylinder, the translational cylinder for book returning is pushed by the push and pull cylinder to be parallel with the slope slide to accomplish the book taking action of the book clamping mechanism under the slope slide, wherein the translational cylinder for book returning is pushed continuously to drive the book clamping mechanism to rotate so as to be perpendicular to the ground;
   the book basket transmission bracket of the book returning window is provided below the book returning mechanism, the book basket transmission bracket including a book basket lattice and an electric cylinder to drive the book basket to move on the transmission bracket of the returning window;
   a book basket carrying mechanism is provided beside the transmission bracket of the returning window, the book basket carrying mechanism including a rotating bracket body, wherein the rotating bracket body includes a lift carrying cylinder of the book basket clamper, the lift carrying cylinder of the book basket clamper is connected with the book basket clamper, wherein said rotating bracket body rotates between the position above the book basket transmission bracket of the book returning window and the position above the temporary storage transmission line for carrying from the book basket transmission bracket of the book returning window to the temporary storage transmission line.

2. The fully automatic closed-shelf stack room of claim 1, wherein:
   the book box tilts with some certain angle and is provided on the bookrack;

the mechanical arms and the book basket bracket are provided on the laneway vehicle with the same inclination;

an extending device at the laneway vehicle interface is connected with a L-shaped supporting seat, wherein the upper end of the extending device is connected with a telescopic rod, the lower end of the telescopic rod is connected with an adapter base through a pivot, the other end of the adapter base is connected with the lower end of the L-shaped supporting seat through a pivot, the lower end of the adapter base is connected with the book basket damper, and the telescopic rod is expanded for the adapter base to rotate to the same inclination.

3. The fully automatic closed-shelf stack room of claim 2, wherein:

the horizontal transmission line of the book returning mechanism includes the first horizontal transmission line and the second horizontal transmission line, a baffle located between the first horizontal transmission line and the second horizontal transmission line, the baffle is controlled to open through a window lifting gas cylinder;

an inclined sliding board is connected with the end of the second horizontal transmission line, a middle baffle controlled by a baffle lifting gas cylinder to lift upward and downward is provided at the middle position of the inclined sliding board, a middle aligned device and a book pressing device is provided on the upper end of the middle baffle.

4. The fully automatic closed-shelf stack room of claim 3, wherein:

a book organizing device is provided on the lower end of the middle baffle, the book organizing mechanism including an upper guiding board and a baffle gas cylinder for distinguishing a large-sized book from a small-sized book.

5. The fully automatic closed-shelf stack room of claim 4, wherein:

the middle aligned device is formed by middle aligned claws on both sides of the inclined sliding board driven by a middle aligned gas cylinder; the book pressing device includes an air supply divided manifold and an air supply nozzle provided above the middle aligned device.

6. The fully automatic closed-shelf stack room of claim 4, wherein:

the book clamping mechanism includes the first palm and the second palm, the book clamping mechanism is synchronously clamped or released through the driving by an internal gas cylinder; the book basket damper includes the first claw-board and the second claw-board, the book basket clamper is synchronously clamped or released through the driving by an internal driving gas cylinder.

7. The fully automatic closed-shelf stack room of claim 6, wherein:

fingers for book taking are provided on the first palm and the second palm of the book clamping mechanism, a left-sided board and a right-sided board are provided on both sides of the book box, the left-sided board and the right-sided board comprising notches corresponding to the fingers for book taking.

8. The fully automatic closed-shelf stack room of claim 7, wherein:

an entrance for stretching a finger that is fitted with the fingers for book taking is provided on the bookend in the book basket.

9. The fully automatic closed-shelf stack room of claim 7, wherein:

the bookend in the book basket is formed by thin boards and thick boards, guiding grooves are formed between the thin boards and thick boards.

10. The fully automatic closed-shelf stack room of claim 9, wherein: the height of the thin board is less than that of the thick board, the height of a thick board in the middle is less than the thick boards on the edge of both sides, and a notch on an upper end of each thin board is formed between adjacent thick boards.

11. The fully automatic closed-shelf stack room of claim 8, wherein:

transmission brackets are included in the main transmission line and the temporary storage transmission line, a transmission line is provided on a transmission line bracket, a plurality of book basket bases is fixed on the transmission lines, and a plurality of book basket limiting devices is provided on the book basket bases.

12. The fully automatic closed-shelf stack room of claim 8, wherein:

the online book organizing mechanism further includes a book recycling device, the book recycling device includes a recycling transmission line and a book storage basket.

13. The fully automatic closed-shelf stack room of claim 8, wherein:

a translational mechanism is provided on the in-line supporting bracket, the translational mechanism is extended to the exit supporting bracket from the in-line supporting bracket, an elongation board is provided on the translational mechanism, one side of the elongation board is fixed above the translational mechanism and the other side having an elongation section, the elongation board is moved above the book basket bracket through the translational mechanism, a lifting gas cylinder for book basket clamper is provided on the elongation section.

14. The fully automatic closed-shelf stack room of claim 8, wherein:

the angle of the inclination is 7 degrees to 9 degrees.

15. The fully automatic closed-shelf stack room of claim 14, wherein:

the angle of the inclination is 8 degrees.

16. The fully automatic closed-shelf stack room of claim 15, wherein:

the rotation device is a rotating gas cylinder, a linear guiding rail is included in the linear guiding device, the linear guiding device for the laneway vehicle interface, the first linear guiding device and the second linear guiding device, the parts connected with the linear guiding rails are moved linearly driven by an internal driving motor and a transmission track T.

17. An unattended fully automatic book management system, comprising:

a full-automatic closed-shelf stack room of claim 1 and a book management system, a control system of the full-automatic closed-shelf stack room including a communication module for receiving instructions from the book management system;

the book management system includes a collection system and a closed-shelf stack room management system, wherein the collection system includes a collection database, information on readers and identification information on books are included therein; the closed-shelf stack room management system includes a database of closed-shelf stack room system, data information on said bookracks, the book box, the book basket, the laneway vehicle, the laneway vehicle interface, the transmission device, the book taking window, the book returning window and the book basket carrying device is stored inside the database of the closed-shelf stack room system;

the data information inside the database of the closed-shelf stack room system is administered and operated by the closed-shelf stack room management system to accomplish the interaction between the collection system and the control system of the full-automatic closed-shelf stack room, the closed-shelf stack room management system including a module for generating an order for book taking, a module for dynamically assigning book baskets, a module for carrying out a book and a module for returning a book;

the module for generating an order for book taking receives the information on readers and the identification information on books transmitted by the collection system, generates an order for book taking, and conveys the order for book taking to the communication module of control system of the full-automatic closed-shelf stack room;

the order for book taking including at least information on readers, identification information on books and location information on on book box;

the function of said module for returning a book is to receive an in place signal of the book returned, assign a book box in the closed-shelf stack room according to identification information of the book returned, and transmit the position information of the assigned book box to the following book basket assignment module for book returning, meanwhile informing the control system of the full-automatic closed-shelf stack room to activate the book returning window to start book returning actions;

the function of said a module for dynamically assigning book basket is to refresh dynamically position information of the book basket where the book is located and the book lattice where the book is located and assign a book basket during the book exchange process for books at the organizing transmission line, a book basket assignment module for book taking and a book basket assignment module for book returning are included in module for dynamically assigning book basket;

wherein the book basket assignment module for book taking assigns a book basket to temporary storage transmission line for borrowed books from different laneways, books corresponding to the orders for readers from each reader are carried inside the book basket conveyed to the temporary storage transmission line;

wherein the book basket assignment module for book returning assigns a book basket to the main transmission laneway for book returned according to the location information of a book box conveyed by the module for returning a book;

said module for taking a book receives an in place signal of a reader and convey the number of the book taking window to the control system, the control system activating the corresponding book taking window to act.

18. The unattended fully automatic book management system of claim 17, wherein:

the closed-shelf stack room management system further includes a racking module for new books, the racking module includes an position assignment module for book boxes and a book information writing module, the position information on book boxes is transmitted to the communication module of the control system by the position assignment module for book boxes, RFID information of the books that enter the storage warehouse for the first time is read by the book information writing module and written into the collection database.

19. The unattended fully automatic book management system of claim 18, wherein:

said closed-shelf stack room management system further comprises a system check module, the system check module transmits the broken books to a recycling transmission line and to a book storage basket according to the broken information on books detected by the control system.

20. The unattended fully automatic book management system of claim 19, wherein:

said book returning module further comprises a choosing and assignment module, the choosing and assignment module assigning a book box into different book regions with different sizes according to the size difference of the books.

21. The unattended fully automatic book management system of claim 17, wherein:

the book box tilts with some certain angle and is provided on the bookrack;

the mechanical arms and the book basket bracket are provided on the laneway vehicle with the same inclination;

an extending device at the laneway vehicle interface is connected with a L-shaped supporting seat, wherein the upper end of the extending device is connected with a telescopic rod, the lower end of the telescopic rod is connected with an adapter base through a pivot, the other end of the adapter base is connected with the lower end of the L-shaped supporting seat through a pivot, the lower end of the adapter base is connected with the book basket damper, and the telescopic rod is expanded for the adapter base to rotate to the same inclination.

22. The unattended fully automatic book management system of claim 17, wherein:

the horizontal transmission line of the book returning mechanism includes the first horizontal transmission line and the second horizontal transmission line, a baffle located between the first horizontal transmission line and the second horizontal transmission line, the baffle is controlled to open through a window lifting gas cylinder;

an inclined sliding board is connected with the end of the second horizontal transmission line, a middle baffle controlled by a baffle lifting gas cylinder to lift upward and downward is provided at the middle position of the inclined sliding board, a middle aligned device and a book pressing device are provided on the upper end of the middle baffle.

23. The unattended fully automatic book management system of claim 22, wherein:

a book organizing device is provided on the lower end of the middle baffle, the book organizing mechanism including an upper guiding board and a baffle gas cylinder for distinguishing a large-sized book from a small-sized book.

24. The unattended fully automatic book management system of claim 23, wherein:

the middle aligned device is formed by middle aligned claws on both sides of the inclined sliding board driven by a middle aligned gas cylinder; the book pressing device includes an air supply divided manifold and an air supply nozzle provided above the middle aligned device.

25. The unattended fully automatic book management system of claim 24, wherein:

the book clamping mechanism includes the first palm and the second palm, the book clamping mechanism is synchronously clamped or released through the driving by an internal gas cylinder; the book basket damper includes the first claw-board and the second claw-board, the book basket clamper is synchronously clamped or released through the driving by an internal driving gas cylinder.

26. The unattended fully automatic book management system of claim 25, wherein:
fingers for book taking are provided on the first palm and the second palm of the book clamping mechanism, a left-sided board and a right-sided board are provided on both sides of the book box, the left-sided board and the right-sided board comprising notches corresponding to the fingers for book taking.

27. The unattended fully automatic book management system of claim 26, wherein:
an entrance for stretching a finger that is fitted with the fingers for book taking is provided on the bookend in the book basket.

28. The unattended fully automatic book management system of claim 27, wherein:
the bookend in the book basket is formed by thin boards and thick boards, guiding grooves are formed between the thin boards and thick boards.

29. The unattended fully automatic book management system of claim 28, wherein the height of the thin board is less than that of the thick board, the height of a thick board in the middle is less than the thick boards on the edge of both sides, and a notch on an upper end of each thin board is formed between adjacent thick boards.

30. The unattended fully automatic book management system of claim 29, wherein:
transmission brackets are included in the main transmission line and the temporary storage transmission line, a transmission line is provided on a transmission line bracket, a plurality of book basket bases is fixed on the transmission lines, and a plurality of book basket limiting devices is provided on the book basket bases.

31. The unattended fully automatic book management system of claim 30, wherein:
the online book organizing mechanism further includes a book recycling device, the book recycling device includes a recycling transmission line and a book storage basket.

32. The unattended fully automatic book management system of claim 31, wherein:
a translational mechanism is provided on the in-line supporting bracket, the translational mechanism is extended to the exit supporting bracket from the in-line supporting bracket, an elongation board is provided on the translational mechanism, one side of the elongation board is fixed above the translational mechanism and the other side having an elongation section, the elongation board is moved above the book basket bracket through the translational mechanism, a lifting gas cylinder for book basket clamper is provided on the elongation section.

33. The unattended fully automatic book management system of claim 32, wherein:
the inclination is 7 degrees to 9 degrees.

34. The unattended fully automatic book management system of claim 33, wherein:
the inclination is 8 degrees.

35. The unattended fully automatic book management system of claim 34, wherein:
the rotation device is a rotating gas cylinder, a linear guiding rail is included in the linear guiding device, the linear guiding device for the laneway vehicle interface, the first linear guiding device and the second linear guiding device, the parts connected with the linear guiding rails are moved linearly driven by an internal driving motor and a transmission track T.

* * * * *